US011517020B2

(12) United States Patent
Horino et al.

(10) Patent No.: US 11,517,020 B2
(45) Date of Patent: Dec. 6, 2022

(54) ANTIVIRAL SUBSTRATE, ANTIVIRAL COMPOSITION, METHOD FOR MANUFACTURING ANTIVIRAL SUBSTRATE, ANTIMICROBIAL SUBSTRATE, ANTIMICROBIAL COMPOSITION AND METHOD FOR MANUFACTURING ANTIMICROBIAL SUBSTRATE

(71) Applicant: IBIDEN CO., LTD., Ogaki (JP)

(72) Inventors: Katsutoshi Horino, Ibi-gun (JP); Kozo Takada, Ibi-gun (JP); Kazuhiro Ito, Ibi-gun (JP); Kohei Otsuka, Ibi-gun (JP); Kiyotaka Tsukada, Ibi-gun (JP)

(73) Assignee: IBIDEN CO., LTD., Ogaki (JP)

( * ) Notice: Subject to any disclaimer, the term of this patent is extended or adjusted under 35 U.S.C. 154(b) by 265 days.

(21) Appl. No.: 16/845,080

(22) Filed: Apr. 10, 2020

(65) Prior Publication Data
US 2020/0236946 A1  Jul. 30, 2020

Related U.S. Application Data

(63) Continuation of application No. PCT/JP2018/038208, filed on Oct. 12, 2018.

(30) Foreign Application Priority Data

Oct. 12, 2017  (JP) .............................. JP2017-198616
Mar. 28, 2018  (JP) .............................. JP2018-061612
Sep. 5, 2018  (JP) .............................. JP2018-165952

(51) Int. Cl.
*A01N 59/20* (2006.01)
*C09D 7/63* (2018.01)
(Continued)

(52) U.S. Cl.
CPC ............ *A01N 59/20* (2013.01); *A01N 25/04* (2013.01); *C09D 5/14* (2013.01); *C09D 7/63* (2018.01);
(Continued)

(58) Field of Classification Search
CPC combination set(s) only.
See application file for complete search history.

(56) References Cited

U.S. PATENT DOCUMENTS

2015/0223467 A1* 8/2015 Ueda .................... C08F 290/06
514/499
2015/0351385 A1  12/2015 Ueda et al.
(Continued)

FOREIGN PATENT DOCUMENTS

JP  63-104218  5/1988
JP  08-165210  6/1996
(Continued)

*Primary Examiner* — Peter A Salamon
(74) *Attorney, Agent, or Firm* — Mori & Ward, LLP

(57) ABSTRACT

The present invention provides an antiviral substrate that is excellent in antiviral properties, is excellent in transparency or the like, and is capable of maintaining characteristics such as the transparency of a base material and the color of the surface of the base material. The present invention relates to an antiviral substrate in which a cured material of an electromagnetic curable resin containing a copper compound is scattered in the form of islands on a surface of a base material, and at least a part of the copper compound is exposed on a surface of the cured material of the electromagnetic curable resin.

13 Claims, 3 Drawing Sheets

(51) Int. Cl.
  *A01N 25/04* (2006.01)
  *C09D 5/14* (2006.01)
  *C08F 2/20* (2006.01)
  *C08F 2/48* (2006.01)
  *C08F 20/18* (2006.01)
  *C08K 5/07* (2006.01)

(52) U.S. Cl.
  CPC .................................. *C08F 2/20* (2013.01);
      *C08F 2/48* (2013.01); *C08F 20/18* (2013.01);
      *C08K 5/07* (2013.01)

(56) References Cited

U.S. PATENT DOCUMENTS

2015/0351386 A1* 12/2015 Ueda .................. C09D 17/00
                                                424/405
2019/0098902 A1* 4/2019 Ogata ...................... B22F 9/24
2020/0236946 A1* 7/2020 Horino ..................... C08K 3/28

FOREIGN PATENT DOCUMENTS

| | | |
|---|---|---|
| JP | 08-165211 | 6/1996 |
| JP | 08-165212 | 6/1996 |
| JP | 08-252302 | 10/1996 |
| JP | 08-299418 | 11/1996 |
| JP | 08-324195 | 12/1996 |
| JP | 11-236734 | 8/1999 |
| JP | 2002-352410 | 12/2002 |
| JP | 2007-161755 | 6/2007 |
| JP | 5723097 | 8/2010 |
| JP | 2011-530400 | 12/2011 |
| JP | 5812488 | 5/2013 |
| JP | 2015-105252 | 6/2015 |
| JP | 2017-088586 | 5/2017 |
| WO | WO 2010/017049 | 2/2010 |
| WO | WO 2014/080606 | 5/2014 |
| WO | WO 2014/132606 | 9/2014 |
| WO | WO 2014/141600 | 9/2014 |
| WO | WO 2017/170593 | 10/2017 |

* cited by examiner

ANTIVIRAL SUBSTRATE, ANTIVIRAL COMPOSITION, METHOD FOR MANUFACTURING ANTIVIRAL SUBSTRATE, ANTIMICROBIAL SUBSTRATE, ANTIMICROBIAL COMPOSITION AND METHOD FOR MANUFACTURING ANTIMICROBIAL SUBSTRATE

TECHNICAL FIELD

The present invention relates to an antiviral substrate, an antiviral composition, and a method for manufacturing an antiviral substrate, and an antimicrobial substrate, an antimicrobial composition, and a method for manufacturing an antimicrobial substrate.

BACKGROUND ART

Recently, a so-called "pandemic" in which an infective disease mediated by various microorganisms that are a pathogen exponentially spreads for a short period of time has been a problem, and dead from virus infection such as a severe acute respiratory syndrome (SARS), a norovirus, avian influenza have been also reported.

Therefore, the development of an antiviral agent exhibiting an antiviral effect with respect to various viruses has been actively conducted, and in practice, various members are coated with a resin or the like, containing an antiviral agent formed of a metal such as Pd or an organic compound, having an antiviral effect, or a member containing a material in which an antiviral agent is supported is manufactured.
Patent Literature 1 discloses a molded body including a layer formed of a curable resin containing an inorganic-based antibacterial agent and a metal oxide on a surface, in which the inorganic-based antibacterial agent is fatty acid-modified metal ultrafine particles.
Patent Literature 2 discloses an antiviral coating agent formed of a copper suboxide and sugar having reducing properties.
In addition, Patent Literature 3 discloses an antibacterial building material that is coated with a coating agent including an amino-acid salt of copper, that is, an amino-acid complex salt of copper. Further, Patent Literature 4 discloses a coating agent formed of a binder resin containing copper suboxide and a phosphoric acid ester type anion surfactant. In addition, Patent Literature 5 discloses an antiviral coating material using particles of monovalent copper acetate.

CITATION LIST

Patent Literature

Patent Literature 1: JP 2015-105252 A
Patent Literature 2: JP 5812488 B
Patent Literature 3: JP H11-236734 A
Patent Literature 4: WO 2014/132606 A
Patent Literature 5: JP 5723097 B

SUMMARY OF INVENTION

Technical Problem

However, in the molded body described in Patent Literature 1, the layer formed of the curable resin is a continuous layer formed on the surface of the molded body, and thus, it is difficult to use the layer as a layer requiring sufficient transparency, such as a protective film or a film for display.

In addition, in metal particles such as silver or copper, even in a case where antibacterial performance is obtained, the metal particles have no oxidation power or reducing power, and thus, antiviral performance requiring an oxidation reaction and a reduction reaction cannot be obtained.

In the antibacterial material described in Patent Literature 2, the antiviral coating agent formed of the copper suboxide and sugar having reducing properties is disclosed, but an electromagnetic curable resin is not disclosed, and coating properties are degraded. In addition, since sugar in the coating agent is easily eluted in water, a cured resin is degraded and copper suboxide is desorbed, and therefore, water resistance is poor.

The coating agent described in Patent Literature 4 has poor coatability. Although an acryl resin or the like is disclosed as a coating agent composition, in examples, a thermosetting acryl resin is used, and a water-soluble phosphoric acid ester-based surfactant is contained. Thus, copper suboxide is easily desorbed, and the water resistance is poor as with Patent Literature 2.

Further, in the building material of Patent Literature 3, the amino-acid complex salt of copper is used. In general, since the valence of copper ions capable of stably forming the amino-acid complex salt of copper is divalent, it is not sufficient to express antibacterial properties, and it is not also sufficient for the antiviral performance.

In addition, in the antiviral coating material of Patent Literature 5, since monovalent copper chloride is used as a raw material, the monovalent copper is suspended in a dispersion medium without being dissolved, and it exists in the coating material as a particulate substance, after curing from an uncured state. For this reason, the dispersibility of copper ions is insufficient, an opportunity for being in contact with a virus or the like is low, and thus, the antiviral performance is not satisfactory.

The present invention has been made in consideration of the circumstances described above, and an object thereof is to provide an antimicrobial substrate that is excellent in antimicrobial properties, is excellent in transparency or the like, and is capable of maintaining characteristics such as the transparency of a base material or the color of the surface of the base material, an antimicrobial composition that is optimal for manufacturing the antimicrobial substrate, and a method for manufacturing the antimicrobial substrate excellent in coating performance, in which it is possible to easily manufacture the antimicrobial substrate.

In addition, another object of the present invention is to provide an antiviral substrate that is excellent in antiviral properties, is excellent in transparency or the like, and is capable of maintaining characteristics such as the transparency of a base material or the color of the surface of the base material, an antiviral composition that is optimal for manufacturing the antiviral substrate, and a method for manufacturing the antiviral substrate excellent in coating performance, in which it is possible to easily manufacture the antiviral substrate.

In addition, preferably, still another object of the present invention is to provide an antifungal substrate that is excellent in antifungal properties, is excellent in transparency or the like, and is capable of maintaining characteristics such as the transparency of a base material or the color of the surface of the base material, an antifungal composition that is optimal for manufacturing the antifungal substrate, and a method for manufacturing the antifungal substrate excellent in coating performance; in which it is possible to easily manufacture the antifungal substrate.

Solution to Problem

In an antiviral substrate of the first invention, a cured material of an electromagnetic curable resin containing a copper compound is scattered in the form of islands on a surface of a base material, and at least a part of the copper compound is exposed on a surface of the cured material of the electromagnetic curable resin.

Hereinafter, various technical matters will be described. In the case of simply describing with words such as "the copper compound of the present invention" or "in the present invention", it is regarded that technical matters including all the following second invention in addition to the first invention, will be described.

In the antiviral substrate of the first invention, since the cured material of the electromagnetic curable resin (hereinafter, may be referred to as a cured resin) containing the copper compound is scattered in the form of islands on the surface of the base material, and at least a part of the copper compound is exposed on the surface of the cured material of the electromagnetic curable resin, the copper compound is easily in contact with a virus, and it is possible to sufficiently exhibit an effect as a substrate having antiviral properties based on the copper compound.

In the present invention, "at least a part of the copper compound is exposed on the surface of the cured material of the electromagnetic curable resin" and "at least a part of the copper compound is exposed on the surface of the cured material of the binder (hereinafter, may be referred to as a cured binder)" indicate a state in which a part of the copper compound is not covered with the cured resin or the cured binder, and can be in contact with an atmosphere medium such as the air, existing around the cured resin or the cured binder, and also indicate a case where the copper compound exists in open pores formed in the cured resin or the cured binder in a state capable of being in contact with the atmosphere medium such as the circumambient air. Note that, even in a case where at least a part of the copper compound is exposed on an inner wall surface of closed pores, since at least a part of the copper compound is isolated from the atmosphere medium such as the circumambient air, existing around the cured material of the electromagnetic curable resin or the cured binder, such cases are not included in the concept of "exposure".

In addition, in the antiviral substrate of the first invention, it is preferable that at least a part of the copper compound is exposed on a surface of the cured material of the electro-magnetic curable resin, in a state capable of being in contact with a virus. This is because at least a part of the copper compound is exposed in a state capable of being in contact with a virus, and thus, it is possible to deactivate the virus.

In addition, in the antiviral substrate of the first invention, since the cured material of the electromagnetic curable resin is scattered in the form of islands, there is a portion in which the cured resin does not exist and the surface of the base material is exposed on the surface of the base material, the thickness of the cured resin also decreases, and it is possible to prevent a decrease in the transmittance of a visible light ray with respect to the surface of the base material. For this reason, in a case where the base material is a transparent material, the transparency of the base material does not decrease, and in a case where the design of a predetermined pattern or the like is formed on the surface of the base material, the appearance of the design or the like is not impaired.

Further, in the antiviral substrate of the first invention, since the cured resin is scattered in the form of islands, it is possible to decrease a contact area between the cured resin and surface of the base material and to suppress a residual stress of the cured resin or a stress generated at the time of a thermal cycle, and it is possible to form the cured resin having high adhesiveness with respect to the base material.

In addition, since the cured resin is scattered in the form of islands, a surface area of the cured binder increases, a virus is easily trapped between the cured resins, and thus, a probability of contact between the cured resin having antiviral performance and the virus increases, and high antiviral performance can be expressed.

In the present invention, "scattered in the form of islands" indicates that the cured resin on the surface of the base material exists in an isolated state in which the cured resin is not in contact with other cured resins. The shapes of the cured resins scattered in the form of islands are not limited, and when the outline is seen in a planar view, the shape of the cured resin may be a shape, including a circle and an ellipse, may be a shape such as a polygon, or may be a shape in which a circle, an ellipse, or the like is connected through a thin portion.

In the antiviral substrate of the first invention, it is preferable that the cured material of the electromagnetic curable resin is formed of a porous body.

This is because the copper compound is easily in contact, with the atmosphere medium such as the air, and thus, copper ions (I) reduce water or oxygen in the air and generate active oxygen, a hydrogen peroxide solution or super oxide anions, hydroxy radicals, and the like. As a result, protein configuring a virus is destroyed, and the virus is easily deactivated.

In the antiviral substrate of the first invention, the cured material of the electromagnetic curable resin may contain a polymerization initiator, in particular, may contain a photo-polymerization initiator.

Since the polymerization initiator generates radicals or ions, and they are capable of reducing the copper compound, it is possible to increase antiviral activity of copper. In general, copper (I) has antiviral activity higher than that of copper (II), and the antiviral activity is improved by reducing copper.

The present inventors have first found that such a polymerization initiator has reducing power with respect to copper, and the copper compound is reduced by the polymerization initiator, and thus, it is possible to increase an existence ratio of copper (I).

In the antiviral substrate of the first invention, it is preferable that the cured material of the electromagnetic curable resin contains a water-insoluble polymerization initiator. This is because the water-insoluble polymerization initiator is not eluted even in a case of being in contact with water, and thus, the cured resin is not degraded, and the copper compound is not desorbed.

It is assumed that even in a case where the copper compound is soluble in water, it is possible to suppress the desorption of the copper compound insofar as the copper compound can be retained by the cured resin, but in a case where a water-soluble substance is contained in the cured resin, a holding power of the cured resin with respect to the copper compound decreases, and the copper compound is desorbed.

In addition, it is preferable that the water-insoluble polymerization initiator is a photopolymerization initiator. This is because it is possible to allow a polymerization reaction to easily proceed by light such as a visible light ray or an ultraviolet ray.

In the antiviral substrate of the first invention, it is preferable to use a photopolymerization initiator having reducing power. This is because the photopolymerization initiator reduces the copper compound contained in the antiviral substrate of the first invention to copper ions (I) having an antiviral effect, and is capable of suppressing copper ions (I) from being oxidized and from being changed to copper ions (II) having poor antiviral properties.

In the antiviral substrate of the first invention, specifically, it is preferable that the polymerization initiator is at least one or more selected from an alkyl phenone-based polymerization initiator, and benzophenone or a derivative thereof, in particular, it is preferable that the polymerization initiator contains benzophenone or a derivative thereof.

In the antiviral substrate of the first invention, it is preferable that the electromagnetic curable resin is at least one selected from the group consisting of an acryl resin, a urethane acrylate resin, a polyether resin, a polyester resin, an epoxy resin, and an alkyd resin.

In the antiviral substrate of the first invention, in a case where the electromagnetic curable resin is at least one selected from the group consisting of the acryl resin, the urethane acrylate resin, the polyether resin, the polyester resin, the epoxy resin, and the alkyd resin, the cured resin has transparency, and is also excellent in the adhesiveness with respect to the base material.

In the antiviral substrate of the first, invention, it is preferable that a ratio (Cu(I)/Cu(II)) of the number of ions of Cu(I) and Cu(II) contained in the copper compound, which is calculated by measuring bond energy corresponding to Cu(I) and Cu(II) in a range of 925 to 955 eV for 5 minutes, by an X-ray photoelectron spectroscopy analysis method, is 0.4 to 50. In particular, it is preferable that the ratio (Cu(I)/Cu(II)) of the number of ions of Cu(I) and Cu(II) contained in the copper compound is 0.5 to 50.

In addition, since copper of Cu(I) is more excellent in the antiviral properties, compared to copper of Cu(II), in the antiviral substrate of the first invention, the ratio (Cu(I)/Cu(II)) of the number of ions of Cu(I) and Cu(II) contained in the copper compound, which is calculated by measuring the bond energy corresponding to Cu(I) and Cu(II) in the range of 925 to 955 eV for 5 minutes, with the X-ray photoelectron spectroscopy analysis method, is more desirably 1.0 to 4.0, in particular, is more desirably 1.4 to 2.9, and is optimally 1.4 to 1.9, and thus, the antiviral substrate more excellent in the antiviral properties is obtained.

In addition, in a case where the cured material of the electromagnetic curable resin is dispersed and fixed in the form of islands on the surface of the base material or in a case where a region in which the cured material of the electromagnetic curable resin is fixedly formed on the surface of the base material and a region in which the cured material of the electromagnetic curable resin is not fixedly formed on the surface of the base material are mixed, it is preferable to adjust Cu(I)/Cu(II) in the copper compound to 0.4/1 to 4.0/1, since it is possible to increase the antiviral properties.

In the antiviral substrate of the first invention, it is possible to adjust the ratio Cu(I)/Cu(II) in the copper compound, in accordance with the selection of the electromagnetic curable resin, the polymerization initiator, and the copper compound, the adjustment of the concentration thereof, and the adjustment of an irradiation time or the intensity of an electromagnetic wave such as an ultraviolet ray.

Note that, Cu(I) indicates that an ion valence of copper is 1, and may be represented by $Cu^+$. On the other hand, Cu(II) indicates that an ion valence of copper is 2, and may be represented by $Cu^{2+}$. Note that, in general, the bond energy of Cu(I) is 932.5 eV±0.3 (932.2 to 932.8 eV), and the bond energy of Cu(II) is 933.8 eV±0.3 (933.5 to 934.1 eV).

In the antiviral substrate of the first invention, it is preferable that in the electromagnetic curable resin containing the copper compound, a surface composition ratio obtained by an energy dispersive X-ray analyzer is calculated on the basis of a peak intensity of a characteristic X-ray of a carbon element and a copper element that are a main constituent element of a resin component, and a weight ratio is preferably Cu:C=1.0:28.0 to 200.0.

In a case where in the electromagnetic curable resin containing the copper compound, the surface composition ratio obtained by the energy dispersive X-ray analyzer is in the range described above, it is difficult for Cu to fall off from the cured resin, and it is possible to maintain high antiviral properties.

In the antiviral substrate of the first invention, it is preferable that in the cured material of the electromagnetic curable resin, a maximum width in a direction parallel to the surface of the base material is 0.1 to 200 μm, and an average value of thicknesses is 0.1 to 20 μm.

In the antiviral substrate of the first invention, in a case where the average value of the thicknesses of the cured resin is 0.1 to 20 μm, the cured resin is thin. Therefore, it is difficult to form a continuous layer of the cured resin, the cured resin is easily scattered in the form of islands, a light transmittance easily increases, and the antiviral effect is easily obtained.

Further, a ratio of a portion in which the surface of the base material is not covered with the cured resin increases by setting the maximum width of the cured resin in the direction parallel to the surface of the base material to 0.1 to 200 μm, and thus, a decrease in the light transmittance can be suppressed.

It is more preferable that in the cured material of the electromagnetic curable resin, the maximum width in the direction parallel to the surface of the base material is 1 to 100 μm, and the average value of the thicknesses is 1 to 20 μm.

In general, a compound indicates a covalent compound and an ionic compound, and a complex is not included in the compound. Accordingly, a copper complex (a copper complex salt) is not included in the copper compound of the present invention, and an amino-acid salt of copper that is a complex salt is not also included in the copper compound of the present invention. The copper compound of the present invention indicates a covalent compound containing copper and an ionic compound containing copper. In other words, the copper compound in the antiviral substrate, an antiviral composition, and a method for manufacturing an antiviral substrate of the first invention is a copper compound (excluding a copper complex).

In the antiviral substrate of the first invention, it is preferable that the copper compound is at least one or more selected from a sulfate of copper, a carboxylate of copper, a nitrate of copper, a chloride of copper, a phosphate of copper, and alkoxide of copper, as an ionic compound. In addition, examples of a covalent compound of copper include an, oxide of copper, a hydroxide of copper, and the like.

In an antiviral base material of the first invention, it is preferable that the copper compound is a carboxylate of copper, a hydroxide of copper, an oxide of copper, or a water-soluble inorganic salt of copper.

In addition, the carboxylate of copper is more preferable as the copper compound. This is because a carboxylic acid has a COOH group, is excellent in affinity with respect to a resin, is easily retained by the cured resin, and is difficult to be eluted in water, compared to other inorganic salts of copper, and thus, is excellent in water resistance. In addition, the hydroxide of copper also has an OH group, forms a hydrogen bond with a functional group in a resin, and thus, is easily retained by the cured resin, and is difficult to be eluted in water, and thus, is excellent in the water resistance.

Note that, the electromagnetic curable resin is insoluble in water after curing, and the cured resin has water resistance.

An antiviral composition of the first invention, contains: a copper compound; an uncured electromagnetic curable resin; a dispersion medium; and a polymerization initiator.

Note that, herein, the uncured electromagnetic curable resin indicates a monomer or an oligomer that is a raw material of the cured resin.

In a case where the antiviral composition of the first invention contains the copper compound, the uncured electromagnetic curable resin, the dispersion medium, and the polymerization initiator, it is possible to attach the composition onto the surface of the base material in the arbitrary form, for example, in the form of islands, or so that a part of the surface of the base material is exposed, by scattering the antiviral composition on a surface of a base material. A polymerization reaction, a crosslinking reaction, or the like of a monomer or an oligomer that is the uncured electromagnetic curable resin, easily proceeds by irradiating the composition with an electromagnetic wave such as an ultraviolet ray. It is possible to form the cured resin that is attached onto the surface of the base material in the form of islands or is attached so that a part of the surface of the base material is exposed. The cured resin is excellent in transparency with respect to the base material, the visibility of the design of the surface of the base material, and adhesiveness with respect to the base material.

In the present invention, the scattering indicates that the antiviral composition containing the copper compound, the uncured electromagnetic curable resin, the dispersion medium, and the polymerization initiator is attached onto the surface of the base material in a state of being divided into a plurality of portions. In this case, it is preferable that the composition is attached onto the surface of the base material in a state of being divided into as many portions as possible.

In the antiviral composition of the first invention, it is preferable that the polymerization initiator is a photopolymerization initiator.

This is because it is possible to polymerize the uncured electromagnetic curable resin by a comparatively simple method of irradiating the uncured electromagnetic curable resin with light. In addition, the photopolymerization initiator has reducing power with respect to copper ions, and thus, it is possible to increase the amount of copper (I) having a high antiviral active force.

In general, a compound indicates a covalent compound and an ionic compound, and a complex is not included in the compound. Accordingly, a copper complex (a copper complex salt) is not included in the copper compound of the present invention, and an amino-acid salt of copper also is not included in the copper compound of the present invention. The copper compound of the present invention indicates a covalent compound containing copper and an ionic compound containing copper. In other words, the copper compound of the first invention is a copper compound (excluding a copper complex).

In the antiviral composition of the first invention, it is preferable that the copper compound is at least one or more selected from a sulfate of copper, a carboxylate of copper, a nitrate of copper, a chloride of copper, a phosphate of copper, and alkoxide of copper, as an ionic compound. In addition, examples of a covalent compound of copper include an oxide of copper, a hydroxide of copper, and the like.

In the antiviral composition of the first invention, it is preferable that the copper compound is a divalent copper compound (a copper compound (II)). This is because a monovalent copper compound (a copper compound (I)) is insoluble in water that is a dispersion medium, and, thus, is formed into a particulate shape, and is poor in dispersibility. In addition, there is also an advantage that the divalent copper compound is added into the antiviral composition, and the divalent copper compound is reduced, and thus, it is possible to simply form a state in which the monovalent copper compound and the divalent copper compound coexist. A water-soluble divalent copper compound is optimal.

In the antiviral composition of the first invention, it is preferable that the copper compound is a carboxylate of copper, a hydroxide of copper, an oxide of copper, or a water-soluble inorganic salt of copper.

In the antiviral composition of the first invention, in a case where the copper compound is the carboxylate of copper or the water-soluble inorganic salt of copper, it is possible to allow the copper compound exposed on the surface of the cured resin in a state capable of being in contact with a virus to exhibit excellent antiviral properties, at the time of forming the cured resin on the surface of the base material.

The carboxylate of copper is more preferable as the copper compound. This is because a carboxylic acid has a COOH group, is excellent in affinity with respect to a resin, is easily retained by the cured resin, and is difficult to be eluted in water, compared to other inorganic salts of copper, and thus, is excellent in water resistance. In addition, since the hydroxide of copper also has an OH group, forms a hydrogen bond with a functional group in a resin. The hydroxide of copper is easily retained by the cured resin, and is difficult to be eluted in water, and thus, is excellent in the water resistance.

Note that, the electromagnetic curable resin is insoluble in water after curing, and the cured resin has water resistance.

In the antiviral composition of the first invention, it is preferable that the electromagnetic curable resin is at least one selected from the group consisting of an acryl resin, a urethane acrylate resin, a polyether resin, a polyester resin, an epoxy resin, and an alkyd resin.

Note that, in the antiviral composition of the present invention, the electromagnetic curable resin indicates a resin that is manufactured by allowing a polymerization reaction, a crosslinking reaction, or the like of a monomer or an oligomer that is a raw material to proceed with the irradiation of an electromagnetic wave.

In the antiviral composition of the first invention, in a case where the electromagnetic curable resin is at least one selected from the group consisting of the acryl resin, the urethane acrylate resin, the polyether resin, the polyester resin, the epoxy resin, and the alkyd resin, the cured resin has transparency, and is also excellent in the adhesiveness with respect to the base material.

In the antiviral composition of the first invention, it is preferable that the dispersion medium is alcohol or water.

In the antiviral composition of the first invention, in a case where the dispersion medium is alcohol or water, the copper compound is excellently dispersed in the dispersion medium, and as a result thereof, it is possible to form the cured resin in which the copper compound is excellently dispersed.

The antiviral composition of the first invention, preferable contains a water-insoluble polymerization initiator: This is because the water-insoluble polymerization initiator is not eluted even in a case of being in, contact with water, and thus, the cured resin is not degraded, and the copper compound is not desorbed.

It is assumed that even in a case where the copper compound is soluble in water, it is possible to suppress the desorption of the copper compound insofar as the copper compound can be retained by the cured resin, but in a case where a water-soluble substance is contained in the cured resin, a holding power of the cured resin with respect to the copper compound decreases, and the copper compound is desorbed.

In addition, it is preferable that the water-insoluble polymerization initiator is a photopolymerization initiator. This is because it is possible to allow a polymerization reaction to easily proceed by light such as a visible light ray or an ultraviolet ray.

In the antiviral composition of the first invention, it is preferable to use a photopolymerization initiator having reducing power. This is because the photopolymerization initiator reduces the copper compound contained in the antiviral composition of the first invention to copper ions (I) having an antiviral effect, and is capable of suppressing copper ions (I) from being oxidized and from being changed to the copper ions (II) having poor antiviral properties.

In the antiviral composition of the first invention, it is preferable that the polymerization initiator is at least one selected from the group consisting of an alkyl phenone-based polymerization initiator, a benzophenone-based polymerization initiator, an acyl phosphine oxide-based polymerization initiator, an intramolecular hydrogen abstraction type polymerization initiator, and an oxime ester-based polymerization initiator.

In the antiviral composition of the first invention, in a case, where the polymerization initiator is at least one selected from the group consisting of the alkyl phenone-based polymerization initiator, the benzophenone-based polymerization initiator, the acyl phosphine oxide-based polymerization initiator, the intramolecular hydrogen abstraction type polymerization initiator, and the oxime ester-based polymerization initiator, a polymerization reaction easily proceeds by irradiating the composition with an electromagnetic wave such as an ultraviolet ray, after forming the composition on the surface of the base material, and drying the composition. As a result the electromagnetic curable resin can be easily cured, and the cured resin can be formed.

It is particularly preferable that the polymerization initiator is at least one or more selected from an alkyl phenone-based polymerization initiator, and benzophenone or a derivative thereof.

In the antiviral composition of the first invention, specifically, it is preferable that the polymerization initiator is at least one or more selected from an alkyl phenone-based polymerization initiator, and benzophenone or a derivative thereof, in particular, it is preferable that the polymerization initiator is benzophenone or a derivative thereof.

This is because such polymerization initiators has particularly high reducing power with respect to copper, and is excellent in an effect capable of maintaining the state of copper ions (I) for a long period of time.

In the antiviral composition of the first invention, it is preferable that the polymerization initiator includes an alkyl phenone-based polymerization initiator and a benzophenone-based polymerization initiator, a concentration of the alkyl phenone-based polymerization initiator is 0.5 to 3.0 wt % with respect to the electromagnetic curable resin, and a concentration of the benzophenone-based polymerization initiator is 0.5 to 2.0 wt % with respect to the electromagnetic curable resin.

This is because even in a case where an irradiation time of an electromagnetic wave is short, it is possible to attain a high crosslinking density. It is preferable that a ratio of the alkyl phenone-based polymerization initiator to the benzophenone-based polymerization initiator is Alkyl Phenone-Based Polymerization Initiator/Benzophenone-Based Polymerization Initiator=1/1 to 4/1, in a weight ratio. This is because it is possible to attain a high crosslinking density, it is possible to improve abrasion resistance by increasing the hardness of the cured material, and it is possible to increase the reducing power with respect to copper. It is preferable that the crosslinking density is greater than or equal to 85%, in particular, is greater than or equal to 95%.

A method for manufacturing an antiviral substrate of the first invention, includes: a scattering step of scattering an antiviral composition containing a copper compound, an uncured electromagnetic curable resin, a dispersion medium, and a polymerization initiator, on a surface of a base material; and a curing step of irradiating the uncured electromagnetic curable resin in the antiviral composition that is scattered on it in the scattering step, with an electromagnetic wave, and of curing the electromagnetic curable resin.

In addition, a method for manufacturing an antiviral substrate of the first invention, includes: a scattering step of scattering an antiviral composition containing a copper compound, an, uncured electromagnetic curable resin, a dispersion medium, and a polymerization initiator; on a surface of a base material; a drying step of drying the antiviral composition that is scattered on it in the scattering step, and of removing the dispersion medium; and a curing step of irradiating the uncured electromagnetic curable resin in the antiviral composition from which the dispersion, medium is removed in the drying step, with an electromagnetic wave, and of curing the electromagnetic curable resin.

In the method for manufacturing an antiviral substrate of the first invention, it is possible to attach the antiviral composition onto the surface of the base material by scattering the antiviral composition containing the copper compound, the uncured electromagnetic curable resin, the dispersion medium, and the polymerization initiator on the surface of the base material. A polymerization reaction, a crosslinking reaction, or the like of a monomer or an oligomer that is the uncured electromagnetic curable resin, easily proceeds by irradiating the composition with the electromagnetic wave simultaneously with the drying step or after the drying step. As a result, the cured resin containing the copper compound can be comparatively easily formed in a state where the cured resin is scattered in the form of islands on the surface of the base material or a part of the surface of the base material is exposed. Since the resin is cured and contracted, it is possible to manufacture the antiviral substrate excellent in the antiviral properties, of the copper compound by exposing a part of the copper compound on the surface of the cured resin to be in contact with a virus in a state capable of being in contact with the virus.

The drying can be performed by an infrared ray lamp, a heater, or the like, and the drying and the curing may be simultaneously performed by the irradiation of the electromagnetic wave.

In the method for manufacturing an antiviral substrate of the first invention, the electromagnetic wave that is applied to the uncured electromagnetic curable resin is not limited, and examples of the electromagnetic wave include an ultraviolet ray (UV), an infrared ray, a visible light ray, a microwave, an electron beam (EB), and the like.

Since the obtained cured resin is scattered in the form of islands on the surface of the base material, or a portion in which the cured resin exists and a portion in which the cured resin does not exist are mixed, there is a portion in which the surface of the base material is exposed, the thickness of the cured resin also decreases, and thus, it is possible to prevent a decrease in the transmittance of a visible light ray.

Further, since the cured resin is scattered in the form of islands, or the portion in which the cured resin exists and the portion in which the cured resin does not exist are mixed, it is possible to decrease the area of the cured resin covering the base material and to suppress a residual stress or a stress generated at the time of a thermal cycle, and it is possible to form the cured resin having high adhesiveness with respect to the base material.

In the method for manufacturing an antiviral substrate of the first invention, a carboxylate of copper, a hydroxide of copper, an oxide of copper, or a water-soluble inorganic salt of copper is preferable as the copper compound, and the carboxylate of copper is more preferable as the copper compound.

In the method for manufacturing an antiviral substrate of the first invention, in a case where the copper compound is the carboxylate of copper or the water-soluble inorganic salt of copper, it is possible for the copper compound exposed on the cured resin in a state capable of being in contact with a virus to exhibit excellent antiviral properties, at the time of forming the cured resin on the surface of the base material.

In the method for manufacturing an antiviral substrate of the first invention, it is preferable that the copper compound is a divalent copper compound (a copper compound (II)). This is because a monovalent copper compound (a copper compound (I)) is not dissolved in water that is a dispersion medium, and thus, is localized into a particulate shape, and is not homogeneously dispersed in the cured resin. In addition, there is also an advantage that is simply forming a state in which the monovalent copper compound and the divalent copper compound coexist in an ultraviolet-curable cured resin, by adding the divalent copper compound into the antiviral composition to reduce the divalent copper compound. It is optimal to use a water-soluble divalent copper compound.

In the method for manufacturing an antiviral substrate of the first invention, it is preferable that the electromagnetic curable resin is at least one selected from the group consisting of an acryl resin, a urethane acrylate resin, a polyether resin, a polyester resin, an epoxy resin, and an alkyd resin.

Note that, in the method for manufacturing an antiviral substrate of the first invention, the electromagnetic curable resin indicates a resin that is manufactured by allowing a polymerization reaction, a crosslinking reaction, or the like of a monomer or an oligomer that is a raw material to proceed with the Irradiation of an electromagnetic wave.

In the method for manufacturing an antiviral substrate of the first invention, in a case where the electromagnetic curable resin is at least one selected from the group consisting of the acryl resin, the urethane acrylate resin, the polyether resin, the polyester resin, the epoxy resin, and the alkyd resin, the cured resin has transparency, and is also excellent in the adhesiveness with respect to the base material.

In the method for manufacturing an antiviral substrate of the first invention, it is preferable that the dispersion medium is alcohol or water.

In the method for manufacturing an antiviral substrate of the first invention, in a case where the dispersion medium is alcohol or water, the copper compound or the uncured electromagnetic curable resin is easily excellently dispersed in the dispersion medium, and thus, it is possible to form the cured resin in which the copper compound is excellently dispersed.

In the method for manufacturing an antiviral substrate of the first invention, it is preferable that the antiviral composition contains a water-insoluble photopolymerization initiator. This is because the water-insoluble polymerization initiator is not eluted even in a case of being in contact with water, and thus, the cured resin is not degraded, and the copper compound is not desorbed.

It is assumed that even in a case where the copper compound is soluble in water, it is possible to suppress the desorption of the copper compound insofar as the copper compound can be retained by the cured resin, but, in a case where a water-soluble substance is contained in the cured resin, a holding power of the cured resin with respect to the copper compound decreases, and the copper compound is desorbed.

In addition, it is preferable that the water-insoluble polymerization initiator is a photopolymerization initiator. This is because it is possible to allow a polymerization reaction to easily proceed by light such as a visible light ray or an ultraviolet ray.

In the method for manufacturing an antiviral substrate of the first invention, it is preferable to use a photopolymerization initiator having reducing power. This is because the photopolymerization initiator reduces the copper compound to copper ions (I) having an antiviral effect, and is capable of suppressing copper ions (I) from being oxidized and from being changed to copper ions (II) having poor antiviral properties.

In the method for manufacturing an antiviral substrate of the first invention, it is preferable that the polymerization initiator is at least one selected from the group consisting of an alkyl phenone-based polymerization initiator, a benzophenone-based polymerization initiator, an acyl phosphine oxide-based polymerization initiator, an intramolecular hydrogen abstraction type polymerization initiator, and an oxime ester-based polymerization initiator.

In the method for manufacturing an antiviral substrate of the first invention, in a case where the polymerization initiator is at least one selected from the group consisting of the alkyl phenone-based polymerization initiator; the benzophenone-based polymerization initiator, the acyl phosphine oxide-based polymerization initiator, the intramolecular hydrogen abstraction type polymerization initiator, and the oxime ester-based polymerization initiator, a polymerization reaction of a monomer or an oligomer of the uncured electromagnetic curable resin, that is the resin described above, easily proceeds by irradiating the composition with the electromagnetic wave such as an ultraviolet ray, after attaching the composition onto the surface of the base material and drying the composition. As a result, the electromagnetic curable resin can be easily cured, and the cured resin can be formed.

In the method for manufacturing an antiviral substrate of the first invention, specifically, it is preferable that the polymerization initiator is at least one or more selected from an alkyl phenone-based polymerization initiator, and benzophenone or a derivative thereof, in particular, it is preferable that the polymerization initiator is benzophenone or a derivative thereof.

This is because such polymerization initiators has particularly high reducing power with respect to copper, and is excellent in an effect capable of maintaining the state of copper ions (I) for a long period of time.

In the method for manufacturing an antiviral substrate of the first invention, it is preferable that the polymerization initiator includes an alkyl phenone-based polymerization initiator and a benzophenone-based polymerization initiator, a concentration of the alkyl phenone-based polymerization initiator is 0.5 to 3.0 wt % with respect to the electromagnetic curable resin, and a concentration of the benzophenone-based polymerization initiator is 0.5 to 2.0 wt % with respect to the electromagnetic curable resin. This is because even in a case where an irradiation time of an electromagnetic, wave is short, it is possible to attain a high crosslinking density. It is preferable that a ratio of the alkyl phenone-based polymerization initiator to the benzophenone-based polymerization initiator is Alkyl Phenone-Based Polymerization Initiator/Benzophenone-Based Polymerization Initiator=1/1 to 4/1, in a weight ratio. This is because it is possible to attain a high crosslinking density, it is possible to improve abrasion resistance by increasing the hardness of the cured material, and it is possible to increase the reducing power with respect to copper. It is preferable that the crosslinking density is greater than or equal to 85%, in particular, is greater than or equal to 95%.

Subsequently, an antimicrobial substrate, an antimicrobial composition, and a method for manufacturing an antimicrobial substrate of the second invention will be described. The antimicrobial activity of the second invention is a concept including antiviral activity, antibacterial activity, antifungal activity, and mildew-proofing activity.

It is preferable that the antimicrobial substrate, the antimicrobial composition, and the method for manufacturing an antimicrobial substrate of the second invention are the antiviral substrate, the antiviral composition, and the method for manufacturing an antiviral substrate. This is because the effect of the second invention is the most remarkable.

In the antimicrobial substrate of the second invention, a cured material of a binder containing a copper compound and a polymerization initiator is fixed onto a surface of a base material, and at least a part of the copper compound is exposed on a surface of the cured material of the binder.

Note that, in general, a compound indicates a covalent compound and an ionic compound, and a complex is not included in the compound. Accordingly, a copper complex (a copper complex salt) is not included in the copper compound of the antimicrobial substrate, the antimicrobial composition, and the method for manufacturing an antimicrobial substrate of the second invention, and an amino-acid salt of copper is not also included in the copper compound of the present invention. The copper compound of the second invention indicates a covalent compound containing copper and an ionic compound containing copper. In other words, the copper compound of the antimicrobial substrate, the antimicrobial composition, and the method for manufacturing an antimicrobial substrate of the second invention is a copper compound (excluding a copper complex).

Note that, herein, the antimicrobial substrate may be a substrate having one type of activity selected from the antibacterial activity, the antifungal activity, and the mildew-proofing activity, may be a substrate having two types of activity, may be a substrate having three types of activity, or may be a substrate having all four types of activity, selected from the antiviral activity, the antibacterial activity, the antifungal activity, and the mildew-proofing activity.

In the present invention, the antimicrobial composition may be a composition having one type of activity, selected from the antiviral activity, the antibacterial activity, the antifungal activity, and the mildew-proofing activity, may be a composition having two types of activity, may be a composition having three types of activity, or may be a composition having all four types of activity, selected from the antiviral activity, the antibacterial activity, the antifungal activity, and the mildew-proofing activity.

The method for manufacturing an antimicrobial substrate is a method for manufacturing an antimicrobial substrate having the effects described above, by using an antimicrobial composition having the effects described above.

In the antimicrobial substrate of the second invention, the cured material of the binder containing the copper compound and the polymerization initiator is fixedly formed on the surface of the base material, and at least a part of the copper compound is exposed on the surface of the cured material of the binder, and thus, the copper compound is easily in contact with a virus, and it is possible to sufficiently exhibit an effect as a substrate having antimicrobial properties based on the copper compound.

The antimicrobial substrate of the second invention contains the polymerization initiator, and since the polymerization initiator generates radicals or ions, and they are capable of reducing the copper compound, it is possible to increase antimicrobial activity of copper. In general, copper (I) has antimicrobial activity higher than that of copper (II), and the antimicrobial activity is improved by reducing copper. In addition, the polymerization initiator has hydrophobic properties and is insoluble in water, and thus, the antimicrobial substrate containing the cured binder excellent in water resistance is obtained.

The present inventors have first found that such a polymerization initiator has reducing power with respect to copper, and the copper compound is reduced by the polymerization initiator, and thus, it is possible to increase an existence ratio of copper (I).

In the antimicrobial substrate of the second invention, it is preferable that at least a part of the copper compound is exposed on the surface of the cured material of the binder, in a state capable of being in contact with a microorganism such as a virus. This is because in a case where at least a part of the copper compound is exposed in a state capable of being in contact with a microorganism such as a virus, it is possible to deactivate the function of the microorganism such as the virus.

In addition, in the antimicrobial substrate of the second invention, the cured material of the binder is fixedly formed by being scattered in the form of islands on the surface of the base material, or a region in which the cured material of the binder is fixedly formed on the surface of the base material and a region in which the cured material of the binder is not fixedly formed on the surface of the base material are mixed. Therefore, there is a portion in which the cured material of the binder is not fixed and the surface of the base material surface is exposed on the surface of the base material, and thus, it is possible to prevent a decrease in the transmittance of a visible light ray with respect to the surface of the base material. For this reason, in a case where the base material is a transparent material, the transparency of the base material does not decrease, and in a case where the design of a predetermined pattern or the like is formed on the surface of the base material, the appearance of the design or the like is not impaired.

In addition, in the antimicrobial substrate of the second invention, the cured material of the binder is fixedly formed by being scattered in the form of islands or the region in which the cured material of the binder is fixedly formed on the surface of the base material and the region in which the cured material of the binder is not fixedly formed on the surface of the base material are mixed. Therefore, it is possible to decrease a contact area between the cured material of the binder and the surface of the base material and to suppress a residual stress of the cured material of the binder or a stress generated at the time of a thermal cycle, and it is possible to form the cured material of the binder having high adhesiveness with respect to the base material.

In addition, in a case where the cured material of the binder is fixed on the surface of the base material by being scattered in the form of islands or the region in which the cured material of the binder is fixedly formed on the surface of the base material and the region in which the cured material of the binder is not fixedly formed on the surface of the base material are mixed, a surface area of the cured binder increases, and a microorganism such as a virus is easily trapped between the cured binders, and thus, a probability of contact between the cured binder having antimicrobial performance and the microorganism increases, and high antimicrobial performance can be expressed.

Further, in the antimicrobial substrate of the second invention, the cured binder may be formed in the form of a film.

In a case where the cured binder having antimicrobial properties is formed in the form of a film, the surface of the cured binder is slippery, compared to a case where the cured binder is dispersed and fixed in the form of islands on the surface of the base material or the region in which the cured binder is fixedly formed on the surface of the base material and the region in which the cured binder is not fixedly formed on the surface of the base material are mixed, and thus, is excellent in resistance with respect to wiping cleaning. On the other hand, in a case where the cured binder is fixedly formed on the base material in the form of a film, the visibility of the design of the surface of the base material, the antimicrobial performance, and the adhesiveness of the cured binder with respect to the base material after a thermal cycle decrease, compared to a case where the cured binder is dispersed and fixed in the form of islands on the surface of the base material or the region in which the cured binder is fixedly formed on the surface of the base material and the region in which the cured binder is not fixedly formed on the surface of the base material are mixed.

It is preferable that the thickness of a film formed of the cured binder is 0.5 to 100 µm. This is because in a case where the film is excessively thick, a stress is generated, the film is peeled off, and the antimicrobial properties decrease, and in a case where the film is excessively thin, it is not possible to sufficiently exhibit the antimicrobial properties.

In a case where the design is not implemented on the base material or the antimicrobial performance is prior to the designability, as described above, the film formed of the cured binder may be formed on the base material.

In the antimicrobial substrate of the second invention, it is preferable that the cured material of the binder is formed of a porous body.

This is because the copper compound is easily in contact with an atmosphere medium such as the air, and thus, copper ions (I) reduce water or oxygen in the air and generate active oxygen, a hydrogen peroxide solution or super oxide anions, hydroxy radicals, and the like. As a result, protein configuring a microorganism is destroyed, and the microorganism is easily deactivated.

In the antimicrobial substrate of the second invention, it is preferable that the polymerization initiator includes a photopolymerization initiator. This is because in a case of including the photopolymerization initiator, the copper compound is reduced to copper ions (I) having an antimicrobial effect, and it is possible to prevent copper ions (I) from being oxidized and from being changed to copper ions (II) having poor antimicrobial properties.

In the antimicrobial substrate of the second invention, it is preferable that the cured material of the binder contains a water-insoluble polymerization initiator. This is because the polymerization initiator is not eluted even in a case of being in contact with water, and thus, the antimicrobial substrate containing the cured binder excellent in water resistance is obtained.

In the antimicrobial substrate of the second invention, it is preferable that the polymerization initiator is at least one or more selected from an alkyl phenone-based polymerization initiator, and benzophenone or a derivative thereof, in particular, it is preferable that the polymerization initiator is benzophenone or a derivative thereof.

This is because such polymerization initiators has particularly high reducing power with respect to copper, and is excellent in an effect capable of maintaining the state of copper ions (I) for a long period of time.

In the antimicrobial substrate of the second invention, it is preferable that the polymerization initiator includes an alkyl phenone-based polymerization initiator and a benzophenone-based polymerization initiator, a concentration of the alkyl phenone-based polymerization initiator is 0.5 to 3.0 wt % with respect to the binder, and a concentration of the benzophenone-based polymerization initiator is 0.5 to 2.0 wt % with respect to the binder. This is because even in a case where an irradiation time of an electromagnetic wave is short, it is possible to attain a high crosslinking density.

It is preferable that a ratio of the alkyl phenone-based polymerization initiator to the benzophenone-based polymerization initiator is Alkyl Phenone-Based Polymerization Initiator/Benzophenone-Based Polymerization Initiator=1/1 to 4/1, in a weight ratio. This is because it is possible to attain a high crosslinking density, it is possible to increase the hardness of the cured material and to improve abrasion resistance, and it is possible to increase the reducing power with respect to copper. It is preferable that the crosslinking density is greater than or equal to 85%, in particular, is greater than or equal to 95%.

In the antimicrobial substrate of the second invention, it is preferable that the binder is at least one or more selected from an organic binder, an inorganic binder, a mixture of an organic binder and an inorganic binder, and an organic-inorganic hybrid binder. This is because it is possible to comparatively easily fixedly form the cured binder excellent in the adhesiveness, on the surface of the base material.

It is preferable that the organic binder is at least one or more selected from the group consisting of an electromagnetic curable resin and a thermosetting resin. This is because such an organic binder is capable of fixing the copper compound onto the surface of the base material after resin is cured, by irradiating resin with an electromagnetic wave or heating the resin. In addition, such a resin is advantageous since the resin does not decrease reducing power of the polymerization initiator with respect to copper. At least one or more selected from an acryl resin, a urethane acrylate resin, and an epoxy acrylate resin can be used as the electromagnetic curable resin. In addition, at least one or more selected from an epoxy resin, a melamine resin, and a phenol resin can be used as the thermosetting resin.

In the antimicrobial substrate of the second invention, it is preferable that the binder is at least one selected from the group consisting of an acryl resin, a urethane acrylate resin, a polyether resin, a polyester resin, an epoxy resin, an alkyd resin, silica sol, alumina sol, zirconia sol, titania sol, metal alkoxide, and liquid glass.

In the antimicrobial substrate of the second invention, in the copper compound, it is preferable that a ratio (Cu(I)/Cu (II)) of the number of ions of Cu(I) and Cu(II) contained in the copper compound, which is calculated by measuring bond energy corresponding to Cu(I) and Cu(II) in a range of 925 to 955 eV for 5 minutes, by an X-ray photoelectron spectroscopy analysis method, is 0.4 to 50. This is because the antimicrobial substrate that is more excellent in the antimicrobial properties is obtained. In particular, it is more preferable that the ratio (Cu(I)/Cu(II)) of the number of ions of Cu(I) and Cu(II) contained in the copper compound is 0.5 to 50. The ratio (Cu(I)/Cu(II)) of the number of ions of Cu(I) and Cu(II) contained in the copper compound is more desirably 1.0 to 4.0, in particular, is more desirably 1.4 to 2.9, and is optimally 1.4 to 1.9, and thus, the antiviral substrate more excellent in the antiviral properties is obtained.

In addition, in a case where the cured binder is dispersed and fixed in the form of islands or the region in which the cured binder is fixedly formed on the surface of the base material and the region in which the cured binder is not fixedly formed on the surface of the base material are mixed, it is preferable that Cu(I)/Cu(II) in the copper compound is adjusted to 0.4/1 to 4.0/1, since it is possible to increase the antiviral properties.

In the antimicrobial substrate of the second invention, it is possible to adjust the ratio Cu(I)/Cu(II) in the copper compound, in accordance with the selection of the binder, the polymerization initiator, and the copper compound, the adjustment of the concentration thereof, and the adjustment of an irradiation time or the intensity of an electromagnetic wave such as an ultraviolet ray.

In the antimicrobial substrate of the second invention, it is preferable that in the cured material of the binder, a maximum width in a direction parallel to the surface of the base material is 0.1 to 500 μm, and an average value of thicknesses is 0.1 to 20 μm. This is because in a case where the maximum width of the cured binder in the direction parallel to the surface of the base material is 0.1 to 500 μm, a ratio of a portion in which the surface of the base material is not covered with the cured binder increases, and a decrease in a light transmittance can be suppressed. In addition, in a case where the average value of the thicknesses of the cured binder is 0.1 to 20 μm, since the cured binder is thin, it is difficult to form a continuous layer of the cured binder, the cured binder is easily scattered in the form of islands or the region in which the cured binder is fixedly formed on the surface of the base material and the region in which the cured binder is not fixedly formed on the surface of the base material are easily mixed, the light transmittance easily increases, and an antimicrobial effect is easily obtained.

It is more preferable that in the cured material of the binder, the maximum width in the direction parallel to the surface of the base material is 1 to 100 μm, and the average value of the thicknesses is 1 to 20 μm.

The antimicrobial composition of the second invention, contains: a copper compound; an uncured binder; a dispersion medium; and a polymerization initiator.

Since the antimicrobial composition of the second invention contains the copper compound, the uncured binder, the dispersion medium, and the polymerization initiator, it is possible to set the antimicrobial composition in a state where a region in which the cured binder is fixedly formed on a surface of a base material and a region in which the cured binder is not fixedly formed on the surface of the base material are mixed or a state where the cured binder is scattered in the form of islands, by attaching the antimicrobial composition onto the surface of the base material. It is possible to form the cured binder in the form of an islands, which is excellent in transparency with respect to the base material and the adhesiveness with respect to the base material, or in a state where the region in which the cured binder is fixedly formed and the region in which the cured binder is not fixedly formed are mixed, by curing the antimicrobial composition after a drying step.

In addition, in a case where the cured material of the binder is fixed by being scattered in the form of islands or the region in which the cured material of the binder is fixedly formed on the surface of the base material and the region in which the cured material of the binder is not fixedly formed on the surface of the base material are mixed, a surface area of the cured binder increases, and a microorganism such as a virus is easily trapped between the cured binders, and thus, a probability of contact between the cured binder having antimicrobial performance and the microorganism increases, and high antimicrobial performance can be expressed.

In addition, since the antimicrobial composition of the second invention contains the copper compound, the uncured binder, the dispersion medium, and the polymerization initiator, it is also possible to form the antimicrobial composition on the surface of the base material in the form of a film by attaching the antimicrobial composition onto the surface of the base material, and excellent in abrasion resistance, and the antimicrobial performance does not decrease even at the time of wiping cleaning.

However, in a case where the antimicrobial composition is formed on the surface of the base material in the form of a film, the visibility of the design of the surface of the base material, the antimicrobial performance, and the adhesiveness of the cured binder with respect to the base material after a thermal cycle decrease, compared to a case where the cured binder is dispersed and fixed in the form of islands or the region in which the cured binder is fixedly formed on the surface of the base material and the region in which the cured binder is not fixedly formed on the surface of the base material are mixed.

In addition, the antimicrobial composition of the second invention contains the polymerization initiator. Since the polymerization initiator generates radicals or ions, and they are capable of reducing the copper compound, it is possible to increase antimicrobial activity of copper. In general, copper (I) has antimicrobial activity higher than that of copper (II), and the antimicrobial activity is improved by reducing copper.

In the antimicrobial composition of the second invention, it is preferable that the polymerization initiator is a photopolymerization initiator. This is because in a case of including the photopolymerization initiator, the copper compound is reduced to copper ions (I) having an antimicrobial effect, and it is possible to suppress copper ions (I) from being oxidized and from being changed to copper ions (II) having poor antimicrobial properties.

In the antimicrobial composition of the second invention, it is preferable that the copper compound is a carboxylate of copper, a hydroxide of copper, an oxide of copper, or a water-soluble inorganic salt of copper, and it is more preferable that the copper compound is a carboxylate of copper. This is because it is possible for the copper compound exposed on the surface of the cured binder in a state capable of being in contact with a virus to exhibit excellent antimicrobial properties, at the time of forming the cured binder on the surface of the base material.

In the antimicrobial composition of the second invention, it is preferable that the copper compound is a divalent copper compound (a copper compound (II)). This is because a monovalent compound (a copper compound (I)) is insoluble in water that is a dispersion medium, and thus, the monovalent compound is localized into a particulate shape, is insufficiently dispersed in the binder, and is poor in the antimicrobial activity. In addition, there is also an advantage that in a case where the divalent copper compound is added into the antimicrobial composition, the divalent copper compound is reduced, and thus, it is possible to simply form a state in which the monovalent copper compound and the divalent copper compound coexist in the cured binder. It is optimal to use a water-soluble divalent copper compound.

In the antimicrobial composition of the second invention, it is preferable that the binder is at least one or more selected from the group consisting of an organic binder, an inorganic binder, a mixture of an organic binder and an inorganic binder, and an organic-inorganic hybrid binder. This is because it is possible to comparatively easily fixedly form the cured binder excellent in the adhesiveness, on the surface of the base material.

It is preferable that the organic binder is at least one or more selected from the group consisting of an electromagnetic curable resin and a thermosetting resin.

This is because in a case where such an organic binder is irradiated with an electromagnetic wave or is heated to cure the resin, the organic binder is capable of fixing the copper compound onto the surface of the base material. In addition, such a resin is advantageous since the resin does not decrease reducing power of the polymerization initiator with respect to copper. At least one or more selected from an acryl resin, a urethane acrylate resin, and an epoxy acrylate resin can be used as the electromagnetic curable resin. In addition, at least one or more selected from an epoxy resin, a melamine resin, and a phenol resin can be used as the thermosetting resin.

In the antimicrobial composition of the second invention, it is preferable that the binder is at least one selected from the group consisting of an acryl resin, a urethane acrylate resin, a polyether resin, a polyester resin, an epoxy resin, an alkyd resin, silica sol, alumina sol, zirconia sol, titania sol, metal alkoxide, and liquid glass.

In the antimicrobial composition of the second invention, it is preferable that the dispersion medium is alcohol or water. This is because the copper compound is excellently dispersed in the dispersion medium, and as a result thereof, it is possible to form the cured binder in which the copper compound is excellently dispersed.

In the antimicrobial composition of the second invention, it is preferable that the polymerization initiator is a water-insoluble polymerization initiator. This is because the polymerization initiator is not eluted even in a case of being in contact with water, and thus, the cured binder excellent in the water resistance is obtained.

In the antimicrobial composition of the second invention, it is preferable that the polymerization initiator is at least one selected from the group consisting of an alkyl phenone-based polymerization initiator, a benzophenone-based polymerization initiator, an acyl phosphine oxide-based polymerization initiator, an intramolecular hydrogen abstraction type polymerization initiator, and an oxime ester-based polymerization initiator, and it is more preferable that the polymerization initiator is at least one or more selected from an alkyl phenone-based polymerization initiator, and benzophenone or a derivative thereof.

This is because such polymerization initiators has particularly high reducing power with respect to copper, and is excellent in an effect capable of maintaining the state of copper ions (I) for a long period of time.

In the antimicrobial composition of the second invention, it is preferable that the polymerization initiator includes an alkyl phenone-based polymerization initiator and a benzophenone-based polymerization initiator, a concentration of the alkyl phenone-based polymerization initiator is 0.5 to 3.0 wt % with respect to the binder, and a concentration of the benzophenone-based polymerization initiator is 0.5 to 2.0 wt % with respect to the binder. This is because even in a case where an irradiation time of an electromagnetic wave is short, it is possible to attain a high crosslinking density.

It is preferable that a ratio of the alkyl phenone-based polymerization initiator to the benzophenone-based polymerization initiator is Alkyl Phenone-Based Polymerization Initiator/Benzophenone-Based Polymerization Initiator=1/1 to 4/1, in a weight ratio. This is because it is possible to attain a high crosslinking density, it is possible to increase the hardness of the cured material and to improve abrasion resistance, and it is possible to increase the reducing power with respect to copper. It is preferable that the crosslinking density is greater than or equal to 85%, in particular, is greater than or equal to 95%.

The method for manufacturing an antimicrobial substrate of the second invention, includes:

(1) an attaching step of attaching an antimicrobial composition containing a copper compound, an uncured binder, a dispersion medium, and a polymerization initiator, onto a surface of a base material; and a curing step of curing the uncured binder in the antimicrobial composition that is attached onto it in the attaching step, and of fixing a cured binder onto the surface of the base material.

In addition, another method for manufacturing an antimicrobial substrate of the second invention, includes:

(2) an attaching step of attaching an antimicrobial composition containing a copper compound, an uncured binder, a dispersion medium, and a polymerization initiator, onto a surface of a base material;

a drying step of drying the antimicrobial composition that is attached onto it in the attaching step, and of removing the dispersion medium; and a curing step of curing the uncured binder in the antimicrobial composition from which the dispersion medium is removed in the drying step, and of fixing a cured binder onto the surface of the base material.

In the method for manufacturing an antimicrobial substrate of the second invention, it is possible to attach the antimicrobial composition onto the surface of the base material by attaching the antimicrobial composition containing the copper compound, the uncured binder, the dispersion medium, and the polymerization initiator. It is possible to comparatively easily form the cured binder containing the copper compound by allowing a curing reaction of the antimicrobial composition to proceed simultaneously with the drying step or after the drying step. It is possible to manufacture the antimicrobial substrate excellent in the antimicrobial properties of the copper compound by exposing a part of the copper compound on the surface of the cured binder in a state capable of being in contact with a microorganism to be in contact with the microorganism.

In addition, contraction occurs at the time of curing the binder, and thus, it is possible to expose the copper compound on the surface of the binder in a case where the binder is cured and contracted.

In the method for manufacturing an antimicrobial substrate of the second invention, the drying or the heating can be performed by using an infrared ray lamp, a heater, or the like, and the drying and the curing may be simultaneously performed by the irradiation of an electromagnetic wave.

In (1) and (2) of the method for manufacturing an antimicrobial substrate of the second invention, it is preferable to include a step of irradiating the polymerization initiator with an electromagnetic wave of a predetermined wavelength, in order to express the reducing power of the polymerization initiator. An ultraviolet ray having high energy is preferably used as the electromagnetic wave. In a case of including the drying step, it is preferable that the step of irradiating the polymerization initiator with the electromagnetic wave is performed before and after the drying step or before and after the curing step.

In addition, in (1) and (2) of the method for manufacturing an antimicrobial substrate of the second invention, the antimicrobial composition may be attached onto the surface of the base material in the form of an islands, or the antimicrobial composition may be attached onto the surface of the base material after curing the binder, so that a region in which the cured binder is fixedly formed and a region in which the cured binder is not fixedly formed are mixed. Further, the antimicrobial composition may be attached in the form of a film.

The antimicrobial composition contains the polymerization initiator, and since the polymerization initiator generates radicals or ions, and they are capable of reducing the copper compound, it is possible to increase the antimicrobial activity of copper in the obtained antimicrobial substrate. In general, copper (I) has antimicrobial activity higher than that of copper (II), and the antimicrobial activity is improved by reducing copper.

In the method for manufacturing an antimicrobial substrate of the second invention, it is preferable that the copper compound is a carboxylate of copper, a hydroxide of copper, an oxide of copper, or a water-soluble inorganic salt of copper, and it is more preferable that the copper compound is a carboxylate of copper. This is because it is possible for the copper compound exposed on the surface of the cured binder in a state capable of being in contact with a microorganism to exhibit excellent antimicrobial properties, at the time of forming the cured binder on the surface of the base material. In addition, a carboxylic acid has a COOH group, is excellent in affinity with respect to a resin, is easily retained by the cured binder, and is difficult to be eluted in water, compared to other inorganic salts of copper, oxides of copper, or hydroxides of copper, and thus, the carboxylic acid is excellent in the water resistance In the method for manufacturing an antimicrobial substrate of the second invention, it is preferable that the binder is at least one or more selected from an organic binder, an inorganic binder, a mixture of an organic binder and an inorganic binder, and an organic-inorganic hybrid binder. This is because it is possible to comparatively easily fix the cured binder excellent in the adhesiveness onto the surface of the base material.

It is preferable that the organic binder is at least one or more selected from the group consisting of an electromagnetic curable resin and a thermosetting resin. This is because such an organic binder is capable of fixing the copper compound onto the surface of the base material after resin is cured, by irradiating the resin with an electromagnetic wave or heating the resin. In addition, such a resin is advantageous since the resin does not decrease reducing power of the polymerization initiator with respect to copper.

At least one or more selected from an acryl resin, a urethane acrylate resin, and an epoxy acrylate resin can be used as the electromagnetic curable resin. In addition, at least one or more selected from an epoxy resin, a melamine resin, and a phenol resin can be used as the thermosetting resin.

In the method for manufacturing an antimicrobial substrate of the second invention, it is preferable that the binder is at least one selected from the group consisting of an acryl resin, a urethane acrylate resin, a polyether resin, a polyester resin, an epoxy resin, an alkyd resin, silica sol, alumina sol, zirconia sol, titania sol, metal alkoxide, and liquid glass.

In the method for manufacturing an antimicrobial substrate of the second invention, it is preferable that the dispersion medium is alcohol or water. This is because the copper compound or the uncured binder is easily excellently dispersed in the dispersion medium, and thus, it is possible to form the cured binder in which the copper compound is excellently dispersed.

In the method for manufacturing an antimicrobial substrate of the second invention, it is preferable that the polymerization initiator is a water-insoluble photopolymerization initiator. This is because the photopolymerization initiator is not eluted even in a case of being in contact with water, and thus, the antimicrobial substrate containing the cured binder excellent in the water resistance is obtained.

In the method for manufacturing an antimicrobial substrate of the second invention, it is preferable that the polymerization initiator is at least one selected from the group consisting of an alkyl phenone-based polymerization initiator, a benzophenone-based polymerization initiator, an acyl phosphine oxide-based polymerization initiator, an intramolecular hydrogen abstraction type polymerization initiator, and an oxime ester-based polymerization initiator, it is more preferable that the polymerization initiator is at least one or more selected from an alkyl phenone-based polymerization initiator, and benzophenone or a derivative thereof, and it is even more preferable that the polymerization initiator is benzophenone or a derivative thereof. This is because such polymerization initiators has particularly high reducing power with respect to copper, and is excellent in an effect capable of maintaining the state of copper ions (I) for a long period of time.

It is preferable that the polymerization initiator includes an alkyl phenone-based polymerization initiator and a benzophenone-based polymerization initiator, a concentration of the alkyl phenone-based polymerization initiator is 0.5 to 3.0 wt % with respect to the binder, and a concentration of the benzophenone-based polymerization initiator is 0.5 to 2.0 wt % with respect to the binder. This is because even in a case where an irradiation time of an electromagnetic wave is short, it is possible to attain a high crosslinking density.

It is preferable that a ratio of the alkyl phenone-based polymerization initiator to the benzophenone-based polymerization initiator is Alkyl Phenone-Based Polymerization Initiator/Benzophenone-Based Polymerization Initiator=1/1 to 4/1, in a weight ratio. This is because it is possible to attain a high crosslinking density, it is possible to increase the hardness of the cured material and to improve abrasion resistance, and it is possible to increase the reducing power with respect to copper. It is preferable that the crosslinking density is greater than or equal to 85%, in particular, is greater than or equal to 95%.

According to the method for manufacturing an antimicrobial substrate of the second invention, it is possible to manufacture the antimicrobial substrate in which the cured binder is fixedly formed on the surface of the base material in the form of islands or the region in which the cured binder is fixedly formed on the surface of the base material and the region in which the cured binder is not fixedly formed on the surface of the base material are mixed. As a result thereof, it is possible to decrease the contact area between the cured binder and the surface of the base material and to suppress the residual stress of the cured binder or a stress generated at the time of a thermal cycle, and it is possible to form the cured binder having high adhesiveness with respect to the base material.

In a case where the cured material of the binder is fixed by being scattered in the form of islands or the region in which the cured material of the binder is fixedly formed on the surface of the base material and the region in which the cured material of the binder is not fixedly formed on the surface of the base material are mixed, the surface area of the cured binder increases, and a microorganism such as a virus is easily trapped between the cured binders, and thus, a probability of contact between the cured binder having antimicrobial performance and the microorganism increases, and high antimicrobial performance can be expressed.

According to the method for manufacturing an antimicrobial substrate of the second invention, the cured binder is fixedly formed on the surface of the base material in the form of a film, and thus, it is possible to manufacture the antimicrobial substrate excellent in durability with respect to wiping cleaning.

The surface of the cured binder having antimicrobial properties is slippery, compared to a case where the antimicrobial substrate is dispersed and fixed in the form of islands or the region in which the cured binder is fixedly formed on the surface of the base material and the region in which the cured binder is not fixedly formed on the surface of the base material are mixed, and thus, is excellent in resistance with respect to wiping cleaning.

On the other hand, in a case where the cured binder is fixedly formed on the base material in the form of a film, the visibility of the design of the surface of the base material, the antimicrobial performance, and the adhesiveness of the cured binder with respect to the base material after a thermal cycle decrease, compared to a case where the cured binder is dispersed and fixed in the form of islands or the region in which the cured binder is fixedly formed on the surface of the base material and the region in which the cured binder is not fixedly formed on the surface of the base material are mixed.

It is preferable that the antimicrobial substrate of the second invention is an antiviral substrate, it is preferable that the antimicrobial composition of the second invention is an antiviral composition, and it is preferable that the method for manufacturing an antimicrobial substrate of the second invention is a method for manufacturing an antiviral substrate.

In the antimicrobial substrate of the second invention, it is preferable that the polymerization initiator is a water-insoluble photopolymerization initiator, the binder is an electromagnetic curable resin, and in the copper compound (excluding a copper complex), a ratio (Cu(I)/Cu(II)) of the number of ions of Cu(I) and Cu(II) contained in the copper compound, which is calculated by measuring bond energy corresponding to Cu(I) and Cu(II) in the range of 925 to 955 eV for 5 minutes, by an X-ray photoelectron spectroscopy analysis method, is 0.4 to 50.

It is preferable that the water-insoluble photopolymerization initiator is a photopolymerization initiator having reducing power.

It is preferable that the cured binder is dispersed and fixed in the form of islands or the region in which the cured binder is fixedly formed on the surface of the base material and the region in which the cured binder is not fixedly formed on the surface of the base material are mixed. In this case, it is preferable that Cu(I)/Cu(II) in the copper compound is adjusted to 0.4/1 to 4.0/1.

It is preferable that the antimicrobial substrate is an antiviral substrate and/or an antifungal substrate.

In the antimicrobial composition of the second invention, it is preferable that the binder is an electromagnetic curable resin, the dispersion medium is water, the copper compound (excluding a copper complex) is a water-soluble divalent copper compound, and the polymerization initiator is a water-insoluble photopolymerization initiator.

It is preferable that the water-insoluble photopolymerization initiator is a photopolymerization initiator having reducing power.

It is preferable that the antimicrobial composition is used for an application in which the antimicrobial composition is attached on the base material by being scattered.

It is preferable that the antimicrobial composition is used as an antiviral composition and/or an antifungal composition. That is, it is preferable to use an antiviral composition and/or an antifungal composition of the antimicrobial composition.

In the method for manufacturing an antimicrobial substrate of the second invention, it is preferable that the binder contained in the antimicrobial composition is an electromagnetic curable resin, the dispersion medium is water, the copper compound (excluding a copper complex) is a water-soluble divalent copper compound, and the polymerization initiator is a water-insoluble photopolymerization initiator.

It is preferable that the water-insoluble photopolymerization initiator is a photopolymerization initiator having reducing power.

It is preferable that the method for manufacturing an antimicrobial substrate includes the step of irradiating the polymerization initiator with the electromagnetic wave.

It is preferable that the method for manufacturing an antimicrobial substrate is a method for manufacturing an antiviral substrate and/or a method for manufacturing an antifungal substrate.

DESCRIPTION OF EMBODIMENTS

Hereinafter, an antiviral substrate of the first invention will be described in detail.

In an antiviral substrate of the first invention, a cured material of an electromagnetic curable resin containing a copper compound is scattered in the form of islands on a surface of a base material, and at least a part of the copper compound is exposed on a surface of the cured material of the electromagnetic curable resin.

Figure 1A:
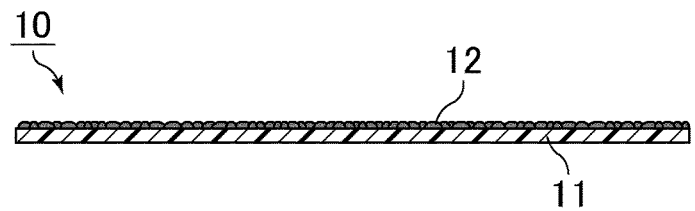
FIG. 1A is a sectional view schematically illustrating one embodiment of an antiviral substrate of the first invention.
Figure 1B:
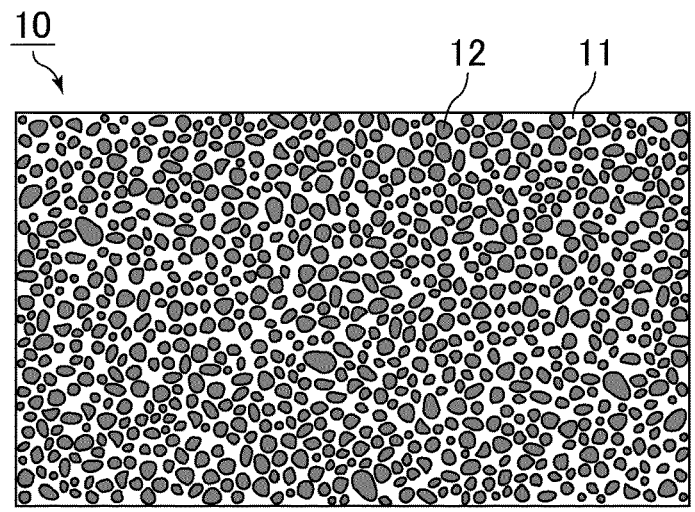
FIG. 1B is a plan view of the antiviral substrate illustrated in FIG. 1A.

FIG. 1A is a sectional view schematically illustrating one embodiment of the antiviral substrate of the first invention, and FIG. 1B is a plan view of the antiviral substrate illustrated in FIG. 1A.

As illustrated in FIGS. 1A and 1B, in an antiviral substrate 10 of the first invention, a cured material 12 of an electromagnetic curable resin that contains a copper compound and is formed of a porous body is scattered on the surface of a base material 11 in the form of islands.

The material of the base material of the antiviral substrate of the first invention is not limited, and examples of the material include a metal, ceramic such as glass, a resin, a fiber fabric, wood, and the like.

In addition, a member that is the base material of the antiviral substrate of the first invention is not also limited, and may be a protective film or a film for display of a touch panel, or may be an interior material, a wall material, window glass, a handrail, and the like in a building. In addition, the member may be a doorknob, a sliding key in the restroom, and the like. Further, the member may be an office machine, furniture, or the like, or may be a decorative sheet or the like that can be used in various applications in addition to the interior material.

It is preferable that the copper compound contained in the cured resin is a carboxylate of copper, a hydroxide of copper, an oxide of copper, or a water-soluble inorganic salt of copper.

An ionic compound of copper can be used as the carboxylate of copper, and examples of the carboxylate of copper include copper acetate, copper benzoate, copper phthalate, and the like.

An ionic compound of copper can be used as the water-soluble inorganic salt of copper, and examples of the water-soluble inorganic salt of copper include copper nitrate, copper sulfate, and the like.

Examples of other copper compounds include copper (methoxide), copper ethoxide, copper propoxide, copper butoxide, and the like, and examples of a covalent compound of copper include an oxide of copper, a hydroxide of copper, and the like.

Such a copper compound may be identical to or different from a copper compound that is added at the time of preparing an antiviral composition used for manufacturing the cured resin.

In the first invention, it is preferable that in the cured resin, a surface composition ratio obtained by an energy dispersive X-ray analyzer is calculated from a peak intensity of a characteristic X-ray of a carbon element and a copper element that are a main constituent element of a resin component, and a weight ratio is Cu:C=1.0:28.0 to 200.0.

In a case where the carbon element is less than 28.0 with respect to 1.0 of the copper element, irritant properties of the cured resin with respect to eyes are classified as an irritant, and thus, it is not possible to ensure safeness with respect to a human body, Cu falls off from the cured resin, and an antiviral function may be insufficient. On the other hand, in a case where the carbon element is greater than 200.0 with respect to 1.0 of the copper element, Cu is buried in the cured resin, and the antiviral function may be insufficient.

Figure 5:
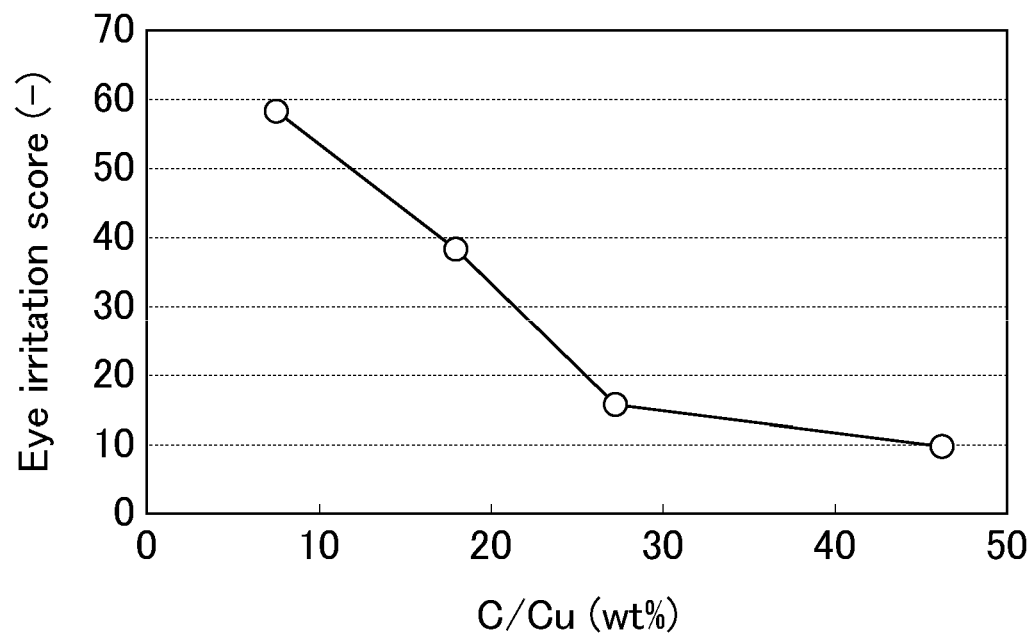
FIG. 5 is a graph illustrating relationship between a ratio C/Cu and a safeness (eye irritation) score.

FIG. 5 is a graph illustrating a relationship between a ratio C/Cu and a safeness (eye irritation) score. It is preferable that the value of the safeness score is low, and the safeness score may be less than or equal to 20. The safeness score of less than or equal to 20 corresponds to Cu:C=1.0:28.0 to 200.0.

In the antiviral substrate of the first invention, it is preferable that a ratio (Cu(I)/Cu(II)) of the number of ions of Cu(I) and Cu(II) contained in the copper compound, which is calculated by measuring bond energy corresponding to Cu(I) and Cu(II) in a range of 925 to 955 eV for 5 minutes, by an X-ray photoelectron spectroscopy analysis method, is 0.4 to 50. In a case where Cu(I) and Cu(II) coexist, antiviral performance increases, compared to a case where only Cu(I) exists. The reason is not clear, but it is assumed that in a case where stable Cu(II) and unstable Cu(I) coexist, it is possible to prevent Cu(I) from being oxidized, compared to a case where only unstable Cu(I) exists. It is preferable that the ratio (Cu(I)/Cu(II)) of the number of ions of Cu(I) and Cu(II) contained in the copper compound is 0.5 to 50.

In addition, copper of Cu(I) is more excellent in antiviral properties, compared to copper of Cu(II). Therefore, in the antiviral substrate of the first invention, in a case where the ratio (Cu(I)/Cu(II)) the number of ions of Cu(I) and Cu(II) contained in the copper compound, which is calculated by measuring the bond energy corresponding to Cu(I) and Cu(II) in the range of 925 to 955 eV for 5 minutes, with the X-ray photoelectron spectroscopy analysis method, is 1.0 to 4.0, the antiviral substrate more excellent in the antiviral properties is obtained.

The ratio (Cu(I)/Cu(II)) of the number of ions of Cu(I) and Cu(II) contained in the copper compound is more desirably 1.4 to 2.9, and it is optimal that the ratio (Cu(I)/Cu(II)) is 1.4 to 1.9.

In addition, in a case where the cured material of the electromagnetic curable resin is dispersed and fixed in the form of islands on the surface of the base material or a region in which the cured material of the electromagnetic curable resin is fixedly formed on the surface of the base material and a region in which the cured material of the electromagnetic curable resin is not fixedly formed on the surface of the base material are mixed, it is preferable to adjust Cu(I)/Cu(II) in the copper compound to 0.4/1 to 4.0/1, since it is possible to increase the antiviral properties.

In the antiviral substrate of the first invention, it is possible to adjust the ratio Cu(I)/Cu(II) in the copper compound, in accordance with the selection of the electromagnetic curable resin, the polymerization initiator, and the copper compound, the adjustment of the concentration thereof, and the adjustment of an irradiation time or the intensity of an electromagnetic wave such as an ultraviolet ray.

Note that, Cu(I) indicates that an ion valence of copper is 1, and may be represented by $Cu^+$. On the other hand, Cu(II) indicates that an ion valence of copper is 2, and may be represented by $Cu^{2+}$. Note that, in general, the bond energy of Cu(I) is 932.5 eV±0.3 (932.2 to 932.8 eV), and the bond energy of Cu(II) is 933.8 eV±0.3 (933.5 to 934.1 eV).

Next, the cured material of the electromagnetic curable resin of the first invention will be described.

In a case where irradiating a composition containing a monomer or an oligomer that is an uncured electromagnetic curable resin, a photopolymerization initiator, and various additives with an electromagnetic wave, the photopolymerization initiator causes a reaction such as a cleavage reaction, a hydrogen abstraction reaction, and an electron transfer reaction, and then photoradical molecules, photocationic molecules, photocanionic molecules, and the like that are generated by the reaction attack the monomer or the oligomer, and thus, a polymerization reaction or a crosslinking reaction of the monomer or the oligomer proceeds, and the cured material of the resin is generated. The resin of the first invention that is generated by such a reaction is referred to as the electromagnetic curable resin.

In the first invention, the cured material of the electromagnetic curable resin is scattered in the form of islands, and a method for manufacturing the cured resin that is scattered in the form of islands will be described below in detail.

In the first invention, the photopolymerization initiator contained in the cured material of the electromagnetic curable resin reduces copper ions (II) and generates copper ions (I), and copper ions (I) reduce water or oxygen in the air by reducing power of copper (I), and generate active oxygen, a hydrogen peroxide solution or super oxide anions, hydroxy radicals, and the like, protein configuring a virus is destroyed, and the virus can be easily deactivated. In a case where copper ions (I) reduce water or oxygen in the air, copper ions (I) are changed to copper ions (II), but copper ions (II) are reduced again to copper ions (I) by the photopolymerization initiator contained in the electromagnetic curable resin, and thus, reducing power is constantly maintained. For this reason, a reducing agent such as reducing sugar is not necessary, and the photopolymerization initiator is bonded to the resin, and is not eluted in water, and thus, is also excellent in water resistance.

Note that, in a case where a complex of copper ions (II) is reduced to copper ions (I), it is not possible to form the complex, and thus, a reduction reaction such as reduction from copper ions (II) to copper ions (I) hardly occurs, and it is not suitable to use a complex salt such as an amino-acid salt of copper in the first invention.

For example, at least one selected from the group consisting of an acryl resin, a urethane acrylate resin, a polyether resin, a polyester resin, an epoxy resin, and an alkyd resin is preferable as such an electromagnetic curable resin.

Examples of the acryl resin include an epoxy-modified acrylate resin, a urethane acrylate resin (a urethane-modified acrylate resin), a silicon-modified acrylate resin, and the like.

Examples of the polyester resin include polyethylene terephthalate (PET), polybutylene terephthalate (PBT), and the like.

Examples of the epoxy resin include a combination of an alicyclic epoxy resin or a glycidyl ether type epoxy resin, and an oxetane resin, and the like.

Examples of the alkyd resin include a polyester alkyd resin and the like.

Such resins have transparency, and are also excellent in adhesiveness with respect to the base material.

In the antiviral substrate of the first invention, it is preferable that in the cured material of the electromagnetic curable resin, a maximum width in a direction parallel to the surface of the base material is 0.1 to 200 μm, and an average value of thicknesses is 0.1 to 20 μm.

In the antiviral substrate of the first invention, in a case where the average value of the thicknesses of the cured resin of the electromagnetic curable resin is 0.1 to 20 μm, the cured resin is thin, and thus, it is difficult to form a continuous layer of the cured resin, the cured resin is easily scattered in the form of islands, and an antiviral effect is easily obtained.

In addition, a ratio of a portion in which the surface of the base material is not covered with the cured resin increases by setting the maximum width of the cured resin in the direction parallel to the surface of the base material to 0.1 to 200 μm, and thus, a decrease in a light transmittance can be suppressed.

It is more preferable that in the cured resin, the maximum width in the direction parallel to the surface of the base material is 1 to 100 μm, and the average value of the thicknesses is 1 to 20 μm.

In a case where the average value of the thicknesses of the cured resin is greater than 20 μm, the thickness of the cured resin excessively increases, and thus, the size of the cured resin excessively increases, it becomes difficult to scatter the cured resin in the form of islands, and the transparency may decrease. On the other hand, in a case where the average value of the thicknesses of the cured resin is less than 0.1 μm, it may not be possible to exhibit sufficient antiviral performance or the copper compound may easily fall off.

In addition, in a case where the maximum width of the cured resin in the direction parallel to the surface of the base material is greater than 200 μm, it is difficult to scatter the cured resin in the form of islands, and the transparency may decrease. On the other hand, in a case where the maximum width of the cured resin in the direction parallel to the surface of the base material is less than 0.1 μm, the adhesiveness with respect to the base material decreases, and the cured material may easily fall off.

In the antiviral substrate of the first invention, it is preferable that the cured material of the electromagnetic curable resin contains a water-insoluble polymerization initiator, as the polymerization initiator. This is because the water-insoluble polymerization initiator is not eluted even in a case of being in contact with water, and thus, the cured resin is not degraded, and the copper compound is not desorbed.

It is assumed that even in a case where the copper compound is soluble in water, it is possible to suppress the desorption of the copper compound insofar as the copper compound can be retained by the cured resin, but in a case where a water-soluble substance is contained in the cured resin, a holding power of the cured resin with respect to the copper compound decreases, and the copper compound is desorbed.

In addition, it is preferable that the water-insoluble polymerization initiator is a photopolymerization initiator.

This is because it is possible to allow a polymerization reaction to easily proceed by light such as a visible light ray or an ultraviolet ray.

In the antiviral substrate of the first invention, it is preferable to use a photopolymerization initiator having reducing power. This is because the photopolymerization initiator reduces the copper compound contained in the antiviral composition of the first invention to copper ions (I) having an antiviral effect, and is capable of suppressing copper ions (I) from being oxidized and from being changed to the copper ions (II) having poor antiviral properties.

In the antiviral substrate of the first invention, it is preferable that the polymerization initiator is at least one selected from the group consisting of an alkyl phenone-based polymerization initiator, a benzophenone-based polymerization initiator, an acyl phosphine oxide-based polymerization initiator, an intramolecular hydrogen abstraction type polymerization initiator, and an oxime ester-based polymerization initiator.

In the antiviral substrate of the first invention, specifically, it is preferable that the polymerization initiator is at least one or more selected from an alkyl phenone-based polymerization initiator, and benzophenone or a derivative thereof, in particular, it is more preferable that the polymerization initiator contains benzophenone or a derivative thereof.

In the antiviral substrate of the first invention, it is preferable that a total light ray transmittance is greater than or equal to 90%, and it is more preferable that the total light ray transmittance is greater than or equal to 99%.

In the antiviral substrate of the first invention, in a case where the total light ray transmittance is greater than or equal to 90%, a light ray such as visible light is transmitted, and thus, it is possible to use the antiviral substrate in an application using light transmittivity.

According to the antiviral substrate of the first invention, for example, it is possible to confer the antiviral properties to a protective film or a film for display of a touch panel, without decreasing the transparency.

In addition, it is possible to confer the antiviral properties to an interior material, a wall material, window glass, a door, kitchen goods, or the like in the building, office machines or furniture, a decorative sheet used in various applications, and the like, without changing a pattern, a color, a design, a shade, or the like on the surface.

Next, an antiviral composition of the first invention and a method for manufacturing an antiviral substrate will be described.

The method for manufacturing an antiviral substrate of the first invention, includes: a scattering step of scattering an antiviral composition containing a copper compound, an uncured electromagnetic curable resin, a dispersion medium, and a polymerization initiator, on a surface of a base material; a drying step of drying the antiviral composition that is scattered in the scattering step, and of removing the dispersion medium; and a curing step of irradiating the uncured electromagnetic curable resin in the antiviral composition from which the dispersion medium is removed in the drying step, with an electromagnetic wave, and of curing the electromagnetic curable resin.

(1) Scattering Step

In the method for manufacturing an antiviral substrate of the first invention, first, the antiviral composition of the first invention containing the copper compound, the uncured electromagnetic curable resin, the dispersion medium, and the polymerization initiator is scattered on the surface of the base material, as the scattering step.

In the method for manufacturing an antiviral substrate of the first invention, the antiviral composition of the first invention containing the copper compound, the uncured electromagnetic curable resin, the dispersion medium, and the polymerization initiator is used.

It is preferable that the copper compound contained in the antiviral composition is a carboxylate of copper, a hydroxide of copper, an oxide of copper, or a water-soluble inorganic salt of copper. This is because, in particular, a divalent copper compound (a copper compound (II)) is easily dissolved in water that is a dispersion medium, and copper ions are easily dispersed in an ultraviolet-curable resin. In addition, there is also an advantage that in a case where the divalent copper compound is added into the antiviral composition, the divalent copper compound is reduced, and thus, it is possible to simply form a state in which a monovalent copper compound and the divalent copper compound coexist in the cured resin. It is optimal to use a water-soluble divalent copper compound.

Examples of the carboxylate of copper include copper acetate (II), copper benzoate (II), copper phthalate (II), and the like. Divalent copper carboxylate (copper carboxylate (II)) is preferable as the copper compound.

An ionic compound copper can be used as the water-soluble inorganic salt of copper, and examples of the water-soluble inorganic salt of copper include copper nitrate (II), copper sulfate (II), and the like.

Examples of other copper compounds include copper (II) (methoxide), copper (II) ethoxide, copper (II) propoxide, copper (II) butoxide, and the like, and examples of a covalent compound of copper include an oxide of copper, a hydroxide of copper, and the like.

It is preferable that the electromagnetic curable resin is at least one selected from the group consisting of an acryl resin, a urethane acrylate resin, a polyether resin, a polyester resin, an epoxy resin, and an alkyd resin. As described above, the electromagnetic curable resin indicates a resin that is manufactured by allowing a polymerization reaction, a crosslinking reaction, or the like of a monomer or an oligomer that is a raw material to proceed with the irradiation of an electromagnetic wave.

Accordingly, the antiviral composition contains the monomer or the oligomer (the uncured electromagnetic curable resin) that is a raw material of the electromagnetic curable resin.

The type of dispersion medium is not limited, and in a case of considering stability, it is preferable to use alcohols or water. Examples of alcohols include alcohols such as methyl alcohol, ethyl alcohol, n-propyl alcohol, isopropyl alcohol, n-butyl alcohol, isobutyl alcohol, and sec-butyl alcohol, in consideration of decreasing viscous properties. Among such alcohols, methyl alcohol and ethyl alcohol in which a viscosity is less likely to increase, and a mixed liquid of alcohol and water is preferable.

In the antiviral composition and the method for manufacturing an antiviral substrate of the first invention, it is preferable that the antiviral composition contains a water-insoluble polymerization initiator, as the polymerization initiator. This is because the water-insoluble polymerization initiator is not eluted even in a case of being in contact with water, and thus, the cured resin is not degraded, and the copper compound is not desorbed.

It is assumed that even in a case where the copper compound is soluble in water, it is possible to suppress the desorption of the copper compound insofar as the copper compound can be retained by the cured resin, but in a case where a water-soluble substance is contained in the cured resin, a holding power of the cured resin with respect to the copper compound decreases, and the copper compound is desorbed.

In addition, it is preferable that the water-insoluble polymerization initiator is a photopolymerization initiator. This is because it is possible to allow a polymerization reaction to easily proceed by light such as a visible light ray or an ultraviolet ray.

In the antiviral composition and the method for manufacturing an antiviral substrate of the first invention, it is preferable to use a photopolymerization initiator having reducing power. This is because the photopolymerization initiator reduces the copper compound contained in the antiviral composition of the first invention to copper ions (I) having an antiviral effect, and is capable of suppressing copper ions (I) from being oxidized and from being changed to the copper ions (II) having poor antiviral properties.

Specifically, it is preferable that the polymerization initiator is at least one selected from the group consisting of an alkyl phenone-based polymerization initiator, a benzophenone-based polymerization initiator, an acyl phosphine oxide-based polymerization initiator, an intramolecular hydrogen abstraction type polymerization initiator, and an oxime ester-based polymerization initiator.

Examples of the alkyl phenone-based polymerization initiator include 2,2-dimethoxy-1,2-diphenyl ethan-1-one, 1-hydroxy-cyclohexyl-phenyl-ketone (corresponding to a polymerization initiator of Examples 1 to 4), 2-hydroxy-2-methyl-1-phenyl-propan-1-one, 1-[4-(2-hydroxy ethoxy)-phenyl]-2-hydroxy-2-methyl-1-propan-1-one, 2-hydroxy-1-{4-[4-(2-hydroxy-2-methyl-propionyl)-benzyl] phenyl}-2-methyl-propan-1-one, 2-methyl-1-(4-methyl thiophenyl)-2-morpholinbpropan-1-one, 2-benzyl-2-dimethyl amino-1-(4-morpholinophenyl)-butanone-1, 2-(dimethyl amino)-2-[(4-methyl phenyl) methyl]-1-[4-(4-morphonyl) phenyl]-1-butanone, and the like.

Examples of the acyl phosphine oxide-based polymerization initiator include 2,4,6-trimethyl benzoyl-diphenyl-phosphine oxide, bis(2,4,6-trimethyl benzoyl)-phenyl phosphine oxide, and the like.

Examples of the intramolecular hydrogen abstraction type polymerization initiator include phenyl glyoxylic acid methyl ester, an oxyphenyl acetic acid, a mixture of 2-[2-oxo-2-phenyl acetoxy ethoxy] ethyl ester, an oxyphenyl acetic acid, and 2-(2-hydroxy ethoxy) ethyl ester, and the like.

Examples of the oxime ester-based polymerization initiator include 1,2-octane dione, 1-[4-(phenyl thio)-2-(O-benzoyl oxime)], ethanone, 1-[9-ethyl-6-(2-methyl benzoyl)-9H-carbazol-3-yl]-1-(0-acetyl oxime), and the like.

In the antiviral composition and the method for manufacturing an antiviral substrate of the first invention, it is preferable that the polymerization initiator includes at least one or more selected from an alkyl phenone-based polymerization initiator, and benzophenone or a derivative thereof. This is because the reducing power is expressed by an electromagnetic wave such as an ultraviolet ray. Among the photopolymerization initiators, benzophenone or a derivative thereof is particularly preferable.

In the antiviral composition and the method for manufacturing an antiviral substrate of the first invention, it is preferable that the polymerization initiator includes an alkyl phenone-based polymerization initiator and a benzophenone-based polymerization initiator, a concentration of the alkyl phenone-based polymerization initiator is 0.5 to 3.0 wt % with respect to the electromagnetic curable resin, and a concentration of the benzophenone-based polymerization initiator is 0.5 to 2.0 wt % with respect to the electromagnetic curable resin. This is because even in a case where an irradiation time of an electromagnetic wave is short, it is possible to attain a high crosslinking density.

It is preferable that a ratio of the alkyl phenone-based polymerization initiator to the benzophenone-based polymerization initiator is Alkyl Phenone-Based Polymerization Initiator/Benzophenone-Based Polymerization Initiator=1/1 to 4/1, in a weight ratio. This is because it is possible to attain a high crosslinking density, it is possible to increase the hardness of the cured material and to improve abrasion resistance, and it is possible to increase the reducing power with respect to copper. It is preferable that the crosslinking density is greater than or equal to 85%, in particular, is greater than or equal to 95%.

It is preferable that a content ratio of the copper compound in the antiviral composition is 4.0 to 30.0 weight %, and it is preferable that a content ratio of the uncured electromagnetic curable resin (the monomer or the oligomer) is 65 to 95 weight %, and it is preferable that a content ratio of the dispersion medium is 0.1 to 5.0 weight %.

In the antiviral composition of the first invention, as needed, an ultraviolet absorber, an antioxidant, a light stabilizer, an adhesion promoter, a rheology regulator, a leveling agent, an antifoaming agent, and the like may be blended.

It is preferable that the copper compound, the monomer or the oligomer, and the polymerization initiator are added to the dispersion medium, and then, sufficient stirring with a mixer or the like is performed to be a composition in which the copper compound, the uncured electromagnetic curable resin, and the polymerization initiator are dispersed at a homogeneous concentration, and then, the composition is scattered, at the time of preparing the antiviral composition.

Herein, the scattering indicates that the antiviral composition is attached onto the surface of the base material in a state of being divided.

Examples of the scattering method include a spray method, a twin-fluid spray method, an electrostatic spray method, an aerosol method, and the like.

In the first invention, the spray method indicates the antiviral composition is sprayed in a mist state by using gas such as high-pressure air or a mechanical motion (a finger, a piezo element, or the like), and a liquid droplet of the antiviral composition is attached onto the surface of the base material.

In the first invention, the twin-fluid spray method is one type of spray method, and indicates that gas such as high-pressure air and the antiviral composition are mixed, and then, are sprayed from a nozzle in a mist state, and a liquid droplet of the antiviral composition is attached onto the surface of the base material.

In the first invention, the electrostatic spray method is a scattering method using an electric-charged antiviral composition, and the antiviral composition is sprayed in a mist state by the spray method described above. A method for setting the antiviral composition in a mist state includes a gun type method of spraying the antiviral composition with a sprayer and an electrostatic atomization method using the repulsion of the electric-charged antiviral composition. The gun type method includes a method of spraying the electric-charged antiviral composition and a method of applying an electric charge to the sprayed antiviral composition in a mist state by corona discharge from an external electrode. The liquid droplet in a mist state is electrically charged, and thus, is easily attached onto the surface of the base material, and the antiviral composition can be excellently attached onto the surface of the base material in a state of being finely divided.

In the first invention, the aerosol method is a method of blowing the antiviral composition containing a metal compound in a mist state that is generated physically and chemically to a target.

According to the scattering step, a state in which the antiviral composition containing the copper compound, the uncured electromagnetic curable resin, the dispersion medium, and the polymerization initiator is scattered in the form of islands on the surface of the base material or a state in which the antiviral composition is attached onto the surface of the base material such that a part of the surface of the base material is exposed are obtained.

(2) Drying Step

The antiviral composition containing the copper compound, the uncured resin, the dispersion medium, and the polymerization initiator, which is scattered on the surface of the base material in the scattering step, is dried, and the dispersion medium is evaporated and removed, and thus, the solidified uncured resin containing the copper compound and the like can be temporarily fixed onto the surface of the base material, and the copper compound can be exposed on the surface of the solidified uncured resin by the contraction of the cured resin. 60° C. to 85° C. and 0.5 to 1.0 minutes are preferable as a drying condition.

In the method for manufacturing an antiviral substrate of the first invention, the drying step and the curing step may be simultaneously performed.

(3) Curing Step

In the method for manufacturing an antiviral substrate of the first invention, as the curing step, the monomer or the oligomer that is the uncured electromagnetic curable resin, in the antiviral composition from which the dispersion medium is removed in the drying step or in the antiviral composition containing the dispersion medium is irradiated with the electromagnetic wave, and the electromagnetic curable resin is cured, and thus, the cured resin is obtained.

In the method for manufacturing an antiviral substrate of the first invention, the electromagnetic wave to be applied to the uncured electromagnetic curable resin is not limited, examples of the electromagnetic wave include an ultraviolet ray (UV), an infrared ray, a visible light ray, a microwave, an electron beam (EB), and the like, and among them, the ultraviolet ray (UV) is preferable.

According to such steps, it is possible to manufacture the antiviral substrate of the first invention.

The polymerization initiator is added to the antiviral composition, and thus, the cured resin containing the copper compound is formed by allowing a polymerization reaction, a crosslinking reaction, or the like of the monomer or the oligomer that is the uncured electromagnetic curable resin to proceed with the irradiation of the electromagnetic wave.

The antiviral composition that is scattered in the scattering step is scattered on the surface of the base material in the form of islands or the antiviral composition is attached such that a part of the surface of the base material is exposed on the surface of the base material, and thus, the obtained cured resin is also scattered in the form of islands or the cured resin containing the copper compound is scattered such that a part thereof is exposed.

It is possible to adjust the porosity of the cured resin by adjusting the concentration of a solvent, the concentration of the polymerization initiator, the illuminance of the electromagnetic wave, the temperature of the antiviral composition at the irradiation of the electromagnetic wave, and the like.

In the method for manufacturing an antiviral substrate of the first invention, it is possible to attach the antiviral composition onto the surface of the base material in the form of islands or to attach the antiviral composition such that a part of the surface of the base material is exposed, by scattering the antiviral composition containing the copper compound, the uncured electromagnetic curable resin, the dispersion medium, and the polymerization initiator, on the surface of the base material. A polymerization reaction, a crosslinking reaction, or the like of the monomer or the oligomer that is the uncured electromagnetic curable resin easily proceeds by irradiating the composition with the electromagnetic wave, after the drying step, and thus, it is possible to comparatively easily form the cured resin containing the copper compound such that the cured resin is scattered in the form of islands or a part of the surface of the base material is exposed, and it is possible to manufacture the antiviral substrate excellent in the antiviral properties of the copper compound by exposing a part of the copper compound from the surface of the cured resin in a state capable of being in contact with a virus to be in contact with the virus. In addition, it is preferable that the manufactured antiviral substrate contains a photopolymerization initiator having reducing power. This is because the photopolymerization initiator reduces the copper compound contained in the antiviral substrate to copper ions (I) having an antiviral effect, and is capable of suppressing copper ions (I) from being oxidized and from being changed to copper ions (II) having poor antiviral properties, and thus, it is possible to exhibit high antiviral properties.

Next, an antimicrobial substrate of the second invention will be described.

In the antimicrobial substrate of the second invention, a cured material of a binder containing a copper compound and a polymerization initiator is fixed onto a surface of a base material, and at least a part of the copper compound is exposed on a surface of the cured material of the binder.

In the antimicrobial substrate of the second invention, the cured material of the binder containing the copper compound and the polymerization initiator is fixed onto the surface of the base material, and at least a part of the copper compound is exposed on the surface of the cured material of the binder, and thus, the copper compound is easily in contact with a microorganism, and it is possible to sufficiently exhibit an effect as a substrate having antimicrobial activity based on the copper compound.

In the antimicrobial substrate of the second invention, the cured material of the binder containing the copper compound and the polymerization initiator is fixedly formed on the surface of the base material.

In the antimicrobial substrate of the second invention, it is preferable that the cured material of the binder is formed of a porous body.

This is because the copper compound is easily in contact with the atmosphere medium such as the air, and thus, copper ions (I) reduce water or oxygen in the air and generate active oxygen, a hydrogen peroxide solution or super oxide anions, hydroxy radicals, and the like, protein configuring a microorganism is destroyed, and the microorganism is easily deactivated. In the second invention, it is most effective with respect to a virus and/or a fungus, as the microorganism.

The material of the base material of the antimicrobial substrate of the second invention is not limited, and examples of the material include a metal, ceramic such as glass, a resin, a fiber fabric, wood, and the like.

In addition, a member that is the base material of the antimicrobial substrate of the second invention is not also limited, and may be a protective film or a film for display of a touch panel, or may be an interior material, a wall material, window glass, a handrail, and the like in a building. In addition, the member may be a doorknob, a sliding key in the restroom, and the like. Further, the member may be an office machine, furniture, or the like, or may be a decorative sheet or the like that can be used in various applications in addition to the interior material.

It is preferable that the binder for forming the cured binder is at least one or more selected from an organic binder, an inorganic binder, a mixture of an organic binder and an inorganic binder, and an organic-inorganic hybrid binder.

In addition, at least one selected from the group consisting of inorganic sol, metal alkoxide, and liquid glass can be used as the inorganic binder. Further, an organic metal compound can be used as the organic-inorganic hybrid binder. A content ratio of an inorganic oxide such as silica, in the inorganic sol is 1 to 80 weight %, in terms of a solid content.

A thermosetting resin and an electromagnetic curable resin can be used as the organic binder.

This is because in a case where such an organic binder is irradiated with an electromagnetic wave or is heated to cure the resin, the organic binder is capable of fixing the copper compound onto the surface of the base material. In addition, such a resin is advantageous since the resin does not decrease reducing power of the polymerization initiator with respect to copper. At least one or more selected from an acryl resin, a urethane acrylate resin, and an epoxy acrylate resin can be used as the electromagnetic curable resin. In addition, at least one or more selected from an epoxy resin, a melamine resin, and a phenol resin can be used as the thermosetting resin.

Specifically, at least one selected from the group consisting of an acryl resin, a urethane acrylate resin, a polyether resin, a polyester resin, an epoxy resin, an alkyd resin, silica sol, alumina sol, zirconia sol, titania sol, metal alkoxide, and liquid glass can be used as the binder. Alkoxysilane can be used as the metal alkoxide. This is because alkoxysilane becomes sol by forming a siloxane bond by hydrolysis, and is gelated by drying, and thus, the cured binder is obtained. The silica sol, the alumina sol, and the liquid glass become cured binder by heating and drying.

The cured binder of the second invention is a concept including the cured material of the electromagnetic curable resin described in the first invention.

In the second invention, it is preferable that the copper compound contained in the cured binder is a carboxylate of copper, a hydroxide of copper, an oxide of copper, or a water-soluble inorganic salt of copper.

An ionic compound of copper can be used as the carboxylate of copper, and examples of the carboxylate of copper include copper acetate, copper benzoate, copper phthalate, and the like.

An ionic compound of copper can be used as the water-soluble inorganic salt of copper, and examples of the water-soluble inorganic salt of copper include copper nitrate, copper sulfate, and the like.

Examples of other copper compounds include copper (methoxide), copper ethoxide, copper propoxide, copper butoxide, and the like, and examples of a covalent compound of copper include an oxide of copper, a hydroxide of copper, and the like. The carboxylate of copper and the hydroxide of copper have high affinity with respect to an organic binder and an inorganic binder, and are not eluted by water, and thus, are excellent in the water resistance.

Such a copper compound may be identical to or different from a copper compound that is added at the time of preparing an antimicrobial composition used for manufacturing the cured binder.

In the antimicrobial substrate of the second invention, it is preferable that a ratio (Cu(I)/Cu(II)) of the number of ions of Cu(I) and Cu(II) contained in the copper compound, which is calculated by measuring bond energy corresponding to Cu(I) and Cu(II) in a range of 925 to 955 eV for 5 minutes, by an X-ray photoelectron spectroscopy analysis method, is 0.4 to 50. In a case where Cu(I) and Cu(II) coexist, antiviral performance increases, compared to a case where only Cu(I) exists. The reason is not clear, but it is assumed that this is because in a case where stable Cu(II) and unstable Cu(I) coexist, it is possible to prevent Cu(I) from being oxidized, compared to a case where only unstable Cu(I) exists. In particular, it is preferable that the ratio (Cu(I)/Cu(II)) of the number of ions of Cu(I) and Cu(II) contained in the copper compound is 0.5 to 50.

In addition, copper of Cu(I) is more excellent in the antimicrobial properties, compared to copper of Cu(II), and thus, in the antimicrobial substrate of the second invention, in a case where the ratio (Cu(I)/Cu(II)) of the number of ions of Cu(I) and Cu(II) contained in the copper compound, which is calculated by measuring the bond energy corresponding to Cu(I) and Cu(II) in the range of 925 to 955 eV for 5 minutes, with the X-ray photoelectron spectroscopy analysis method, is 1.0 to 4.0, the antimicrobial substrate becomes more excellent in the antimicrobial properties.

The ratio (Cu(I)/Cu(II)) of the number of ions of Cu(I) and Cu(II) contained in the copper compound is more desirably 1.4 to 2.9, in particular, and it is optimal that the ratio (Cu(I)/Cu(II)) is 1.4 to 1.9.

In the antimicrobial substrate of the second invention, the antimicrobial properties of copper ions (I) are most effective with respect to a virus and/or a fungus. This is because monovalent copper ions most effectively destroy protein configuring the virus and the fungus.

In addition, in a case where the cured binder is dispersed and fixed in the form of islands or a region in which the cured binder is fixedly formed on the surface of the base material and a region in which the cured binder is not fixedly formed on the surface of the base material are mixed, it is preferable to adjust Cu(I)/Cu(II) in the copper compound to 0.4/1 to 4.0/1, since it is possible to increase the antiviral properties.

In the antimicrobial substrate of the second invention, it is possible to adjust the ratio Cu(I)/Cu(II) in the copper compound, in accordance with the selection of the binder, the polymerization initiator, and the copper compound, the adjustment of the concentration thereof, and the adjustment of an irradiation time or the intensity of an electromagnetic wave such as an ultraviolet ray.

Note that, Cu(I) indicates that an ion valence of copper is 1, and may be represented by $Cu^+$. On the other hand, Cu(II) indicates that an ion valence of copper is 2, and may be represented by $Cu^{2+}$. Note that, in general, the bond energy of Cu(I) is 932.5 eV±0.3 (932.2 to 932.8 eV), and the bond energy of Cu(II) is 933.8 eV±0.3 (933.5 to 934.1 eV).

Next, the cured material of the electromagnetic curable resin of the second invention will be described.

In a case where a composition containing a monomer or an oligomer that is an uncured electromagnetic curable resin, a photopolymerization initiator, and various additives is irradiated with an electromagnetic wave, the photopolymerization initiator causes a reaction such as a cleavage reaction, a hydrogen abstraction reaction, and an electron transfer. Photoradical molecules, photocationic molecules, photocanionic molecules, and the like that are generated by the reaction attack the monomer or the oligomer, a polymerization reaction or a crosslinking reaction of the monomer or the oligomer proceeds, and the cured material of the resin is generated. The resin of the second invention that is generated by such a reaction is referred to as the electromagnetic curable resin.

In the second invention, since the photopolymerization initiator contained in the cured material of the electromagnetic curable resin reduces copper ions (II) and generates copper ions (I), copper ions (I) reduce water or oxygen in the air by reducing power of copper (I), and generate active oxygen, a hydrogen peroxide solution or super oxide anions, hydroxy radicals, and the like. Therefore, protein configuring a microorganism is destroyed, and the microorganism can be easily deactivated. In a case where copper ions (I) reduce water or oxygen in the air, copper ions (I) are changed to copper ions (II), but copper ions (II) are reduced again to copper ions (I) by the photopolymerization initiator contained in the electromagnetic curable resin, and thus, reducing power is constantly maintained. For this reason, a reducing agent such as reducing sugar is not necessary, and since the photopolymerization initiator is bonded to the resin, it is not eluted in water, and thus, is also excellent in water resistance.

Note that, in a case where a complex of copper ions (II) is reduced to copper ions (I), it is not possible to form the complex. Therefore, a reduction reaction such as reduction from copper ions (II) to copper ions (I) hardly occurs, and it is not suitable to use a complex salt such as an amino-acid salt of copper in the second invention.

Examples of the acryl resin include an epoxy-modified acrylate resin, a urethane acrylate resin (a urethane-modified acrylate resin), a silicon-modified acrylate resin, and the like.

Examples of the polyester resin include polyethylene terephthalate (PET), polybutylene terephthalate (PBT), and the like.

Examples of the epoxy resin include a combination of an alicyclic epoxy resin or a glycidyl ether type epoxy resin, and an oxetane resin, and the like.

Examples of the alkyd resin include a polyester alkyd resin and the like.

Such resins have transparency, and are also excellent in adhesiveness with respect to the base material.

In the antimicrobial substrate of the second invention, it is preferable that the polymerization initiator includes a photopolymerization initiator. This is because in a case where the antimicrobial substrate includes the photopolymerization initiator, the copper compound is reduced to copper ions (I) having an antimicrobial effect, and it is possible to prevent copper ions (I) from being oxidized and from changed to copper ions (II) having poor antimicrobial properties. In the antimicrobial substrate of the second invention, the antimicrobial properties of copper ions (I) are the most effective with respect to a virus and/or a fungus.

In the antimicrobial substrate of the second invention, it is preferable that the cured material of the binder contains a water-insoluble polymerization initiator. This is because the polymerization initiator is not eluted even in a case of being in contact with water, and thus, the antimicrobial substrate containing the cured binder excellent in water resistance is obtained.

In the antimicrobial substrate of the second invention, it is preferable that the polymerization initiator is at least one or more selected from an alkyl phenone-based polymerization initiator, and benzophenone or a derivative thereof, in particular, it is more preferable that the polymerization initiator is benzophenone or a derivative thereof.

This is because such polymerization initiators has particularly high reducing power with respect to copper, and is excellent in an effect capable of maintaining the state of copper ions (I) for a long period of time.

In the antimicrobial substrate of the second invention, it is preferable that the polymerization initiator includes an alkyl phenone-based polymerization initiator and a benzophenone-based polymerization initiator, a concentration of the alkyl phenone-based polymerization initiator is 0.5 to 3.0 wt % with respect to the binder, and a concentration of the benzophenone-based polymerization initiator is 0.5 to 2.0 wt % with respect to the binder. This is because even in a case where an irradiation time of an electromagnetic wave is short, it is possible to attain a high crosslinking density.

It is preferable that a ratio of the alkyl phenone-based polymerization initiator to the benzophenone-based polymerization initiator is Alkyl Phenone-Based Polymerization Initiator/Benzophenone-Based Polymerization Initiator=1/1 to 4/1, in a weight ratio. This is because it is possible to attain a high crosslinking density, it is possible to increase the hardness of the cured material and to improve abrasion resistance. It is possible to increase the reducing power with respect to copper. It is preferable that the crosslinking density is greater than or equal to 85%, in particular, is greater than or equal to 95%.

In the cured binder of the antimicrobial substrate of the second invention, it is preferable that a maximum width in a direction parallel to the surface of the base material is 0.1 to 500 μm, and an average value of thicknesses is 0.1 to 20 μm, and it is preferable that a total light ray transmittance is greater than or equal to 90%.

In the antimicrobial substrate of the second invention, in a case where the average value of the thicknesses of the cured binder is 0.1 to 20 μm, the cured binder is thin, it is difficult to form a continuous layer of the cured binder, the cured binder is easily scattered in the form of islands, and an antimicrobial effect is easily obtained.

In addition, a ratio of a portion in which the surface of the base material is not covered with the cured binder increases by setting the maximum width of the cured binder in the direction parallel to the surface of the base material to 0.1 to 500 μm, and thus, a decrease in a light transmittance can be suppressed.

It is more preferable that in the cured material of the binder, the maximum width in the direction parallel to the surface of the base material is 1 to 100 μm, and the average value of the thicknesses is 1 to 20 μm.

In a case where the average value of the thicknesses of the cured binder is greater than 20 μm, the thickness of the cured binder excessively increases, the size of the cured binder excessively increases, it becomes difficult to fix the cured binder onto the surface of the base material in a state where the surface of the base material is exposed, and the transparency may decrease. On the other hand, in a case where the average value of the thicknesses of the cured binder is less than 0.1 μm, it may not be possible to exhibit sufficient antimicrobial performance or the copper compound may easily fall off.

In addition, in a case where the maximum width of the cured binder in the direction parallel to the surface of the base material is greater than 500 μm, it is difficult to fix the cured binder onto the surface of the base material in a state where the surface of the base material is exposed, and the transparency may decrease. On the other hand, in a case where the maximum width of the cured binder in the direction parallel to the surface of the base material is less than 0.1 µm, the adhesiveness with respect to the base material decreases, and the cured material may easily fall off.

In the antimicrobial substrate of the second invention, in a case where the total light ray transmittance is greater than or equal to 90%, a light ray such as visible light is transmitted, and thus, it is possible to use the antimicrobial substrate in an application using light transmittivity.

In the antimicrobial substrate of the second invention, since the cured material of the binder is fixedly formed by being scattered in the form of islands or the region in which the cured binder is fixedly formed on the surface of the base material and the region in which the cured binder is not fixedly formed on the surface of the base material are mixed, and there is a portion in which the cured binder does not exist and the surface of the base material is exposed, on the surface of the base material, and thus, it is possible to prevent a decrease in the transmittance of a visible light ray with respect to the surface of the base material. For this reason, in a case where the base material is a transparent material, the transparency of the base material does not decrease, and in a case where the design of a predetermined pattern or the like is formed on the surface of the base material, the appearance of the design or the like is not impaired.

In addition, in the antimicrobial substrate of the second invention, since the cured binder is fixedly formed by being scattered in the form of islands or the region in which the cured binder is fixedly formed on the surface of the base material and the region in which the cured binder is not fixedly formed on the surface of the base material are mixed, it is possible to decrease the contact area between the cured binder and the surface of the base material and to suppress the residual stress of the cured binder or a stress generated at the time of a thermal cycle, and it is possible to form the cured binder having high adhesiveness with respect to the base material.

In a case where the cured binder is fixed by being scattered in the form of islands or the region in which the cured binder is fixedly formed on the surface of the base material and the region in which the cured binder is not fixedly formed on the surface of the base material are mixed, a surface area of the cured binder increases, a microorganism such as a virus is easily trapped between the cured binders, a probability of contact between the cured binder having antimicrobial performance and the microorganism such as the virus increases, and high antimicrobial performance can be expressed.

Further, in the antimicrobial substrate of the second invention, the cured binder may be formed in the form of a film.

In a case where the cured binder having antimicrobial properties is formed in the form of a film, the cured binder is excellent in resistance with respect to wiping cleaning, compared to a case where the cured binder is dispersed and fixed in the form of islands or the region in which the cured binder is fixedly formed on the surface of the base material and the region in which the cured binder is not fixedly formed on the surface of the base material are mixed.

On the other hand, in a case where the cured binder is fixedly formed on the base material in the form of a film, the visibility of the design of the surface of the base material, the antimicrobial performance, and the adhesiveness of the cured binder with respect to the base material after a thermal cycle decrease, compared to a case where the cured binder is dispersed and fixed in the form of islands or the region in which the cured binder is fixedly formed on the surface of the base material and the region in which the cured binder is not fixedly formed on the surface of the base material are mixed.

It is preferable that the thickness of a film formed of the cured binder is 0.5 to 100 µm. This is because in a case where the film is excessively thick, a stress is generated, the film is peeled off, and the antimicrobial properties decrease. Inn a case where the film is excessively thin, it is not possible to sufficiently exhibit the antimicrobial properties.

In a case where the design is not implemented on the base material or the surface of the base material is subjected to embossing, the influence of an appearance damage due to the cured binder is small, and thus, it is preferable that the film formed of the cured binder is formed on the base material.

In addition, in a case where the antimicrobial performance is prior to the designability, as described above, the film formed of the cured binder may be formed on the base material.

Next, an antimicrobial composition and a method for manufacturing an antimicrobial substrate of the second invention will be described.

The method for manufacturing an antimicrobial substrate of the second invention, includes: an attaching step of attaching an antimicrobial composition containing a copper compound, an uncured binder, a dispersion medium, and a polymerization initiator, onto a surface of a base material; and a curing step of curing the uncured binder in the antimicrobial composition that is attached onto it in the attaching step, and of fixing a cured binder onto the surface of the base material.

In addition, the method for manufacturing an antimicrobial substrate of the second invention, includes: an attaching step of attaching an antimicrobial composition containing a copper compound, an uncured binder, a dispersion medium, and a polymerization initiator, onto a surface of a base material; a drying step of drying the antimicrobial composition that is attached onto it in the attaching step, and of removing the dispersion medium; and a curing step of curing the uncured binder in the antimicrobial composition from which the dispersion medium is removed in the drying step, and of fixing a cured binder onto the surface of the base material.

In any step of the method for manufacturing an antimicrobial substrate of the second invention, it is preferable to irradiate the polymerization initiator with an electromagnetic wave of a predetermined wavelength, for example, an ultraviolet ray or the like, in order to express the reducing power of the polymerization initiator.

That is, in the method for manufacturing an antimicrobial substrate of the second invention, the curing step may be performed immediately after the attaching step, or the curing step may be performed subsequent to the drying step, after the attaching step.

In the method for manufacturing an antimicrobial substrate of the second invention, in the attaching step, the antimicrobial composition of the second invention containing the copper compound, the uncured binder, the dispersion medium, and the polymerization initiator is attached onto the surface of the base material.

It is preferable that the binder is at least one or more selected from an organic binder, an inorganic binder, a mixture of an organic binder and an inorganic binder, and an organic-inorganic hybrid binder, and a thermosetting resin and an electromagnetic curable resin can be used as the inorganic binder.

In addition, at least one selected from the group consisting of inorganic sol, metal alkoxide, and liquid glass can be used as the inorganic binder. Further, an organic metal compound can be used as the organic-inorganic hybrid binder.

At least one or more selected from an acryl resin, a urethane acrylate resin, and an epoxy acrylate resin can be used as the electromagnetic curable resin. In addition, at least one or more selected from an epoxy resin, a melamine resin, and a phenol resin can be used as the thermosetting resin.

In addition, as a specific example of the binder, it is preferable to use at least one selected from the group consisting of an acryl resin, a urethane acrylate resin, a polyether resin, a polyester resin, an epoxy resin, an alkyd resin, silica sol, alumina sol, zirconia sol, titania sol, metal alkoxide, and liquid glass.

Since water or organic solvent is used as a dispersion medium, it is possible to select the inorganic binder, in consideration of the type of copper compound to be added, and the like, and it is possible to obtain the antimicrobial composition in which the copper compound is homogeneously dispersed.

Next, each step of the method for manufacturing an antimicrobial substrate of the second invention will be described.

(1) Attaching Step

In the method for manufacturing an antimicrobial substrate of the second invention, first, the antimicrobial composition of the second invention containing the copper compound, the uncured binder, the dispersion medium, and the polymerization initiator is attached onto the surface of the base material, as the attaching step.

In the method for manufacturing an antimicrobial substrate of the second invention, the antimicrobial composition containing the copper compound, the uncured binder, the dispersion medium, and the polymerization initiator is used.

It is preferable that the copper compound contained in the antimicrobial composition is a carboxylate of copper, a hydroxide of copper, an oxide of copper, or a water-soluble inorganic salt of copper. In particular, a divalent copper compound (a copper compound (II)) is preferable. This is because the divalent copper compound is dissolved in water that is a dispersion medium, and copper ions are easily homogeneously dispersed in the binder. In contrast, a monovalent copper compound (a copper compound (I)) is suspended in a particulate shape without being dissolved in water, and thus, is poor in homogeneity.

In addition, there is also an advantage that in a case where the divalent copper compound is added into the antimicrobial composition, the divalent copper compound is reduced, and thus, it is possible to simply form a state in which the monovalent copper compound and the divalent copper compound coexist in the cured binder. It is optimal to use a water-soluble divalent copper compound.

Examples of the carboxylate of copper include copper acetate (II), copper benzoate (II), copper phthalate (II), and the like. A carboxylate of divalent copper is preferable as the copper compound.

An of ionic compound copper can be used as the water-soluble inorganic salt of copper, and examples of the water-soluble inorganic salt of copper include copper nitrate (II), copper sulfate (II), and the like.

Examples of other copper compounds include copper (II) (methoxide), copper (II) ethoxide, copper (II) propoxide, copper (II) butoxide, and the like, and examples of a covalent compound of copper include an oxide of copper, a hydroxide of copper, and the like.

It is preferable that the uncured binder is at least one or more selected from an organic binder, an inorganic binder, a mixture of an organic binder and an inorganic binder, and an organic-inorganic hybrid binder, and a thermosetting resin and an electromagnetic curable resin can be used as the inorganic binder.

In addition, at least one selected from the group consisting of inorganic sol, metal alkoxide, and liquid glass can be used as the inorganic binder. Further, an organic metal compound can be used as the organic-inorganic hybrid binder.

At least one or more selected from an acryl resin, a urethane acrylate resin, and an epoxy acrylate resin can be used as the electromagnetic curable resin. In addition, at least one or more selected from an epoxy resin, a melamine resin, and a phenol resin can be used as the thermosetting resin.

In addition, as a specific example of the binder, it is preferable to use at least one selected from the group consisting of an acryl resin, a urethane acrylate resin, a polyether resin, a polyester resin, an epoxy resin, an alkyd resin, silica sol, alumina sol, zirconia sol, titania sol, metal alkoxide, and liquid glass.

Note that, the electromagnetic curable resin indicates a resin that is manufactured by allowing a polymerization reaction, a crosslinking reaction, or the like of a monomer or an oligomer that is a raw material to proceed with the irradiation of an electromagnetic wave.

Accordingly, the antimicrobial composition contains the monomer or the oligomer (the uncured electromagnetic curable resin) that is the raw material of the electromagnetic curable resin.

The type of dispersion medium is not limited, and in a case of considering stability, it is preferable to use alcohols or water. Examples of alcohols include alcohols such as methyl alcohol, ethyl alcohol, n-propyl alcohol, isopropyl alcohol, n-butyl alcohol, isobutyl alcohol, and sec-butyl alcohol, in consideration of decreasing viscous properties. Among such alcohols, methyl alcohol and ethyl alcohol in which a viscosity is less likely to increase, is preferable and a mixed liquid of alcohol and water is preferable.

In the antimicrobial composition and the method for manufacturing an antimicrobial substrate of the second invention, it is preferable that the antimicrobial composition contains a water-insoluble polymerization initiator, as the polymerization initiator. This is because the polymerization initiator is not eluted even in a case of being in contact with water, and thus, the cured binder is not degraded, and the copper compound is not desorbed.

It is assumed that even in a case where the copper compound is soluble in water, it is possible to suppress the desorption of the copper compound insofar as the copper compound is retained by the cured binder, but in a case where a water-soluble substance is contained in the cured binder, a holding power of the cured binder with respect to the copper compound decreases, and the copper compound is desorbed.

In addition, it is preferable that the water-insoluble polymerization initiator is a photopolymerization initiator. This is because in a case of using the electromagnetic curable resin, it is possible to allow a polymerization reaction to easily proceed by light such as a visible light ray or an ultraviolet ray.

In the antimicrobial composition and the method for manufacturing an antimicrobial substrate of the second invention, it is preferable to use a photopolymerization initiator having reducing power. This is because the photopolymerization initiator reduces the copper compound contained in the antimicrobial composition of the second invention to copper ions (I) having an antimicrobial effect such as an antiviral effect, and is capable of suppressing copper ions (I) from being oxidized and from being changed to copper ions (II) having poor antimicrobial properties.

The antimicrobial composition of the second invention is the most effective with respect to a virus and/or a fungus. This is because copper ions (I) reduce water or oxygen in the air by reducing power of copper (I), and thus, generate active oxygen, a hydrogen peroxide solution or super oxide anions, hydroxy radicals, and the like, and effectively destroy protein configuring a virus or a fungus.

Specifically, it is preferable that the polymerization initiator is at least one selected from the group consisting of an alkyl phenone-based polymerization initiator, a benzophenone-based polymerization initiator, an acyl phosphine oxide-based polymerization initiator, an intramolecular hydrogen abstraction type polymerization initiator, and an oxime ester-based polymerization initiator.

Examples of the alkyl phenone-based polymerization initiator include 2,2-dimethoxy-1,2-diphenyl ethan-1-one, 1-hydroxy-cyclohexyl-phenyl-ketone (corresponding to a polymerization initiator of Examples 1 to 4), 2-hydroxy-2-methyl-1-phenyl-propan-1-one, 1-[4-(2-hydroxy ethoxy)-phenyl ]-2-hydroxy-2-methyl-1-propan-1-one, 2-hydroxy-1-{4-[4-(2-hydroxy-2-methyl-propionyl)-benzyl] phenyl}-2-methyl-propan-1-one, 2-methyl-1-(4-methyl thiophenyl)-2-morpholinopropan-1-one, 2-benzyl-2-dimethyl amino-1-(4-morpholinophenyl)-butanone-1, 2-(dimethyl amino)-2-[(4-methyl phenyl) methyl]-1-[4-(4-morphonyl) phenyl]-1-butanone, and the like.

Examples of the acyl phosphine oxide-based polymerization initiator include 2,4,6-trimethyl benzoyl-diphenyl-phosphine oxide, bis(2,4,6-trimethyl benzoyl)-phenyl phosphine oxide, and the like.

Examples of the intramolecular hydrogen abstraction type polymerization initiator include phenyl glyoxylic acid methyl ester, an oxyphenyl acetic acid, a mixture of 2-[2-oxo-2-phenyl acetoxy ethoxy] ethyl ester, an oxyphenyl acetic acid, and 2-(2-hydroxy ethoxy) ethyl ester, and the like.

Examples of the oxime ester-based polymerization initiator include 1,2-octane dione, 1-[4-(phenyl thio)-2-(O-benzoyl oxime)], ethanone, 1-[9-ethyl-6-(2-methyl benzoyl)-9H-carbazol-3-yl]-1-(0-acetyl oxime), and the like.

In the antimicrobial composition and the method for manufacturing an antimicrobial substrate of the second invention, it is preferable that the polymerization initiator includes at least one or more selected from an alkyl phenone-based polymerization initiator, and benzophenone or a derivative thereof. This is because the reducing power is expressed by an electromagnetic wave such as an ultraviolet ray. Among the photopolymerization initiators, benzophenone or a derivative thereof is particularly preferable.

It is preferable that the polymerization initiator includes an alkyl phenone-based polymerization initiator and a benzophenone-based polymerization initiator, a concentration of the alkyl phenone-based polymerization initiator is 0.5 to 3.0 wt % with respect to the binder, and a concentration of the benzophenone-based polymerization initiator is 0.5 to 2.0 wt % with respect to the binder. It is preferable that a ratio of the alkyl phenone-based polymerization initiator to the benzophenone-based polymerization initiator is Alkyl Phenone-Based Polymerization Initiator/Benzophenone-Based Polymerization Initiator=1/1 to 4/1, in a weight ratio. This is because it is possible to attain a high crosslinking density, it is possible to increase the hardness of the cured material and to improve abrasion resistance, and it is possible to increase the reducing power with respect to copper. It is preferable that the crosslinking density is greater than or equal to 85%, in particular, is greater than or equal to 95%.

In a case where the uncured electromagnetic curable resin (the monomer or the oligomer) is used as the binder, it is preferable that a content ratio of the copper compound in the antimicrobial composition is 2.0 to 30.0 weight %, it is preferable that a content ratio of the uncured electromagnetic curable resin (the monomer or the oligomer) is 15 to 40 weight %, and it is preferable that a content ratio of the dispersion medium is 30 to 80 weight %.

In addition, in a case where the uncured inorganic binder is used as the binder, it is preferable that a content ratio of the copper compound in the antimicrobial composition is 2 to 30 weight %, and it is preferable that a content ratio of the dispersion medium is 30 to 80 weight %. In this case, a content ratio of an inorganic oxide such as silica, in the mixed composition is 5 to 20 weight %.

In the antimicrobial composition of the second invention, as needed, a pH adjuster, an ultraviolet absorber, an antioxidant, a light stabilizer, an adhesion promoter, a rheology regulator, a leveling agent, an antifoaming agent, and the like may be blended.

It is preferable that copper compound, the binder component, and the polymerization initiator are added to the dispersion medium, and then, are sufficient stirring with a mixer or the like is performed to be a composition in which copper compound, the binder component, and the polymerization initiator are dispersed at a homogeneous concentration, and then, the composition is attached onto the surface of the base material.

In the present invention, the antimicrobial composition is attached onto the surface of the base material. The antimicrobial composition may be attached such that the antimicrobial composition is scattered in the form of islands on the surface of the base material in a state of being divided or a region in which the antimicrobial composition is attached onto the surface of the base material and a region in which the antimicrobial composition is not attached onto the surface of the base material are mixed, that is, a part of the surface of the base material is exposed. The antimicrobial composition may be formed on the surface of the base material in the form of a film.

In order to set the surface of the base material in the state described above, for example, a method of scattering the antimicrobial composition by using a spray method, a twin-fluid spray method, an electrostatic spray method, an aerosol method, and the like, a method of applying the antimicrobial composition by using a coating tool such as a bar coater for coating and an applicator, and the like are exemplified.

In the second invention, the spray method indicates the antimicrobial composition is sprayed in a mist state by using gas such as high-pressure air or a mechanical motion (a finger, a piezo element, or the like), and a liquid droplet of the antimicrobial composition is attached onto the surface of the base material.

In the second invention, the twin-fluid spray method is one type of spray method, and indicates that gas such as high-pressure air and the antimicrobial composition are mixed, and then, are sprayed from a nozzle in a mist state, and a liquid droplet of the antimicrobial composition is attached onto the surface of the base material.

In the second invention, the electrostatic spray method is a scattering method using an electric-charged antimicrobial composition, the antimicrobial composition is sprayed in a mist state by the spray method described above, and a method for setting the antimicrobial composition in a mist state includes a gun type method of spraying the antimicrobial composition with a sprayer and an electrostatic atomization method using the repulsion of the electric-charged antimicrobial composition, in which the gun type method includes a method of spraying the electric-charged antimicrobial composition and a method of applying an electric charge to the sprayed antimicrobial composition in a mist state by corona discharge from an external electrode. The liquid droplet in a mist state is electrically charged, and thus, is easily attached onto the surface of the base material, and the antimicrobial composition can be excellently attached onto the surface of the base material in a state of being finely divided.

In the second invention, the aerosol method is a method of blowing the antimicrobial composition containing a metal compound in a mist state that is generated physically and chemically to a target.

According to the attaching step, the antimicrobial composition containing the copper compound, the uncured binder, the dispersion medium, and the polymerization initiator is scattered in the form of islands on the surface of the base material in a state of being divided or the region in which the antimicrobial composition is attached onto the surface of the base material and the region in which the antimicrobial composition is not attached onto the surface of the base material are mixed. It is obvious that the antimicrobial composition may be formed on the surface of the base material in the form of a film.

(2) Drying Step

The antimicrobial composition containing the copper compound, the uncured binder, the dispersion medium, and the polymerization initiator, which is scattered in the scattering step, is dried, and the dispersion medium is evaporated and removed, and thus, the uncured binder containing the copper compound and the like can be temporarily fixed onto the surface of the base material, and the copper compound can be exposed on the surface of the solidified uncured binder by the contraction of the cured binder. 20° C. to 100° C. and 0.5 to 5.0 minutes are preferable as a drying condition. The drying can be performed by an infrared ray lamp, a heater, or the like. In addition, reduced-pressure (vacuum) drying may be performed.

In the method for manufacturing an antimicrobial substrate of the second invention, the drying step and the curing step may be simultaneously performed.

(3) Curing Step

In the method for manufacturing an antimicrobial substrate of the second invention, as the curing step, the uncured binder in the antimicrobial composition from which the dispersion medium is removed in the drying step or in the antimicrobial composition containing the dispersion medium is cured, and the cured binder is obtained.

Examples of a method of curing the uncured binder include a method of removing the dispersion medium by drying, a method of accelerating the polymerization of a monomer or an oligomer by heating or the irradiation of an electromagnetic wave, and the like. Examples of the drying include reduced-pressure drying, heating drying, and the like. In addition, in a case where the binder is a thermosetting resin, the curing proceeds by heating. The heating can be performed by a heater, an infrared ray lamp, an ultraviolet ray lamp, and the like. In a case where the uncured binder is an electromagnetic curable resin, the electromagnetic wave to be applied to the electromagnetic curable resin is not limited, examples of the electromagnetic wave include an ultraviolet ray (UV), an infrared ray, a visible light ray, a microwave, an electron beam (EB), and the like, and among them, the ultraviolet ray (UV) is preferable.

According to such steps, it is possible to manufacture the antimicrobial substrate of the second invention.

The polymerization initiator is added to the antimicrobial composition, and thus, in a case of containing a monomer or an oligomer as the binder, a polymerization reaction of the monomer or the oligomer proceeds. In addition, the polymerization initiator reduces copper, and thus, it is possible to reduce copper (II) to copper (I) and to increase the amount of copper (I), and therefore the cured binder having high antimicrobial activity with respect to a virus or the like can be obtained.

In the attaching step, since the antimicrobial composition is scattered in the form of islands or the region in which the antimicrobial composition is attached onto the surface of the base material and the region in which the antimicrobial composition is not attached onto the surface of the base material are mixed, the obtained cured binder is also scattered in the form of islands or a region in which the cured binder is attached onto the surface of the base material and a region in which the cured binder is not attached onto the surface of the base material are mixed. In addition, the cured binder may be formed on the surface of the base material in the form of a film.

The coverage of the cured binder with respect to the surface of the base material can be adjusted by manipulating the concentration of the antimicrobial component such as the antiviral component, in the antimicrobial composition, the concentration of the dispersion medium, a scattering pressure, a jetting speed of a coating liquid, a coating time, and the like. In a case of performing injection by using a spray gun, it is possible to adjust the coverage of the cured binder by changing an air pressure or a spray coating width of the spray gun, a movement speed of the spray gun, a jetting speed of a coating liquid, and a coating distance.

After that, the reducing power of the polymerization initiator is expressed by the irradiation of an ultraviolet ray. In any step of the method for manufacturing an antimicrobial substrate of the second invention, it is preferable to irradiate the polymerization initiator with an electromagnetic wave of a predetermined wavelength, for example, an ultraviolet ray or the like, in order to express the reducing power of the polymerization initiator. In particular, it is effective to use a photopolymerization initiator, since radicals are generated by the irradiation of an electromagnetic wave, copper ions are reduced, and thus, it is possible to increase the amount of copper (I) having high antimicrobial activity, in particular, high antiviral activity.

According to the method for manufacturing an antimicrobial substrate of the second invention, it is possible to manufacture the antimicrobial substrate in which the cured binder is fixedly formed on the surface of the base material in the form of islands or the region in which the cured binder is fixedly formed on the surface of the base material and the region in which the cured binder is not fixedly formed on the surface of the base material are mixed. As a result thereof, it is possible to decrease the contact area between the cured binder and the surface of the base material and to suppress the residual stress of the cured binder or a stress generated at the time of a thermal cycle, and it is possible to form the cured binder having high adhesiveness with respect to the base material.

In a case where the cured material of the binder is fixed by being scattered in the form of islands or the region in which the cured material of the binder is fixedly formed on the surface of the base material and the region in which the cured material of the binder is not fixedly formed on the surface of the base material are mixed, the surface area of the cured binder increases, and a microorganism such as a virus is easily trapped between the cured binders, and thus, a probability of contact between the cured binder having antimicrobial performance and the microorganism such as the virus increases, and high antimicrobial performance can be expressed.

In addition, according to the method for manufacturing an antimicrobial substrate of the second invention, the cured binder is fixedly formed on the surface of the base material in the form of a film, and thus, it is possible to manufacture the antimicrobial substrate excellent in durability with respect to wiping cleaning. For this reason, resistance with respect to wiping cleaning is excellent, compared to a case where the cured binder is dispersed and fixed in the form of islands or the region in which the cured binder is fixedly formed on the surface of the base material and the region in which the cured binder is not fixedly formed on the surface of the base material are mixed.

On the other hand, in a case where the cured binder is fixedly formed on the base material in the form of a film, the visibility of the design of the surface of the base material, the antimicrobial performance, and the adhesiveness of the cured binder with respect to the base material after a thermal cycle decrease, compared to a case where the cured binder is dispersed and fixed in the form of islands or the region in which the cured binder is fixedly formed the surface of the base material and the region in which the cured binder is not fixedly formed the surface of the base material are mixed.

EXAMPLES

Example 1

(1) A copper acetate (II) monohydrate powder (manufactured by FUJIFILM Wako Pure Chemical Corporation) was dissolved in pure water such that the concentration of copper acetate was 6 wt %, and then, stirring with a magnetic stirrer was performed at 600 rpm for 15 minutes, and thus, a copper acetate aqueous solution was prepared. A photoradical polymerization type acrylate resin (UCECOAT 7200, manufactured by DAICEL-ALLNEX LTD.) and a photopolymerization initiator (Omnirad 500, manufactured by IGM Resins, Inc.) were mixed at a weight ratio of 98:2, and stirring with a stirring rod was performed, and thus, an ultraviolet curable resin liquid was prepared. The copper acetate aqueous solution of 6 wt % and the ultraviolet curable resin liquid were mixed at a weight ratio of 4.8:1.0, and stirring with a magnetic stirrer was performed at 600 rpm for 2 minutes by using a magnetic stirrer, and thus, an antiviral composition was prepared. Note that, the photopolymerization initiator (Omnirad 500 manufactured by IGM Resins, Inc.) is identical to a photopolymerization initiator (IRGACURE 500 manufactured by BASF SE), and is a mixture of 1-hydroxy-cyclohexyl-phenyl-ketone and benzophenone (in a weight ratio, 1-Hydroxy-Cyclohexyl-Phenyl-Ketone (Alkyl Phenone):Benzophenone=1:1). The photopolymerization initiator is insoluble in water, and expresses reducing power by an ultraviolet ray.

(2) Subsequently, the antiviral composition was scattered on a glass plate having a size of 300 mm×300 mm into an atomized shape, by a spray gun (FINER SPOT G12, manufactured by MEIJI AIR COMPRESSOR MFG. CO., LTD.) such that spraying amount becomes 23 $g/m^2$ in a state of containing a dispersion medium, and a liquid droplet of the antiviral composition was scattered on the surface of the glass plate in the form of islands.

(3) After that, drying was performed at 80° C. for 1 minute, and thus, an antiviral substrate, in which a cured material of an electromagnetic curable resin containing a copper compound was scattered in the form of islands on the surface of the glass plate that was a base material was obtained.

(4) Next, the antiviral composition was irradiated with an ultraviolet ray by using an ultraviolet ray irradiation apparatus such that an integrated light amount was 1250 $mJ/cm^2$, and thus, an uncured photoradical polymerization type acrylate resin (a monomer) was polymerized and cured. As a result, an island-shaped coating film in which a maximum width of a cured resin in a direction parallel to the surface of the base material was 1 to 100 μm was obtained.

As described above, the antiviral substrate in which the cured material of the electromagnetic curable resin containing the copper compound was scattered in the form of islands on the surface of the glass plate that was the base material was manufactured. It is assumed that copper acetate is changed to copper hydroxide and a part thereof is changed to copper oxide.

Example 2

(1) A copper nitrate (II) trihydrate powder (manufactured by Kanto Chemical Co., Inc.) was dissolved in pure water such that the concentration of copper nitrate was 6 wt %, and then, stirring with a magnetic stirrer was performed at 600 rpm for 15 minutes, and thus, a copper nitrate aqueous solution was prepared. A photoradical polymerization type acrylate resin (UCECOAT 7200, manufactured by DAICEL-ALLNEX LTD.) and a photopolymerization initiator (Omnirad 500, manufactured by IGM Resins, Inc.) were mixed at a weight ratio of 98:2, and stirring with a stirring rod was performed, and thus, an ultraviolet curable resin liquid was prepared. The copper nitrate aqueous solution of 6 wt % and the ultraviolet curable resin liquid were mixed at a weight ratio of 4.8:1.0, and stirring with a magnetic stirrer was performed at 600 rpm for 2 minutes, and thus, an antiviral composition was prepared. Note that, the photopolymerization initiator (Omnirad 500 manufactured by IGM Resins, Inc.) is identical to the photopolymerization initiator (IRGACURE 500 manufactured by BASF SE), and is a mixture of 1-hydroxy-cyclohexyl-phenyl-ketone and benzophenone (in a weight ratio, 1-Hydroxy-Cyclohexyl-Phenyl-Ketone (Alkyl Phenone):Benzophenone=1:1). The photopolymerization initiator is insoluble in water, and expresses reducing power by absorbing an ultraviolet ray.

(2) Subsequently, the antiviral composition was scattered on a glass plate having a size of 300 mm×300 mm into an atomized shape, by a spray gun (FINER SPOT G12, manufactured by MEIJI AIR COMPRESSOR MFG. CO., LTD.) such that spraying amount becomes 23 $g/m^2$ in a state of containing a dispersion medium, and a liquid droplet of the antiviral composition was scattered on the surface of the glass plate in the form of islands.

(3) After that, drying was performed at 80° C. for 1 minute, and thus, an antiviral substrate in which a cured material of an electromagnetic curable resin containing a copper compound and was formed of a porous body was scattered in the form of islands on the surface of the glass plate that was a base material.

(4) Next, the antiviral composition was irradiated with an ultraviolet ray by using an ultraviolet ray irradiation apparatus such that an integrated light amount was 1250 mJ/cm$^2$, and thus, an uncured photoradical polymerization type acrylate resin (a monomer) was polymerized and cured. As a result, an island-shaped coating film in which a maximum width of a cured resin in a direction parallel to the surface of the base material was 1 to 100 μm was obtained.

As described above, the antiviral substrate in which the cured material of the electromagnetic curable resin containing the copper compound was scattered in the form of islands on the surface of the glass plate that was the base material was obtained.

Example 3

(1) A copper acetate (II) monohydrate powder (manufactured by FUJIFILM Wako Pure Chemical Corporation) was dissolved in pure water such that the concentration of copper acetate was 3.3 wt %, and then, stirring with a magnetic stirrer was performed at 600 rpm for 15 minutes, and thus, a copper acetate aqueous solution was prepared. A photoradical polymerization type acrylate resin (UCECOAT 7200, manufactured by DAICEL-ALLNEX LTD.) and a photopolymerization initiator (Omnirad 500, manufactured by IGM Resins, Inc.) were mixed at a weight ratio of 98:2, and stirring with a stirring rod was performed, and thus, an ultraviolet curable resin liquid was prepared. The copper acetate aqueous solution of 3.3 wt % and the ultraviolet curable resin liquid were mixed at a weight ratio of 0.4:1.0, and stirring with a magnetic stirrer was performed at 600 rpm for 2 minutes, and thus, an antiviral composition was prepared. Note that, the photopolymerization initiator (Omnirad 500 manufactured by IGM Resins, Inc.) is identical to the photopolymerization initiator (IRGACURE 500 manufactured by BASF SE), and is a mixture of 1-hydroxy-cyclohexyl-phenyl-ketone and benzophenone. The photopolymerization initiator is insoluble in water, and expresses reducing power by absorbing an ultraviolet ray.

(2) Subsequently, the antiviral composition was scattered on a glass plate having a size of 300 mm×300 mm into an atomized shape, by a spray gun (FINER SPOT G12, manufactured by MEIJI AIR COMPRESSOR MFG. CO., LTD.) such that spraying amount becomes 58.8 g/m$^2$ in a state of containing a dispersion medium, and a liquid droplet of the antiviral composition was scattered on the surface of the glass plate in the form of islands.

(3) After that, the antiviral composition was irradiated with an ultraviolet ray by using an ultraviolet ray irradiation apparatus such that an integrated light amount was 14400 mJ/cm$^2$, and thus, an uncured photoradical polymerization type acrylate resin (a monomer) was polymerized and cured. As a result, an island-shaped coating film in which a maximum width of a cured resin in a direction parallel to the surface of the base material was 1 to 100 μm was obtained.

As described above, the antiviral substrate in which the cured material of the electromagnetic curable resin containing the copper compound was scattered in the form of islands on the surface of the glass plate that was the base material was obtained. It is assumed that copper acetate is changed to copper hydroxide and a part thereof is changed to copper oxide.

Example 4

Basically, as with Example 3, but 1.8 parts by weight of a powder of copper hydroxide (II) with respect to 100 parts by weight of pure water was dispersed in pure water, and a copper hydroxide dispersion liquid and an ultraviolet curable resin liquid were mixed at a weight ratio of 0.4:1.0, and stirring with a magnetic stirrer was performed at 600 rpm for 2 minutes, and thus, an antiviral composition was prepared.

Example 5

(1) A copper acetate (II) monohydrate powder (manufactured by FUJIFILM Wako Pure Chemical Corporation) was dissolved in ethanol (manufactured by Amakasu Chemical Industries) such that the concentration of copper acetate was 0.4 wt %, and then, stirring with a magnetic stirrer was performed at 600 rpm for 30 minutes, and thus, a copper acetate ethanol liquid was prepared. Instead of the ultraviolet curable resin, inorganic sol (N-103X, manufactured by Colcoat Co, Ltd.) forming a siloxane bond at the time of curing and a photopolymerization initiator (Omnirad 500, manufactured by IGM Resins, Inc.) were mixed at a weight ratio of 1600:1, and stirring with a stirring rod was performed, and thus, an inorganic sol curing liquid was prepared. The copper acetate ethanol liquid of 0.4 wt % and the inorganic sol curing liquid were mixed at a weight ratio of 1.0:9.6, and stirring with a magnetic stirrer was performed at 600 rpm for 2 minutes, and thus, an antiviral composition was prepared. Note that, the photopolymerization initiator (Omnirad 500 manufactured by IGM Resins, Inc.) is identical to photopolymerization initiator (IRGACURE 500 manufactured by BASF SE), and is a mixture of 1-hydroxy-cyclohexyl-phenyl-ketone and benzophenone. The photopolymerization initiator is insoluble in water, and expresses reducing power by an ultraviolet ray.

(2) Subsequently, the antiviral composition was scattered on a glass plate having a size of 300 mm×300 mm into an atomized shape, by a spray gun (FINER SPOT G12, manufactured by MEIJI AIR COMPRESSOR MFG. CO., LTD.) such that spraying amount becomes 1473.5 g/m$^2$ in a state of containing a dispersion medium, and a liquid droplet of the antiviral composition was scattered on the surface of the glass plate in the form of islands.

(3) After that, drying was performed at 80° C. for 3 minutes, and then, the antiviral composition was irradiated with an ultraviolet ray by using an ultraviolet ray irradiation apparatus such that an integrated light amount was 2400 mJ/cm$^2$, and thus, an antiviral substrate in which an inorganic sol cured material containing a copper compound and was formed of an inorganic porous body was scattered in the form of islands on the surface of the glass plate that was a base material was manufactured. It is assumed that copper acetate is changed to copper hydroxide and a part thereof is changed to copper oxide.

Example 6

(1) A copper acetate (II) monohydrate powder (manufactured by FUJIFILM Wako Pure Chemical Corporation) was dissolved in pure water such that the concentration of copper acetate was 0.7 wt %, and then, stirring with a magnetic stirrer was performed at 600 rpm for 15 minutes, and thus, a copper acetate aqueous solution was prepared. A photoradical polymerization type acrylate resin (UCECOAT 7200, manufactured by DAICEL-ALLNEX LTD.) and a photopolymerization initiator (Omnirad 500, manufactured by IGM Resins, Inc.) were mixed at a weight ratio of 98:2, and stirring with a homogenizer was performed at 8000 rpm for 10 minutes, and thus, an ultraviolet curable resin liquid was prepared. The copper acetate aqueous solution of 0.7 wt % and the ultraviolet curable resin liquid were mixed at a weight ratio of 1.9:1.0, and stirring with a magnetic stirrer was performed at 600 rpm for 2 minutes, and thus, an antiviral composition was prepared. Note that, the photopolymerization initiator (Omnirad 500 manufactured by IGM Resins, Inc.) is identical to the photopolymerization initiator (IRGACURE 500 manufactured by BASF SE), and is a mixture of 1-hydroxy-cyclohexyl-phenyl-ketone and benzophenone. The photopolymerization initiator is insoluble in water, and expresses reducing power by absorbing an ultraviolet ray.

(2) Subsequently, the antiviral composition was applied onto the surface of a melamine decorative sheet with an embossed surface, having a size of 200 mm×200 mm and a glass plate having a size of 200 mm×200 mm, in a state of containing a dispersion medium, by using a bar coater of No. 13, and thus, the surface of the melamine decorative sheet with an embossed surface and the surface of the glass plate were coated with a film of the antiviral composition.

(3) After that, drying was performed at 80° C. for 1 minute, and thus, a transparent antiviral composition containing a copper compound was obtained on the surface of the melamine decorative sheet with an embossed surface and the surface of the glass plate that were a base material.

(4) Further, the antiviral composition was irradiated with an ultraviolet ray by using an ultraviolet ray irradiation apparatus such that an integrated light amount was 2400 $mJ/cm^2$, and thus, an uncured photoradical polymerization type acrylate resin (a monomer) was polymerized and cured. As a result, a coating film having a thickness of 10 µm on the surface of the melamine decorative sheet and the surface of the glass plate in the form of a film was obtained. It is assumed that copper acetate is changed to copper hydroxide and a part thereof is changed to copper oxide.

Example 7

As with Example 1, but an antiviral composition was scattered into an atomized shape, by a spray gun (FINER SPOT G12, manufactured by MEIJI AIR COMPRESSOR MFG. CO., LTD.) such that spraying amount becomes 92 $g/m^2$ in a state of containing a dispersion medium, and an attachment amount with respect to the surface of a base material was increased, and thus, a coating film in which a region an antiviral cured resin was fixed and a region in which the antiviral cured resin was not fixed were mixed was manufactured.

Figure 6:
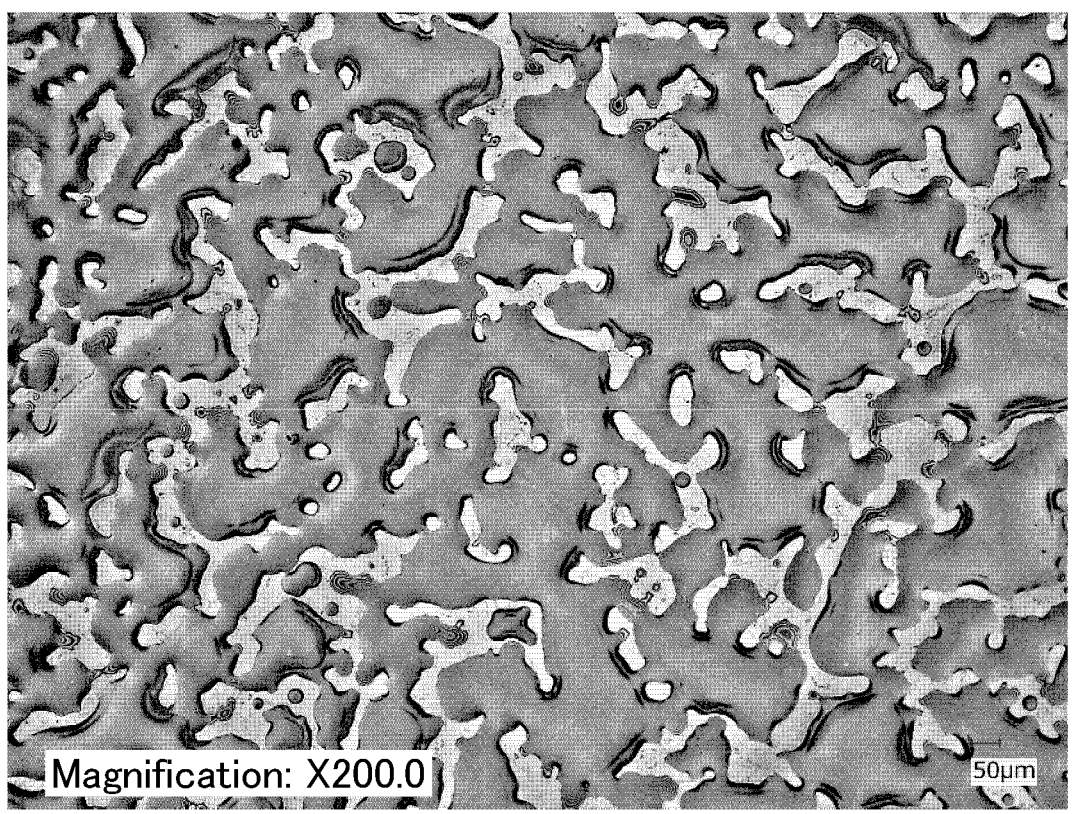
FIG. 6 is an optical microscope picture illustrating an antiviral substrate that is manufactured in Example 7.

FIG. 6 is an optical microscope picture illustrating the antiviral substrate that is manufactured in Example 7.

Example 8

(1) A copper acetate (II) monohydrate powder (manufactured by FUJIFILM Wako Pure Chemical Corporation) was dissolved in pure water such that the concentration of copper acetate was 1.75 wt %, and then, stirring with a magnetic stirrer was performed at 600 rpm for 15 minutes, and thus, a copper acetate aqueous solution was prepared. A photoradical polymerization type acrylate resin (UCECOAT 7200, manufactured by DAICEL-ALLNEX LTD.), a photopolymerization initiator (Omnirad 500, manufactured by IGM Resins, Inc.), and a photopolymerization initiator (Omnirad 184, manufactured by IGM Resins, Inc.) were mixed at a weight ratio of 97:2:1, and stirring with a homogenizer was performed at 8000 rpm for 10 minutes, and thus, an ultraviolet curable resin liquid was prepared. The copper acetate aqueous solution of 1.75 wt % and the ultraviolet curable resin liquid were mixed at a weight ratio of 1.9:1.0, and stirring with a magnetic stirrer was performed at 600 rpm for 2 minutes, and thus, an antiviral composition was prepared. Note that, the photopolymerization initiator (Omnirad 500 manufactured by IGM Resins, Inc.) is identical to the photopolymerization initiator (IRGACURE 500 manufactured by BASF SE), and is a mixture of 1-hydroxy-cyclohexyl-phenyl-ketone (alkyl phenone) and benzophenone at a ratio of 1:1. This photopolymerization initiator is insoluble in water, and expresses reducing power by absorbing an ultraviolet ray. On the other hand, the photopolymerization initiator (Omnirad 184, manufactured by IGM Resins, Inc.) is 1-hydroxy-cyclohexyl-phenyl-ketone (alkyl phenone). Thus, as the photopolymerization initiator, alkyl phenone and benzophenone exist at a weight ratio of 2:1.

(2) Subsequently, a liquid droplet of a mixed composition was scattered on a black glossy melamine plate having a size of 300 mm×300 mm into the shape of mist, at an air pressure of 0.1 MPa, a jetting speed of 1.2 g/minute, and a stroke speed of 30 cm/sec, such that spraying amount becomes 16.7 $g/m^2$ in a state of containing a dispersion medium, by using a spray gun (FINER SPOT G12, manufactured by MEIJI AIR COMPRESSOR MFG. CO., LTD.), and the liquid droplet was attached onto the surface of the melamine plate.

(3) After that, the black glossy melamine plate was dried at 80° C. for 3 minutes, and was further irradiated with an ultraviolet ray at an irradiation intensity of 30 $mW/cm^2$ for 80 seconds by using an ultraviolet ray irradiation apparatus (MP02, manufactured by Coattec. Inc.), and thus, an antiviral substrate in which a cured binder containing a copper compound was fixedly formed on the surface of the black glossy melamine plate that was a base material such that a part of the surface was exposed was obtained. Note that, it is assumed that copper acetate is changed to copper hydroxide and a part thereof is changed to copper oxide.

Example 9

As with Example 8, but a photoradical polymerization type acrylate resin (UCECOAT 7200, manufactured by DAICEL-ALLNEX LTD.), a photopolymerization initiator (Omnirad 500 manufactured by IGM Resins, Inc.), and a photopolymerization initiator (Omnirad 184, manufactured by IGM Resins, Inc.) are at a weight ratio of 97.5:1:1.5 (alkyl phenone and benzophenone exist at a weight ratio of 4:1).

Example 10

As with Example 8, but a photoradical polymerization type acrylate resin (UCECOAT 7200, manufactured by DAICEL-ALLNEX LTD.), a photopolymerization initiator (Omnirad 500 manufactured by IGM Resins, Inc.), and a photopolymerization initiator (Omnirad 184, manufactured by IGM Resins, Inc.) are at a weight ratio of 97:1:2 (alkyl phenone and benzophenone exist at a weight ratio of 5:1).

Example 11

As with Example 8, but a photoradical polymerization type acrylate resin (UCECOAT 7200, manufactured by DAICEL-ALLNEX LTD.), a photopolymerization initiator (Omnirad 500 manufactured by IGM Resins, Inc.), and benzophenone (manufactured by FUJIFILM Wako Pure Chemical Corporation) as a photopolymerization initiator are at a weight ratio of 97:2:1 (alkyl phenone and benzophenone exist at a weight ratio of 0.5:1).

Example 12

As with Example 8, but an irradiation time of an ultraviolet ray is 240 seconds.

Example 13

As with Example 8, but an irradiation time of an ultraviolet ray is 30 minutes.

Example 14

As with Example 8, but an irradiation time of an ultraviolet ray is 120 minutes.

Example 15

As with Example 8, but 2.2 weight % of copper sulfate was used instead of 1.75 weight % of copper acetate.

Comparative Example 1

(1) 1.92 g of silver stearate and 0.192 g of saccharin were added to 350 g of glycerin, and were heated at 150° C. for 40 minutes. The resultant liquid was cooled to 60° C., and then, 350 g of methyl isobutyl ketone was added and stirred. Still standing was performed for approximately 1 hour, and then, a methyl isobutyl ketone layer was collected, and thus, a dispersion liquid containing fatty acid-modified silver superparticles was obtained. A photoradical polymerization type acrylate resin (UCECOAT 7200, manufactured by DAICEL-ALLNEX LTD.) and a photopolymerization initiator (Omnirad 500, manufactured by IGM Resins, Inc.) were mixed at a weight ratio of 98:2, and stirring with stirring rod was performed, and thus, an ultraviolet curable resin liquid was prepared. A methyl isobutyl ketone dispersion liquid containing the fatty acid-modified silver superparticles and the ultraviolet curable resin liquid were mixed at a weight ratio of 61.3:1.0, and stirring with a magnetic stirrer was performed at 600 rpm for 2 minutes, and thus, an antiviral composition was prepared.

(2) The antiviral composition applied onto an OPP (stretched polypropylene) film having a size of 300 mm×300 mm of which a coating surface was subjected to a corona treatment by a bar coater of No. 14, and then, was dried at 60° C. for 10 minutes, and thus, solidified resultant liquid was fixed onto the OPP film.

(3) After that, the antiviral composition was irradiated with an ultraviolet ray by using an ultraviolet ray irradiation apparatus such that an integrated light amount was 2400 mJ/cm$^2$, and thus, an uncured photoradical polymerization type acrylate resin (a monomer) was polymerized and cured, and thus, a coating film of a cured resin containing fine silver particles was obtained.

Comparative Example 2

(1) 100 mL of distilled water was heated to 50° C., then 5.25 g of copper sulfate (II) pentahydrate was put thereinto while being stirred, and the copper sulfate (II) pentahydrate was completely dissolved. After that, 20 mL of a sodium hydroxide aqueous solution of 2 mol/L and 2.8 mL of a hydrazine hydrate aqueous solution of 2 mol/L were simultaneously put thereinto. Stirring was strongly performed for 1 minute, and thus, a dispersion liquid in which copper suboxide particles were dispersed was obtained. After that, 30 mL of a glucose aqueous solution of 1.2 mol/L was put thereinto, and stirring was performed for 1 minute. After suction filtration was performed with quantitative filter paper (6 types), water washing was performed with 100 mL of distilled water, then a solid content was collected. Next, drying was performed at 60° C. for 3 hours, pulverization was performed with an agate mortar, and then, fine particles containing copper suboxide in which 1.5 parts by mass of glucose coexisted with respect to 100 parts by mass of the copper suboxide particles was obtained. Fine particles containing copper suboxide described above, colloidal silica (methanol silica sol, manufactured by Nissan Chemical Corporation), and pure water were mixed at a weight ratio of 1.0:18.6:47.6, and stirring with a magnetic stirrer was performed at 600 rpm for 2 minutes, and thus, an antiviral composition was prepared.

(2) Subsequently, the antiviral composition was scattered on a glass plate having a size of 300 mm×300 mm into an atomized shape, by a spray gun (FINER SPOT G12, manufactured by MEIJI AIR COMPRESSOR MFG. CO., LTD.) such that spraying amount becomes 31.4 g/m$^2$ in a state of containing a dispersion medium, and a liquid droplet of the antiviral composition was scattered on the surface of the glass plate in the form of islands.

(3) After that, the antiviral composition was heated and dried in the air, at 50° C. for 16 hours, by using a dryer (AS ONE DOV-450), and a solvent was volatilized, and thus, a coating substrate containing monovalent copper particles was obtained.

Comparative Example 3

(1) 100 parts by mass of copper suboxide, 1000 parts by mass of methyl ethyl ketone, and 30 parts by mass of a phosphoric acid ester type anion surfactant (PS-440E, manufactured by ADEKA CORPORATION) are mixed, then stirring is performed at 8000 rpm for 30 minutes by using a stirring machine, as a pre-dispersion treatment, and thus, a copper suboxide dispersion liquid is obtained.

(2) 25 parts by weight of the copper suboxide dispersion liquid of (1) and 10 parts by weight of a binder resin in which an acryl resin (ACRYDIC A801, manufactured by DIC Corporation, polyisocyanate is used as a curing agent) and Duranate (TAPA100, manufactured by Asahi Kasei Chemicals Corporation, hexamethylene diisocyanate-based polyisocyanate is used as a curing agent) are mixed at a ratio of 2.0:1.0 are mixed, and thus, an antiviral composition is prepared.

(3) Subsequently, the antiviral composition is applied onto a glass plate having a size of 300 mm×300 mm by a bar coater, the antiviral composition is dried and thermally cured at 100° C. for 30 seconds, and thus, a coating substrate containing monovalent copper particles is obtained.

Comparative Example 4

(1) A copper chloride (I) powder (manufactured by FUJIFILM Wako Pure Chemical Corporation) is suspended in pure water such that the concentration of copper chloride (I) is 0.34 wt %, and thus, stirring with a magnetic stirrer is performed at 600 rpm for 15 minutes, and thus, a copper chloride suspension liquid is prepared. The copper chloride (I) suspension liquid of 0.34 wt % and polyvinyl alcohol are mixed at a weight ratio of 1.9:1.0, and stirring with a magnetic stirrer is performed at 600 rpm for 2 minutes, and thus, an antiviral composition is prepared.

(2) Subsequently, a mixed composition is applied onto the surface of a glass plate having a size of 300 mm×300 mm by a brush.

(3) After that, the glass plate is dried at a room temperature for 24 hours, and thus, an antiviral substrate in which a film of a cured binder containing a copper compound is fixedly formed on the surface of the glass plate that is a base material such that a part of the surface is exposed is obtained.

Comparative Example 5

An aqueous solution in which the concentration of copper acetate (II) is 0.7 wt % is applied onto a black glossy melamine plate having a size of 300 mm×300 mm by a brush, and is attached onto the surface of the melamine plate. Subsequently, drying is performed at a room temperature for 48 hours without performing the irradiation of an ultraviolet ray.

Comparative Example 6

(1) 3 times the equivalent of an asparagic acid is added to 10 ml of $CuSO_4$(II) of 0.5 M, and NaOH of 0.1 M is gradually added thereto. Alkali dropping is stopped immediately before $Cu(OH)_2$(II) is precipitated, and heating is performed at 50° C. while performing stirring, and thus, a solution of a copper aspartate complex (II) is obtained.

(2) A photoradical polymerization type acrylate resin (UCECOAT 7200, manufactured by DAICEL-ALLNEX LTD.), a photopolymerization initiator (Omnirad 500 manufactured by IGM Resins, Inc.), and a photopolymerization initiator (Omnirad 184, manufactured by IGM Resins, Inc.) are mixed at a weight ratio of 97:2:1, and stirring with a homogenizer is performed at 8000 rpm for 10 minutes, and thus, an ultraviolet curable resin liquid is obtained. An aqueous solution of the copper aspartate complex and the ultraviolet curable resin liquid are mixed at a weight ratio of 1.9:1.0, and stirring with a magnetic stirrer is performed at 600 rpm for 2 minutes by using a magnetic stirrer, and thus, an antiviral composition is prepared.

(3) The antiviral composition is applied onto a glass plate by a brush, and then, the glass plate is dried at 80° C. for 3 minutes, and is irradiated with an ultraviolet ray for 80 seconds by using an ultraviolet ray irradiation apparatus (MP02, manufactured by Coattec. Inc.) such that an irradiation intensity is 30 mW/cm², and thus, an antiviral substrate in which a film of a cured binder containing a copper compound is fixedly formed on the surface of the glass plate that is a base material is obtained.

(Evaluation of Shape of Antiviral Substrate and Dispersion State of Copper Compound)

A scanning-type electron microscope picture (an SEM picture) of the obtained antiviral substrate was photographed.

Figure 2:
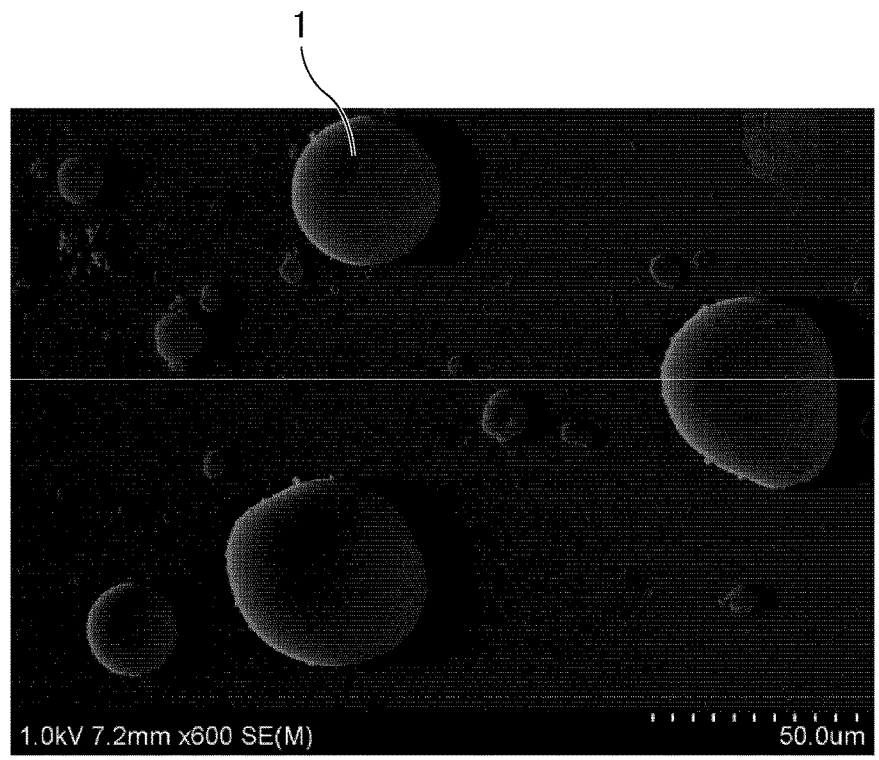
FIG. 2 is an SEM picture illustrating an antiviral substrate that is obtained in Example 1.

FIG. 2 is an SEM picture illustrating the antiviral substrate that is obtained in Example 1.

It is found that a cured resin 1 is scattered on the surface of the glass plate that is a base material in the form of islands.

In addition, an SEM picture of the surface of a portion in which the cured resin exists on the obtained antiviral substrate and a sectional surface of the cured resin cut in a direction perpendicular to the glass plate was photographed, and the concentration of the copper compound in the cured resin was analyzed by an energy dispersive X-ray analyzer (HORIBA ENERGY EMAX EX-350) mounted on a scanning-type electron microscope (HITACHI S-4800).

As an analysis condition of the concentration of the copper compound, measurement was performed at an acceleration voltage of 10 kV and a working distance (WD) of 15 mm. Note that, a Pt-deposited film having a film thickness of 6 nm for preventing electro static charge was attached in advance onto the surface of a sample, and then, measurement was performed.

A surface composition ratio of the cured resin obtained by the energy dispersive X-ray analyzer was calculated from a peak intensity of a characteristic X-ray of a carbon element and a copper element that were a main constituent element of a resin component. In a case of Example 1, a weight ratio was Cu:C=1:7.5, and in a case of Example 3, a weight ratio was Cu:C=1:46.2.

Figure 3:
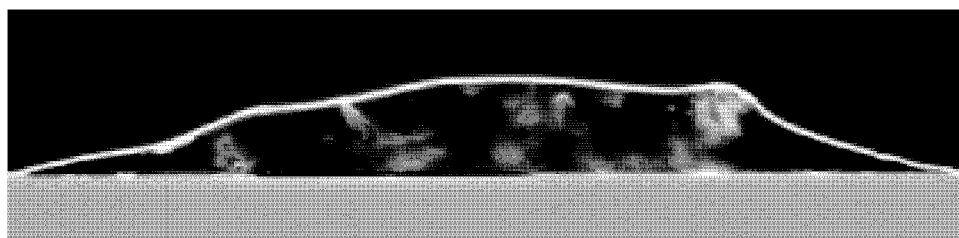
FIG. 3 is an SEM picture illustrating a sectional surface of a cured resin that is manufactured in Example 1.
Figure 4:
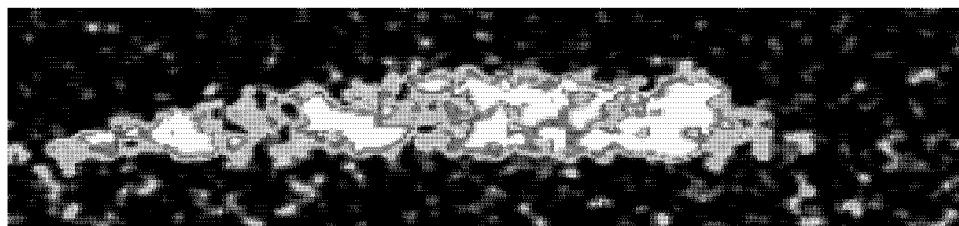
FIG. 4 is an SEM picture illustrating a result of analyzing a copper compound in the cured resin that is manufactured in Example 1, with an energy dispersive X-ray analyzer.
Figure 4:
Figure 4:

FIG. 3 is an SEM picture illustrating the sectional surface of the cured resin that is manufactured in Example 1, and FIG. 4 is an SEM picture illustrating a result of analyzing the copper compound in the cured resin that is manufactured in Example 1, with the energy dispersive X-ray analyzer.

As it is obvious from FIG. 3 and FIG. 4, it is found that the copper compound is excellently dispersed in the obtained island-shaped cured resin, and is exposed on the surface.

(Measurement of Total Light Ray Transmittance)

The total light ray transmittance of the antiviral substrate obtained in Examples 1 to 7 and Comparative Examples 2, 4, and 6 was measured by JIS K 7375:2008, Plastic-Total Light Ray Transmittance and a method based on the method of obtaining a total light ray reflectance. Measurement results of Examples 1 to 7 and Comparative Examples 2, 4, and 6 are shown in Table 1.

(Test for Measuring Eye Irritation)

The antiviral composition prepared in Examples 1 and 3 was evenly dropped onto the surface of the glass plate, and was dried at 80° C. for 3 hours, and thus, a solvent was volatilized. After that, both surfaces of the antiviral composition was interposed by the glass plates, and was irradiated from both surfaces by using an ultraviolet ray irradiation apparatus such that an integrated light amount was 3600 mJ/cm². After the glass plate on one side was removed, the surface of the antiviral composition was further irradiated such that an integrated light amount was 3600 mJ/cm², and thus, an antiviral cured resin was obtained. The cured resin on the surface of the glass plate was peeled off and collected by a metal spatula, and was mixed and pulverized by an agate mortar, and then, was dried at 80° C. for 1 hour, and thus, a powder-shaped cured resin was obtained. The powder-shaped cured resin was subjected to an eye irritation test using rabbits based on OECD: Guideline for the Testing of Chemicals 405 (2017). Binocular anterior eye portions of a test animal were inspected on the first day of the test, and were checked that there was no abnormality, and then, 0.1 mL of the cured resin was instilled into the monocular conjunctival sac of three rabbits, and upper and lower eyelids were gently aligned and retained for approximately 1 second. The other eye was set as a reference that was not treated. The cornea, the iris, the conjunctiva, and the like were observed by using a slit lamp, in 1 hour, 24 hours, 48 hours, 72 hours, 7 days, and 10 days after the cured resin was instilled into eyes, and the eye irritation was scored in accordance with the criterion of a Draize method. The summated scores of each of the test animals by using obtained score values were calculated, and average summated scores of three rabbits were obtained for each observation time. The eye irritation of the cured resin was evaluated from the highest value of the average summated scores during an observation period.

As a result thereof, in Example 1, an eye irritation score was 58.3, and in Example 3, an eye irritation score was 9.7. In the eye irritation, the antiviral substrate of Example 3 has Cu:C=1:46.2 and the eye irritation score of 9.7, and thus, satisfies a safeness score of less than or equal to 20.

Note that, in an application in which high antiviral properties are required (a medical application or the like), even in a case where the safety score of the eye irritation is greater than 20, it is possible to use the antiviral substrate of the first invention by wearing a protective gear such as a goggles.
(Test for Evaluating Water Resistance)

Water resistance performance of the antiviral substrate obtained in Example 3 and Comparative Example 2 was obtained from antiviral performance before and after an immersion test with respect to pure water. The antiviral substrate was cut to have each 50±2 mm square, and was disposed on a plastic petri dish having an outer diameter of 8.5 cm. 50 mL of pure water was added to the plastic petri dish on which the antiviral substrate is disposed, the dish was sealed, and immersion was performed at a room temperature for 8 hours. The antiviral substrate immersed in pure water was collected, and water attached onto the front surface and the back surface was wiped out with a fiber cloth, and the antiviral performance was measured. In Comparative Example 3, the same test is performed.
(Antiviral Property Evaluation Using Bacteriophage)

In order to evaluate the antiviral properties of the antiviral substrate obtained in Examples 1 to 15 and Comparative Examples 1, 2, 4, 5, and 6, the degree of virus inactivity was measured by a method in which an modified antiviral property test method of a visible light responsive photocatalyst material in JIS R1756. That is, the obtained antiviral substrate was cut to have each 50±2 mm square, a bacteriophage liquid was dropped into a sample such that the sample was covered with a film, and the sample was left to stand for 4 hours, and thus, a virus was inactivated. After that, the bacteriophage was infected with a coli bacterium, and was left to stand overnight, and thus, the number of viruses having infection ability was measured.

In measurement results, the concentration of viruses inactivated with respect to the coli bacterium is represented as the degree of virus inactivity. Here, the concentration of viruses inactivated with respect to the coli bacterium (a virus inertness) was used as the index of the concentration of viruses, and the degree of virus inactivity was calculated on the basis of the virus inertness.

The virus inertness is a result of measuring the concentration of viruses that can be infected with the coli bacterium, by using a phage virus Qβ concentration: 8300000 viruses/milliliter, in an antiviral property test using a bacteriophage and calculating the concentration of viruses inactivated with respect to the coli bacterium. That is, the virus inertness is the degree of the concentration in which viruses are not capable of being infected with the coli bacterium, with respect to the phage virus Qβ concentration, and can be calculated by (Phage Virus Qβ Concentration−Concentration of Viruses Capable of being Infected with Coli Bacterium)/(Phage Virus Qβ Concentration)×100.

The degree of virus inactivity is calculated from the virus inertness.

In a case where the amount of original virus is set to 1, and a relative amount of virus deactivated after a virus deactivation treatment is set to X, the degree of virus inactivity is a numerical value (a negative value) represented by common logarithm $\log(1-X)$, and an ability for inactivating a virus increases as an absolute value increases. For example, in a case where 99.9% of the original viruses is deactivated, the degree of virus inactivity is described as $\log(1-0.999)=-3.00$. Note that, the virus inertness indicates a ratio of the amount of virus deactivated after the virus deactivation treatment to the total amount of virus before the virus deactivation treatment is represented in % (in this case, 99.9%). As described above, the degree of virus inactivity was obtained from the virus inertness. The results of Examples 1 to 15 and Comparative Examples 1, 2, 4, 5, and 6 are shown in Table 1.
(Antiviral Property Evaluation Using Bacteriophage after Wiping)
(Wiping Treatment of Surface of Antiviral Substrate)

The antiviral substrate of Examples 1 and 8 to 15 and Comparative Examples 4 to 6 was subjected to a wiping test 5475 times at a pressure of 150 Pa by using a microfiber cloth in which tap water was soaked. The degree of virus inactivity was measured after the wiping test.
(Antiviral Property Evaluation Using Feline Calicivirus)

The antiviral property test was performed as follows.

In order to evaluate the antiviral properties of the antiviral substrate obtained in Examples 1 to 4, a method was used in which JIS Z 2801 Antibacterially Processed Product-Antibacterial Property Test Method Antibacterial Effect was modified. The modification is that "the inoculation of a test bacterial liquid" is changed to "the inoculation of a test virus". All changes due to the use of a virus were based on JIS L 1922 Antiviral Property Test Method of Fiber Product. In measurement results, the concentration of feline caliciviruses that lost an infection ability with respect to a CRFK cell is represented as the degree of feline calicivirus inactivity, on basis of JIS L 1922 Appendix B, with respect to each of the antiviral substrates obtained in Examples 1 to 4. Here, the concentration of viruses (the virus inertness) inactivated with respect to the CRFK cell was used as an index of the concentration of viruses, and an antiviral activity value was calculated on the basis of the virus inertness.

Hereinafter, the procedure will be described in detail.

(1) A test sample cut into the shape of a square having each 50 mm square is placed on a sterilized plastic petri dish, and 0.4 mL of a test virus liquid (>$10^7$ PFU/mL) is inoculated.

As the test virus liquid, $10^8$ PFU/mL of a stock is diluted 10 times with purified water.

(2) A polyethylene film of 50 mm square is prepared as a reference material, and as with the test sample, a virus liquid is inoculated.

(3) Polyethylene film of 40 mm square is applied onto the inoculated virus liquid, and the test virus liquid is evenly inoculated, and then, a reaction is performed at 25° C. for a predetermined time.

(4) 10 mL of a SCDLP culture medium is added immediately after the inoculation or after the reaction, and the virus liquid is washed away.

(5) An infection value of the virus is obtained by JIS L 1922 Appendix B.

(6) The antiviral activity value is calculated by using the following calculation expression.

Mv=Log(Vb/Vc)

Mv: Antiviral Activity Value

Log(Vb): Logarithmic Value of Infection Value of Polyethylene Film after Reaction for Predetermined Time Log(Vc): Logarithmic Value of Infectivity of Test Sample after Reaction for Predetermined Time Reference Standard of JIS L 1922 and JIS Z 2801

A measurement method was based on a plaque measurement method.

In addition, Feline calcivirus; Strain:F-9 ATCC VR-782 was used as a test virus. The results of Examples 1 to 4 are shown in Table 1.

(Measurement Test of Cu(I)/Cu(II))

A ratio of the number of ions of Cu(I) and Cu(II) was measured by an X-ray photoelectron spectroscopy analysis method (an XPS analysis method). A measurement condition is as follows.

Device: PHI 5000 Versa probeII, manufactured by ULVAC-PHI, INCORPORATED
X-Ray Source: Al Kα 1486.6 eV
Detection Angle: 45°
Measurement Diameter: 100 μm
Electric-Charged Neutralization: Present
Wide Scan
Measurement Step: 0.8 eV
Pass Energy: 187.8 eV
Narrow Scan
Measurement Step: 0.1 eV
Pass Energy: 46.9 eV A peak position of Cu(I) at a measurement time of 5 minutes was 932.5 eV±0.3 eV, a peak position of Cu(II) as 933.8 eV±0.3 eV, and the areas of each of the peaks were integrated, and thus, Cu(I)/Cu(II) was obtained from the ratio. The results of Examples 1 to 15 and Comparative Examples 5 and 6 are shown in Table 1.

(Evaluation of Adhesiveness of Cured Resin (Cured Binder) with Respect to Base Material)

The measurement was performed by the following method.

(1) 11 cuts reaching the base were formed on a test surface of the antiviral substrate obtained in Examples 1 to 15 and Comparative Examples 1, 2, 4, 5, and 6, by using a cutter knife, and thus, 100 grids were prepared. An interval between the cuts is 2 mm.

(2) Sellotape (Registered Trademark) is strongly pressure-bonded to a grid portion, the end of the tape is peeled off at an angle of 45° at once, and the state of the grids is evaluated in comparison with a standard drawing.

(3) A case where all of the grids are not peeled off (corresponding to Classification 0) is defined as no peeling.

(4) The antiviral substrate obtained in Examples 1 to 15 and Comparative Examples 1, 2, 4, 5, and 6 is subjected to a thermal cycle test 100 times at −10° C. to 80° C., and then, is subjected to a adhesiveness evaluation test by the same method as that in (1) to (3).

In Table 1, evaluation results of Cu(I)/Cu(II), the degree of virus inactivity, the antiviral activity value, the total light ray transmittance, and the adhesiveness with respect to the base material, of the antiviral substrate obtained in Examples 1 to 15 and Comparative Examples 1, 2, 4, 5, and 6, are shown. In addition, in Examples 1, and 8 to 15 and Comparative Examples 4 to 6, the degree of virus inactivity after the wiping test is also shown. In addition, in Table 2, measurement results of the degree of virus inactivity before and after the immersion test (evaluation results of water resistance) in Example 3 and Comparative Example 2 are shown. In Table 1, a portion in which "-" is shown is a portion in which data is not obtained.

It is considered that copper hydroxide is insoluble in water and has an OH structure, and thus, is also excellent in affinity with respect to a resin, and as with a carboxy group, the antiviral substrate of Example 4 is also excellent in water resistance.

In addition, the degree of antiviral inactivity of the antiviral substrate in Comparative Example 3 is −3.1 before a pure water immersion test, and is −1.0 after the pure water immersion test. In addition, in Comparative Example 3, the peeling of the coated cured material is not detected on the glass base material in the adhesiveness evaluation immediately after curing, but the peeling is detected after the thermal cycle test. It is assumed that a hydrophilic group of the phosphoric acid ester type anion surfactant is bonded to water, and is gasified at the time of a thermal cycle, and a stress is generated on the interface between the cured material and the glass base material, and thus, peeling occurs.

TABLE 1

| | Cu(I)/Cu(II) *1 | Antiviral activity value *2 | | Antiviral activity value *3 | Total light ray transmittance (%) | Adhesiveness (initial stagte) | Adhesiveness (after thermal cycle test) |
|---|---|---|---|---|---|---|---|
| | | Before wiping | After wiping | | | | |
| Example 1 | 1.4 | −6.3 | −6.0 | 4.2 | 91 | No peeling | No peeling |
| Example 2 | 1.4 | −6.3 | — | 3.6 | 91 | No peeling | No peeling |
| Example 3 | 1.9 | −5.5 | — | 4.5 | 95 | No peeling | No peeling |
| Example 4 | 1.9 | −5.5 | — | 4.5 | 95 | No peeling | No peeling |
| Example 5 | 2.9 | −5.0 | — | — | 93 | No peeling | No peeling |
| Example 6 | 1.5 | −4.1 | — | — | 80 | No peeling | Peeling |
| Example 7 | 1.6 | −6.3 | — | — | 90 | No peeling | No peeling |
| Example 8 | 1.9 | −6.3 | −6.3 | — | — | No peeling | No peeling |
| Example 9 | 1.9 | −6.1 | −6.1 | — | — | No peeling | No peeling |
| Example 10 | 1.8 | −6.2 | −4.0 | — | — | No peeling | No peeling |
| Example 11 | 1.9 | −6.1 | −4.1 | — | — | No peeling | No peeling |
| Example 12 | 4.0 | −6.0 | −5.8 | — | — | No peeling | No peeling |
| Example 13 | 50.0 | −4.0 | −3.8 | — | — | No peeling | No peeling |
| Example 14 | 55.0 | −3.5 | −3.1 | — | — | No peeling | No peeling |
| Example 15 | 0.4 | −4.6 | −4.6 | — | — | No peeling | No peeling |
| Comparative Example 1 | — | −1.1 | — | — | — | No peeling | Peeling |
| Comparative Example 2 | — | −5.1 | — | — | 93 | No peeling | Peeling |
| Comparative Example 4 | — | −2.9 | −1.0 | — | 80 | No peeling | Peeling |

TABLE 1-continued

|  | Cu(I)/Cu(II) *1 | Antiviral activity value *2 Before wiping | Antiviral activity value *2 After wiping | Antiviral activity value *3 | Total light ray transmittance (%) | Adhesiveness (initial stagte) | Adhesiveness (after thermal cycle test) |
|---|---|---|---|---|---|---|---|
| Comparative Example 5 | 0 | −2.8 | 0 | — | — | No peeling | No peeling |
| Comparative Example 6 | 0 | −2.0 | −1.0 | — | 60 | No peeling | Peeling |

Note 1)
*1: Ratio of number of ions of Cu(I) and Cu(II)
Note 2)
*2: Degree of virus inactivity using bacteriophage
Note 3)
*3: Antiviral activity value using feline calicivirus

TABLE 2

|  | Degree of virus inactivity* | |
|---|---|---|
|  | Before pure water immersion test | After pure water immersion test |
| Example 3 | −5.5 | −5.5 |
| Comparative Example 2 | −5.1 | −2.3 |

Note)
*Degree of virus inactivity using bacteriophage

From Example 1, and Examples 8 to 9, it is found that in a case of 1-Hydroxy-Cyclohexyl-Phenyl-Ketone (Alkyl Phenone)/Benzophenone=1/1 to 4/1 in a weight ratio, as a photopolymerization initiator, the degree of virus inactivity does not decrease at all, even after the wiping test. It is assumed that in a case where a weight ratio of Alkyl Phenone/Benzophenone is 1/1 to 4/1, a crosslinking density of the ultraviolet-curable epoxy resin increases, and thus, the ultraviolet-curable resin is not abraded even in a case where a wiping force is applied. It is preferable that the crosslinking density is greater than or equal to 85%, in particular, is greater than or equal to 95%.

In addition, in a case where Cu(I)/Cu(II) is 0.4/1 to 50/1, the absolute value of the degree of virus inactivity is higher compared to a case where only Cu(I) exists (Comparative Examples 3 and 4) or a case where only Cu(II) exists (Comparative Example 5). It is assumed that in a case where only Cu(I) exists, monovalent copper chloride (I) insoluble in water is formed in a form of particulates, and is not capable of being homogeneously dispersed in the resin that is a binder and stable Cu(II) prevents ions (I) from being oxidized, and thus, it is considered that in a case where Cu(II) and Cu(I) coexist, the antiviral activity is higher compared to a case where only Cu(I) exists. On the contrary, in a case where Cu(I) excessively increases, the degree of virus inactivity tends to decrease. It is assumed that this is because Cu(I) is unstable and is easily oxidized, and the amount of Cu(II) that is considered to protect the oxidization of Cu(I) decreases.

Note that, in Comparative Example 2, high antiviral activity is obtained even in a case where only Cu(I) exists, but it is assumed that this is a synergetic effect between Cu(I) and a sugar reducing agent by contrast with Comparative Examples 3 and 4. In the present invention, it is advantageous that since Cu(I) and Cu(II) coexist, high antiviral activity is obtained regardless of the presence or absence of the sugar reducing agent.

Note that, in a case where the cured binder is dispersed and fixed in the form of islands or a region in which the cured binder is fixedly formed on the surface of the base material and a region in which the cured binder is not fixedly formed on the surface of the base material are mixed, it is preferable to adjust Cu(I)/Cu(II) in the copper compound to 0.4/1 to 4.0/1, since it is possible to increase the antiviral properties.

In addition, in Comparative Example 6, the copper complex (II) such as amino-acid copper is not reduced by the photopolymerization initiator, and is remained as Cu(II), and thus, the antiviral activity is low.

According to the examples and the comparative examples described above, in the antiviral substrate obtained in the examples, the cured material of the electromagnetic curable resin or the cured binder, containing the copper compound, exists on the glass plate surface or the like that is a base material, in the form of islands, in a state where a fixed region and an unfixed region of the binder (resin) cured material are mixed, or in the form of a film, and a part of the copper compound is exposed on the surface of the cured material of the electromagnetic curable resin or the surface of the cured binder. According to the examples, Cu(I)/Cu(II) is 0.4 to 50, is preferably 0.5 to 50, is more preferably 1.0 to 4.0 or 1.4 to 2.9, in particular, is optimally 1.4 to 1.9. In this case, it was verified that since the content of Cu(I) was high or Cu(I) and Cu(II) coexisted, excellent transparency, excellent adhesiveness with respect to the base material, and excellent antiviral properties were exhibited. In addition, it is also verified that in the copper compound used as a raw material, an ion valence of copper is 2, but the ion valence of copper is reduced to 1 at the time of a photopolymerization reaction of an ultraviolet ray. Further, it can be said that since the antiviral performance is expressed by the cured resin or the cured binder, containing the copper compound, it is obvious that the copper compound is exposed on the surface of the cured resin or the surface of the cured binder. Note that, copper configuring copper acetate is generally divalent ions, but from Table 1, it is understood that copper is reduced to monovalent copper. This is because the photopolymerization initiator (1-Hydroxy-Cyclohexyl-Phenyl-Ketone/Benzophenone) has reducing power.

In addition, in Comparative Example 1, it is found that metal fine particles (silver) are precipitated, but the antiviral effect is greatly degraded compared to Examples 1 to 7, and the metal fine particles are poor in an effect of deactivating a virus.

In Table 2, the degrees of virus inactivity before and after the water resistance test in Example 3 and Comparative Example 2 are shown. It is considered that in Example 3, there is no difference in the degrees of virus inactivity before and after the water resistance test, but in Comparative Example 2 containing reduction sugar, the degree of virus inactivity considerably decreases, and the antiviral function decreases due to the desorption of copper suboxide. As described above, it is considered that in a case where the cured resin contains a substance that is easily eluted in water, such as sugar or a phosphoric acid ester-based surfactant, the cured resin is degraded, and thus, a holding power of the copper compound decreases, the desorption of the copper compound easily proceeds, and the water resistance decreases.

Further, it is found that in Examples 1 to 5, and Example 7 in which the binder (resin) cured material is fixed by being scattered in the form of islands or the fixed region and the unfixed region of the binder (resin) cured material are mixed, the antiviral function is higher compared to a case where the binder (resin) cured material is fixed in the form of a film, as with Example 6. It is assumed that this is because in a case where the binder (resin) cured material is fixed by being scattered in the form of islands or the fixed region and the unfixed region of the binder (resin) cured material are mixed, a surface area of the antiviral binder (resin) cured material increases, and a probability of contact between the binder (resin) cured material and a virus increases. Note that, the total light ray transmittance is measured by coating a glass substrate with the antimicrobial composition.

In the evaluation of the adhesiveness of the binder (resin) cured material with respect to the base material, at the initial stage, peeling is not detected in any of Examples 1 to 15 and Comparative Examples 1, 2, 4, 5, and 6. However, after the thermal cycle test, the peeling is not detected in Examples 1 to 5 and 7 to 15, but the peeling is detected in Example 6 and Comparative Examples 1, 2, 4, and 6. It is considered that in Example 6 and Comparative Example 1, since the antiviral cured resin is fixed in the form of a film, a stress is generated on the interface between the base material and the cured resin by a difference in thermal expansion rates between the base material and the cured resin at the time of a thermal cycle, the adhesiveness of the cured resin with respect to the glass plate or the OPP film that is a base material decreases, and the peeling easily occurs. In addition, it is assumed that in Comparative Example 2, since sugar is used as a reducing agent, sugar is bonded to water in the air and absorbs the moisture, the water bonded to the molecules of sugar is gasified at the time of a thermal cycle, and the adhesiveness of the cured binder with respect to the base material also decreases. It is assumed that in Comparative Example 4, the film contains particles of copper chloride (I), and thus, a stress is concentrated around the particles at the time of a thermal cycle, and the peeling easily occurs. Further, it is assumed that in Comparative Example 6, since the copper complex absorbs an ultraviolet ray, the resin is not sufficiently cured, and the peeling easily occurs.

Next, it was verified whether or not the antiviral composition and the antiviral substrate of Example 1, Examples 8 to 15, and Comparative Examples 1 to 6 had antibacterial activity and antifungal activity. The results are shown in Table 3.

(Antibacterial Property Evaluation Using *Staphylococcus Aureus*)

Antibacterial property evaluation using *Staphylococcus aureus* was performed as follows.

(1) A test sample obtaining by cutting the antiviral substrate obtained in Examples 1 and 8 to 15 and Comparative Examples 1 to 6 into the shape of a square of 50 mm square was placed on a sterilized plastic petri dish, and 0.4 mL of a test bacterial liquid (the number of bacteria of $2.5 \times 10^5$ to $10 \times 10^5/mL$) was inoculated.

A test bacterial liquid obtained through the following steps is used. Cultured bacteria that are precultured at a temperature of $35 \pm 1°$ C. for 16 hours to 24 hours in an incubator, are transplanted into a slant medium, and preculture is performed out at a temperature of $35 \pm 1°$ C. for 16 hours to 20 hours in an incubator. And then, cultured bacteria through above process are suitably adjusted by a culture medium of $1/500$ NB.

(2) A polyethylene film of 50 mm square is prepared as a reference material, and as with the test sample, the test bacterial liquid is inoculated.

(3) The polyethylene film of 40 mm square is applied onto the inoculated test bacterial liquid, the test bacterial liquid is evenly inoculated, and then, a reaction is performed at a temperature of $35 \pm 1°$ C. for $8 \pm 1$ hours.

(4) 10 mL of a SCDLP culture medium is added immediately after the inoculation or after the reaction, and the test bacterial liquid is washed away.

(5) A washing liquid is suitably diluted and mixed with a standard method agar, and thus, a petri dish for measuring the number of viable bacteria is prepared, and culture is performed at a temperature of $35 \pm 1°$ C. for 40 hours to 48 hours, and then, the number of colonies is measured.

(6) Calculation of Number of Viable Bacteria

The number of viable bacteria is obtained by using the following calculation expression.

$$N = C \times D \times V$$

N: Number of Viable Bacteria
C: Number of Colonies
D: Dilution Ratio
V: Liquid Volume (mL) of SCDLP Culture Medium Used in Washing (7) An antibacterial activity value is calculated by using the following calculation expression.

$$R = (Ut - U0) - (At - U0) = Ut - At$$

R: Antibacterial Activity Value
U0: Average Value of Logarithmic Values of Number of Viable Bacteria of Untreated Test Piece Immediately after Inoculation
Ut: Average Value of logarithmic Values of Number of Viable Bacteria of Untreated Test Piece after 24 Hours
At: Average Value of logarithmic Values of Number of Viable Bacteria of Antibacterial-Treated Test Piece after 24 Hours Reference Standard JIS Z 2801

*Staphylococcus aureus* NBRC12732 was used as a test bacterium.

Evaluation results are shown in Table 3.

(Antifungal Property Evaluation Using *Aspergillus niger*)

Antifungal property evaluation using *Aspergillus niger* was performed as follows.

(1) A test sample obtained by cutting the antiviral substrate obtained in Examples 1 and 8 to 15 and Comparative Examples 1 to 6 into the shape of a square of 50 mm square is placed on a sterilized plastic petri dish, and 0.4 mL of a spore suspension liquid (Spore Concentration $> 2 \times 10^5$ pieces/ml) is inoculated.

(2) A polyethylene film of 50 mm square is prepared as a reference material, and as with the test sample, the spore suspension liquid is inoculated.

(3) The polyethylene film of 40 mm square is applied onto the inoculated spore suspension liquid, the spore suspension liquid is evenly inoculated, and then, a reaction is performed at a temperature of 26° C. for 42 hours while applying light of approximately 900 LUX.

(4) ATP amount is measured immediately after the inoculation or after the reaction, in accordance with JIS L 1921 13 Luminescence Measurement.

(5) An antifungal activity value is calculated by using the following calculation expression.

$$A_a = (\text{Log } C_t - \text{Log } C_0) - (\text{Log } T_t - \text{Log } T_0)$$

$A_a$: Antifungal Activity Value

Log $C_0$: Common Logarithm Value of Arithmetic Average of ATP Amount of Three Target Materials Immediately after Inoculation Log $C_t$: Common Logarithm Value of Arithmetic Average of ATP Amount of Three Target Materials after Culture Log $T_0$: Common Logarithm Value of Arithmetic Average of ATP Amount of Three Test Materials Immediately after Inoculation Log $T_t$: Common Logarithm Value of Arithmetic Average of ATP Amount of Three Test Materials after Culture Reference Standard JIS Z 2801, JIS L 1921

*Aspergillus niger* NBRC105649 was used as a test fungus. Evaluation results are shown in Table 3.

TABLE 3

| | Cu(I)/Cu(II) *1 | Antbacterial activity value | | Antifungal activity value | |
|---|---|---|---|---|---|
| | | Before wiping | After wiping | Before wiping | After wiping |
| Example 1 | 1.4 | >3.7 | >3.7 | 3.1 | 3.1 |
| Example 8 | 1.9 | >3.7 | >3.7 | 3.1 | 3.1 |
| Example 9 | 1.9 | >3.7 | >3.7 | 3.1 | 3.1 |
| Example 10 | 1.8 | >3.7 | 3.5 | 3.1 | 2.5 |
| Example 11 | 1.9 | >3.7 | 3.5 | 3.1 | 2.6 |
| Example 12 | 4.0 | >3.7 | >3.7 | 3.1 | 3.1 |
| Example 13 | 50.0 | >3.7 | >3.7 | 3.1 | 3.1 |
| Example 14 | 55.0 | 3.5 | 3.5 | 2.8 | 2.8 |
| Example 15 | 0.4 | 3.5 | 3.5 | 3.1 | 3.1 |
| Comparative Example 1 | — | >3.7 | 3.0 | 2.4 | 1.8 |
| Comparative Example 2 | — | 3.1 | 2.8 | 2.5 | 1.8 |
| Comparative Example 3 | — | 3.0 | 2.7 | 2.5 | 1.8 |
| Comparative Example 4 | — | 3.0 | 2.6 | 2.5 | 1.8 |
| Comparative Example 5 | 0 | 3.0 | 0 | 2.5 | 0 |
| Comparative Example 6 | 0 | 3.0 | 2.8 | 2.5 | 1.0 |

Note 1)
*1: Ratio of number of ions of Cu(I) and Cu(II)

According to Table 3, it is found that all of the antiviral substrates of Example 1 and Examples 8 to 15 have antibacterial properties and/or antifungal properties.

It is found that in a case of 1-Hydroxy-Cyclohexyl-Phenyl-Ketone (Alkyl Phenone)/Benzophenone=1/1 to 4/1 in a weight ratio, as a photopolymerization initiator, the antibacterial activity does not decrease at all, even after the wiping test. It is assumed that in a case where a weight ratio of Alkyl Phenone/Benzophenone is 1/1 to 4/1, since a crosslinking density of the ultraviolet-curable epoxy resin increases, and thus, the ultraviolet-curable resin is not abraded even in a case where a wiping force is applied. Note that, the crosslinking density of the antiviral substrate of Example 8 is 97%. On the other hand, in Example 10 and Example 11, the crosslinking density was 91%. The cured material was immersed in boiled toluene for 8 hours, and was dried, and the crosslinking density was measured by [Weight of Cured Material after Immersion/Weight of Cured Material before Immersion]×100%.

In addition, in a case where Cu(I)/Cu(II) is 1/1 to 50/1, the absolute value of the antifungal activity is higher compared to a case where only Cu(I) exists (Comparative Example 4) or a case where only Cu(II) exists (Comparative Example 5). It is assumed that in a case where only Cu(I) exists, monovalent copper chloride (I) insoluble in water is formed in a particulate form, and is not capable of being homogeneously dispersed in the resin that is a binder and stable Cu(II) prevents Cu(I) from being oxidized, and thus, it is considered that in a case where Cu(II) and Cu(I) coexist, the antifungal activity is higher compared to a case where only Cu(I) exists.

On the contrary, in a case where Cu(I) excessively increases, the degree of antifungal activity tends to decrease. It is assumed that this is because Cu(I) is unstable and is easily oxidized, and the amount of Cu(II) that is considered to protect the oxidization of Cu(I) decreases.

On the other hand, it is considered that in Comparative Example 1, the antibacterial activity comparable to that of Example 1 and Examples 8 to 15 is obtained, but in all of Comparative Examples 1 to 6, the resistance with respect to wiping is low, and it is difficult to permanently maintain antibacterial properties. In addition, in a case of comparing the copper compound with the copper complex, in Example 1 and Examples 8 to 15, the antibacterial properties are high at greater than or equal to 3.5, whereas in Comparative Examples 2 to 6, the antibacterial properties are relatively low at 3.0 to 3.1.

In addition, as with Comparative Example 6, the copper complex (II) such as amino-acid copper is not reduced by the photopolymerization initiator, and is remained as Cu(II), and thus, the antibacterial activity and the antifungal activity are low.

As described above, the antiviral composition of this example can be used as an antibacterial composition and/or an antifungal composition, and the antiviral substrate of this example can be used as an antibacterial substrate and an antifungal substrate. Obviously, the method for manufacturing an antiviral substrate of this example can be used as a method for manufacturing an antibacterial properties and/or an antifungal substrate.

As described above, the antimicrobial substrate, the antimicrobial composition, and the method for manufacturing an antimicrobial substrate of the present invention are capable of providing a substrate and a member, having excellent antiviral properties and antibacterial properties, and excellent antifungal (mildew-proofing) properties, in particular, have a remarkable effect on the antiviral properties and the antifungal (the mildew-proofing) properties.

REFERENCE SIGNS LIST

10 antiviral substrate
11 base material
12 cured resin (cured material of electromagnetic curable resin)

The invention claimed is:
1. An antimicrobial substrate in which a cured material of a binder containing a copper compound and a polymerization initiator is fixed onto a surface of a base material, at least a part of the copper compound being exposed on a surface of the cured material of the binder, wherein in the copper compound (excluding a copper complex), a ratio (Cu(I)/Cu(II)) of the number of ions of Cu(I) and Cu(II) contained in the copper compound, which is calculated by measuring bond energy corresponding to Cu(I) and Cu(II) in a range of 925 to 955 eV for 5 minutes, by an X-ray photoelectron spectroscopy analysis method, is 0.4 to 50.

2. The antimicrobial substrate according to claim 1, wherein at least a part of the copper compound is exposed on the surface of the cured material of the binder, in a state capable of being in contact with a virus.

3. The antimicrobial substrate according to claim 1, wherein the cured material of the binder contains a water-insoluble polymerization initiator.

4. The antimicrobial substrate according to claim 1, wherein the polymerization initiator is at least one or more selected from an alkyl phenone-based polymerization initiator, and benzophenone or a derivative thereof.

5. The antimicrobial substrate according to claim 4, wherein the polymerization initiator includes an alkyl phenone-based polymerization initiator and a benzophenone-based polymerization initiator, a concentration of the alkyl phenone-based polymerization initiator is 0.5 to 3.0 wt % with respect to the binder, and a concentration of the benzophenone-based polymerization initiator is 0.5 to 2M wt % with respect to the binder.

6. The antimicrobial substrate according to claim 1, wherein the binder is at least one or more selected from an organic binder, an inorganic binder, a mixture of an organic binder and an inorganic binder, and an organic-inorganic hybrid binder.

7. The antimicrobial substrate according to claim 6, wherein the organic binder is at least one or more selected from the group consisting of an electromagnetic curable resin and a thermosetting resin.

8. The antimicrobial substrate according to claim 1, wherein the binder is at least one selected from the group consisting of an acryl resin, a urethane acrylate resin, a polyether resin, a polyester resin, an epoxy resin, an alkyd resin, silica sol, alumina sol, zirconia sol, titania sol, metal alkoxide, and liquid glass.

9. The antimicrobial substrate according to claim 1, wherein the cured material of the binder is fixedly formed on the surface of the base material into the shape of islands, or a region in which the cured material of the binder is fixedly formed on the surface of the base material and a region in which the cured material of the binder is not fixedly formed on the surface of the base material are mixed.

10. The antimicrobial substrate according to claim 1, wherein the cured material of the binder is fixedly formed on the surface of the base material in the form of a film.

11. The antimicrobial substrate according to claim 1, wherein in the cured material of the binder, a maximum width in a direction parallel to the surface of the base material is 0.1 to 500 μm, and an average value of thicknesses is 0.1 to 20 μm.

12. The antimicrobial substrate according to claim 1, wherein the antimicrobial substrate is an antiviral substrate.

13. The antimicrobial substrate according to claim 1, wherein the polymerization initiator is a water-insoluble photopolymerization initiator, and the binder is an electromagnetic curable resin.

* * * * *